(12) United States Patent
Kotani et al.

(10) Patent No.: US 6,768,488 B1
(45) Date of Patent: Jul. 27, 2004

(54) IMAGE FILLING METHOD, APPARATUS AND COMPUTER READABLE MEDIUM FOR REDUCING FILLING PROCESS IN PROCESSING ANIMATION

(75) Inventors: Naoya Kotani, Yokohama (JP); Masakatsu Aoki, Yokosuka (JP); Kyoko Teranishi, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/577,511

(22) Filed: May 24, 2000

(30) Foreign Application Priority Data

| May 31, 1999 | (JP) | ............................................. 11-152162 |
| May 25, 1999 | (JP) | ............................................. 11-145116 |
| Jul. 19, 1999 | (JP) | ............................................. 11-204600 |
| Mar. 6, 2000 | (JP) | ............................................. 2000-061221 |

(51) Int. Cl.$^7$ .............................................. G06T 11/20
(52) U.S. Cl. ....................... 345/441; 344/442; 344/443; 344/589; 382/190
(58) Field of Search ................................ 345/622, 589, 345/412, 441–443; 382/190, 194, 266

(56) References Cited

U.S. PATENT DOCUMENTS

| 4,183,013 | A | * | 1/1980 | Agrawala et al. ........... 382/173 |
| 4,334,274 | A | * | 6/1982 | Agui et al. .................. 382/180 |
| 5,181,261 | A | * | 1/1993 | Nagao ......................... 382/266 |
| 5,303,340 | A | * | 4/1994 | Gonzalez-Lopez et al. . 345/441 |
| 5,611,037 | A | * | 3/1997 | Hayashi ...................... 345/442 |
| 5,689,575 | A | * | 11/1997 | Sako et al. .................. 382/118 |
| 5,870,100 | A | * | 2/1999 | DeFreitas .................... 345/441 |
| 5,877,772 | A | * | 3/1999 | Nomura et al. ............. 345/594 |

FOREIGN PATENT DOCUMENTS

| EP | 0 675 461 | 3/1995 |
| EP | 0 713 325 | 11/1995 |
| EP | 0 845 717 | 11/1997 |
| JP | 9134422 A | 5/1997 |
| JP | 2762753 | 3/1998 |
| JP | 10141974 A | 5/1998 |
| JP | 2835752 | 10/1998 |

OTHER PUBLICATIONS

Great Britain Patent Office Search Reports (dated Jul. 5, 2001; Jul. 10, 2001; Jul. 16, 2001).

* cited by examiner

*Primary Examiner*—Matthew C. Bella
*Assistant Examiner*—Po-Wei Chen
(74) *Attorney, Agent, or Firm*—Kenyon & Kenyon

(57) ABSTRACT

An image filling method for reducing filling process in producing animation. The image filling method includes the steps of separating a reference line drawing and a line drawing into first and second closed regions; extracting at least one feature amount of the first and second closed regions; calculating variations of feature amounts between every combination of the first and second closed regions, sorting the first closed regions in ascending order by the variation of the feature amount for each of the second closed regions; generating color candidate lists for each of the second closed regions, wherein duplication of the color information is eliminated; filling each of the second closed regions with a color which is on the top of the color candidate list.

46 Claims, 68 Drawing Sheets

APPLYING PAINT BUCKET TOOL

1. APPLYING PAINT BUCKET TOOL ON COLORED LINE

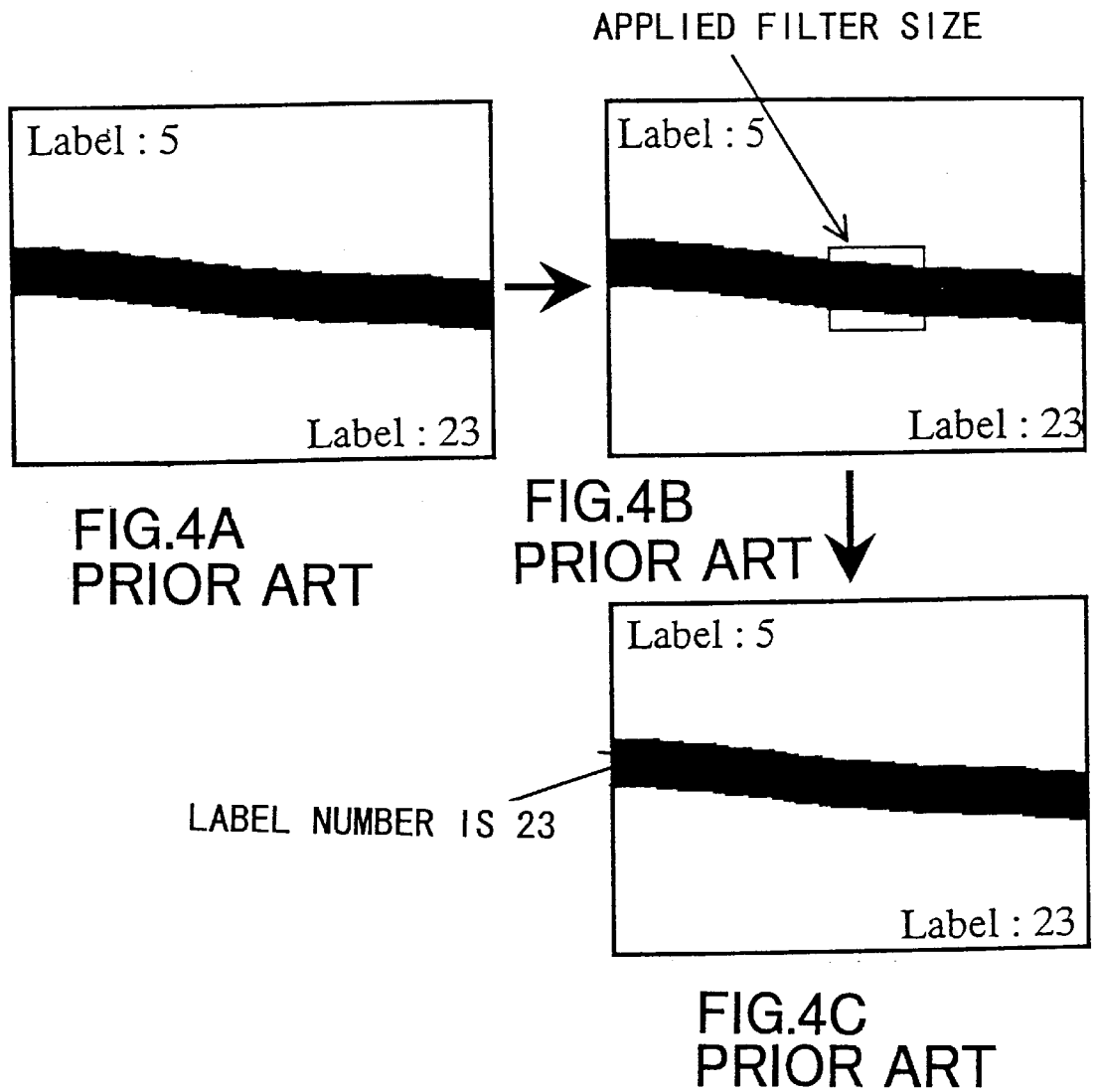

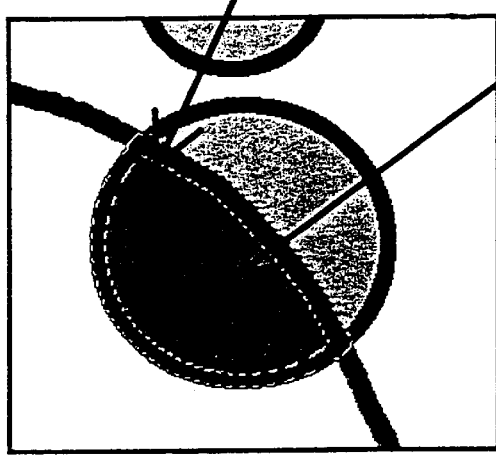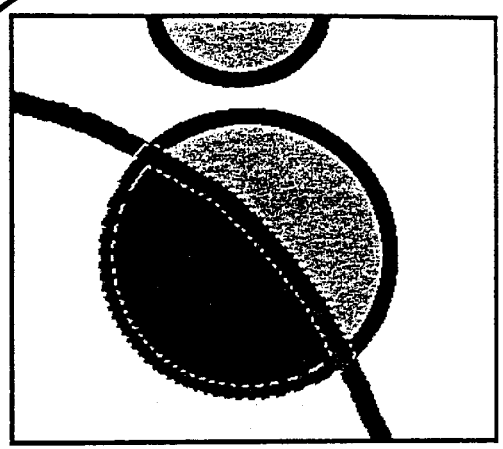
FIG.6A
PRIOR ART
FIG.6B
PRIOR ART

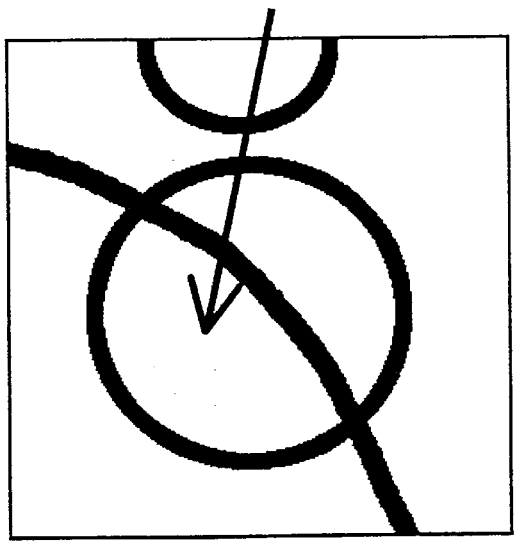
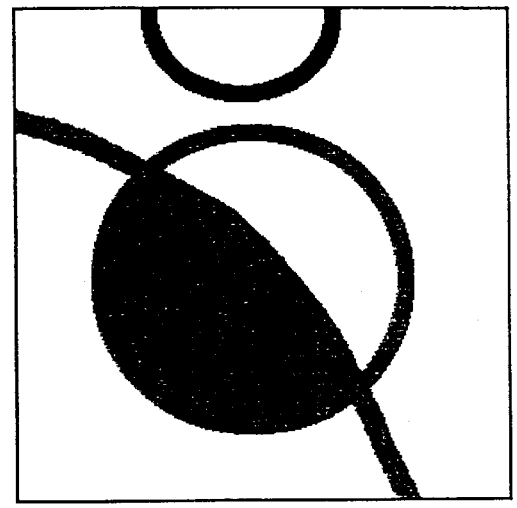
FIG.8A
PRIOR ART
FIG.8B
PRIOR ART

LABEL OF THIS COLORED LINE BECOMES 23. HOWEVER, IT IS NOT KNOWN WHICH NUMBER 5 OR 23 IS ASSIGNED TO DARKER COLOR AT THIS TIME.

IF FILTER SIZE IS SMALL, THE COLOR OF THE LINE IS DEVIDED.

IF FILTER SIZE IS FURTHER SMALLER, THE PART OF THE COLORED LINE REMAINS.

THIS PART OF COLORED LINE REMAINS UNCHANGED

IF FILTER SIZE IS LARGE, LABEL OF UNRELATED COLSED AREA IS ADDED.

COLOR LEAKS AT THIS POINT

CLOSED REGION NUMBER IS ASSIGNED
TO EACH PIXEL
(MAXIMUM NUMBER IS ASSIGNED TO
 BOUNDARY LINE PIXEL)

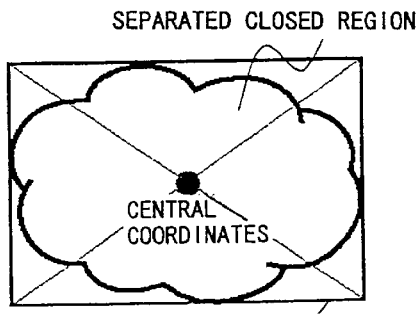
FIG.23A  MINIMUM RECTANGULAR CIRCUMSCRIBING CLOSED REGION
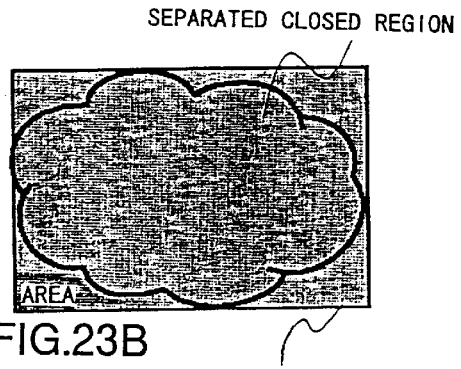
FIG.23B  MINIMUM RECTANGULAR CIRCUMSCRIBING CLOSED REGION
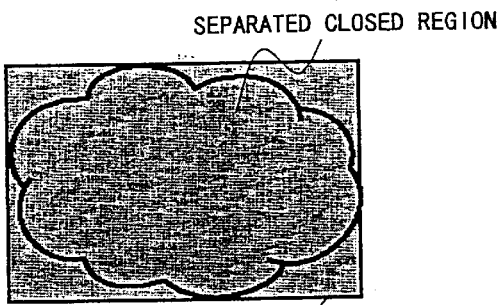
FIG.23C  MINIMUM RECTANGULAR CIRCUMSCRIBING CLOSED REGION
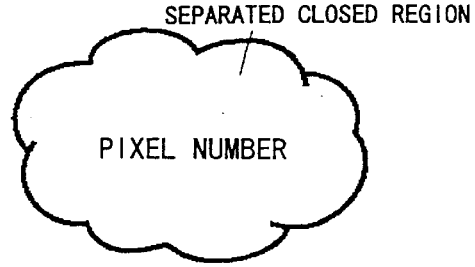
FIG.23D
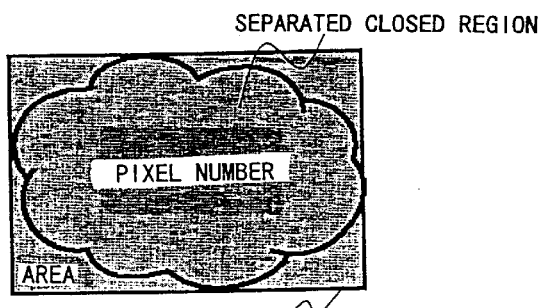
FIG.23E  MINIMUM RECTANGULAR CIRCUMSCRIBING CLOSED REGION
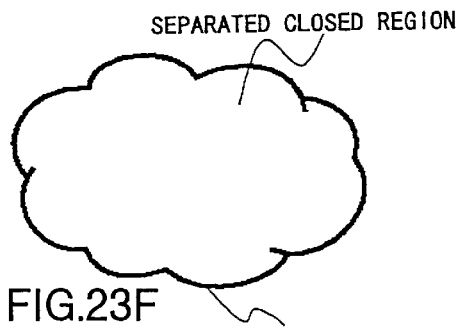
FIG.23F  PERIPHERAL LENGTH
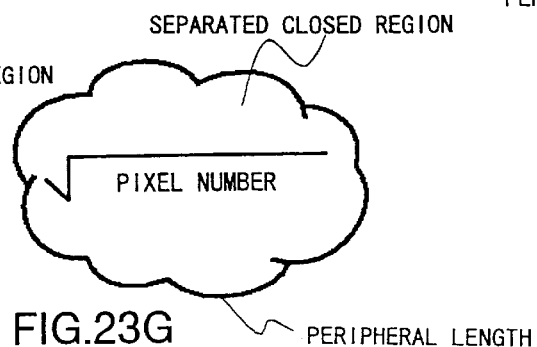
FIG.23G  PERIPHERAL LENGTH F I G. 3 0 A
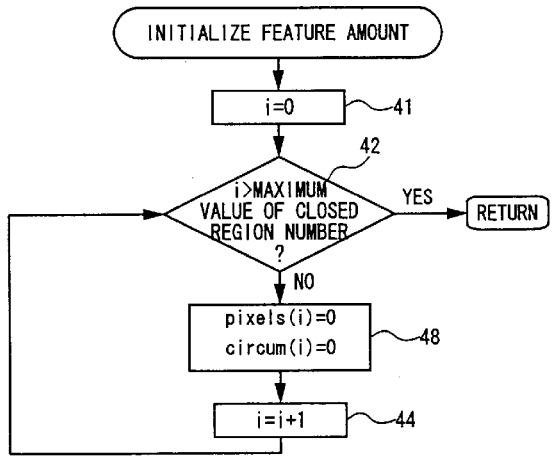
F I G. 3 0 B
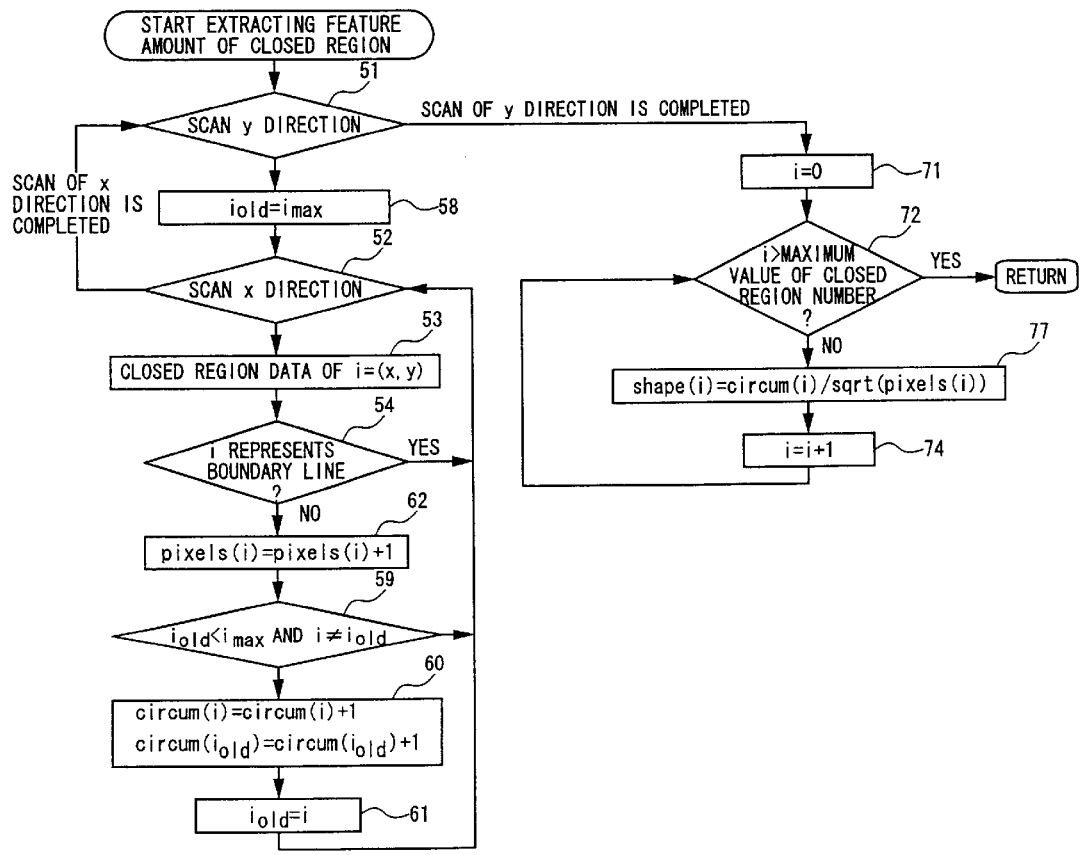

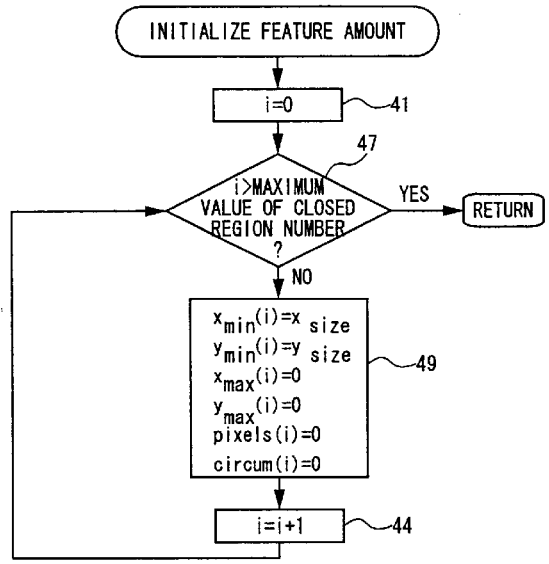
FIG. 31A
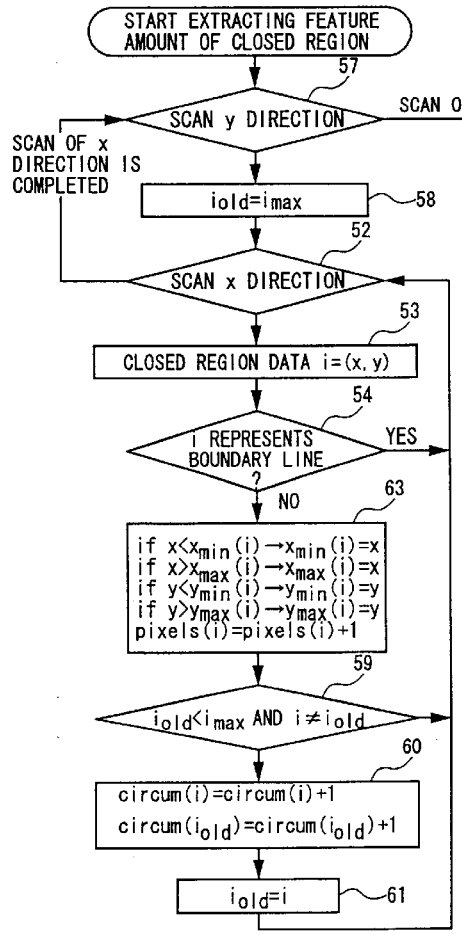
FIG. 31B
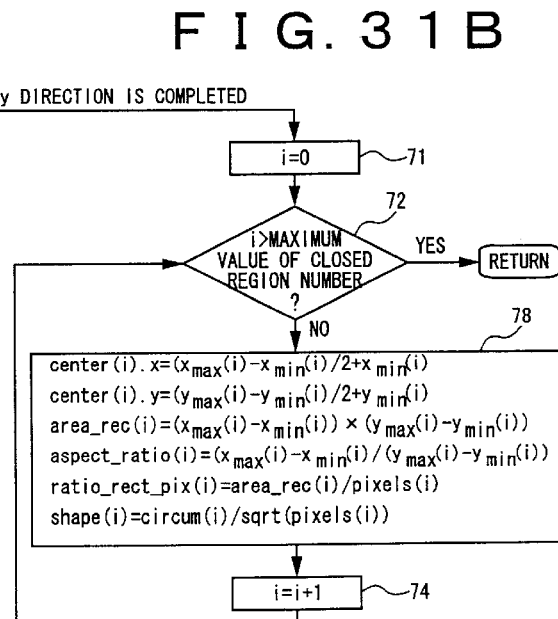

FIG. 32

| CLOSED REGION NUMBER | REFERENCE LINE DRAWING ||||||
|---|---|---|---|---|---|
| | FEATURE AMOUNT |||||
| | 1 | 2 | 3 | 4 | 5 |
| 1 | (53, 184) | 1428 | 0.5492 | 1232 | 1.159 |
| 2 | (186, 232) | 11408 | 1.348 | 8462 | 1.348 |
| 3 | (465, 339) | 49698 | 1.268 | 32918 | 1.300 |
| ⋮ | ⋮ | ⋮ | ⋮ | ⋮ | ⋮ |

FIG. 33

| LINE DRAWING TO BE FILLED | REFERENCE LINE DRAWING | | ... |
| --- | --- | --- | --- |
| | FEATURE AMOUNT 1 | | ... |
| CLOSED REGION NUMBER | CLOSED REGION NUMBER | VARIATION AMOUNT | ... |
| 0 | 0<br>1<br>2<br>3 | 0.000000<br>30.41381<br>31.62277<br>42.05948 | ...<br>...<br>...<br>... |
| 1 | 1<br>2<br>3<br>0 | 2.236068<br>6.324555<br>21.18962<br>28.28427 | ...<br>...<br>...<br>... |
| 2 | 1<br>2<br>3<br>0 | 6.324555<br>12.20655<br>25.80697<br>33.83784 | ...<br>...<br>...<br>... |
| ⋮ | ⋮ | ⋮ | |

FIG. 34

| LINE DRAWING TO BE FILLED | REFERENCE LINE DRAWING | | ... |
|---|---|---|---|
| | FEATURE AMOUNT 1 | | ... |
| CLOSED REGION NUMBER | CLOSED REGION NUMBER | NORMARIZED AMOUNT | ... |
| 0 | 0<br>1<br>2<br>3 | 0.000000<br>0.723114<br>0.751858<br>1.000000 | ...<br>...<br>...<br>... |
| 1 | 1<br>2<br>3<br>0 | 0.000000<br>0.156959<br>0.727634<br>1.000000 | ...<br>...<br>...<br>... |
| 2 | 1<br>2<br>3<br>0 | 0.000000<br>0.213788<br>0.708109<br>1.000000 | ...<br>...<br>...<br>... |
| : | : | : | |

FIG. 35

| LINE DRAWING TO BE FILLED | REFERENCE LINE DRAWING | |
|---|---|---|
| | INTEGRATED VARIATION AMOUNT | |
| CLOSED REGION NUMBER | CLOSED REGION NUMBER | VALUE |
| 0 | 0<br>1<br>2<br>3 | 0.000000<br>4.522894<br>4.618271<br>4.678329 |
| 1 | 1<br>2<br>3<br>0 | 0.093134<br>1.454905<br>4.047636<br>4.735393 |
| 2 | 1<br>2<br>3<br>0 | 0.006086<br>0.078106<br>2.898299<br>3.320228 |
| ⋮ | ⋮ | ⋮ |

FIG. 36

| LINE DRAWING TO BE FILLED | REFERENCE LINE DRAWING | | COLOR OF CLOSED REGION CORRESPONDING TO REFERENCE PICTURE | COLOR CANDIDATE LISTS IN WHICH DUPLICATION IS ELIMINATED |
|---|---|---|---|---|
| CLOSED REGION NUMBER | CLOSED REGION NUMBER | INTEGRATED VARIATION AMOUNT VALUE | | |
| 0 | 0<br>1<br>2<br>3 | 0.000000<br>4.522894<br>4.618271<br>4.678329 | 249, 194, 194<br>254, 0, 0<br>254, 0, 0<br>116, 252, 116 | 249, 194, 194<br>254, 0, 0<br>116, 252, 116 |
| 1 | 1<br>2<br>3<br>0 | 0.093134<br>1.454905<br>4.047636<br>4.735393 | 254, 0, 0<br>116, 252, 116<br>249, 194, 194<br>254, 0, 0 | 254, 0, 0<br>116, 252, 116<br>249, 194, 194 |
| 2 | 1<br>2<br>3<br>0 | 0.006086<br>0.078106<br>2.898299<br>3.320228 | 116, 252, 116<br>254, 0, 0<br>254, 0, 0<br>249, 194, 194 | 116, 252, 116<br>254, 0, 0<br>249, 194, 194 |
| .. | .. | .. | .. | .. |

FIG.41

| Color | RGB | Label |
|---|---|---|
| ■ | 171, 94, 47 | HAIR OF PONTA |
| ■ | 95, 51, 23 | HAIR (SHADOW) OF PONTA |
| □ | 252, 232, 208 | FLESH COLOR OF PONTA |
| TRANSPARENT | 255, 255, 255 | I |
| ■ | 249, 32, 63 | CRIMSON RED |
| □ | 250, 250, 250 | PURE WHITE |
| ■ | 10, 10, 10 | PURE BLACK |

FIG. 42

| COLOR (R, G, B) | COLOR ALIAS |
|---|---|
| 171, 94, 47 | HAIR OF PONTA |
| 95, 51, 23 | HAIR (SHADOW) OF PONTA |
| 252, 232, 208 | FLESH COLOR OF PONTA |
| 255, 255, 255 | TRANSPARENT |
| 249, 32, 63 | CRIMSON RED |
| 250, 250, 250 | PURE WHITE |
| 10, 10, 10 | PURE BLACK |

F I G. 53
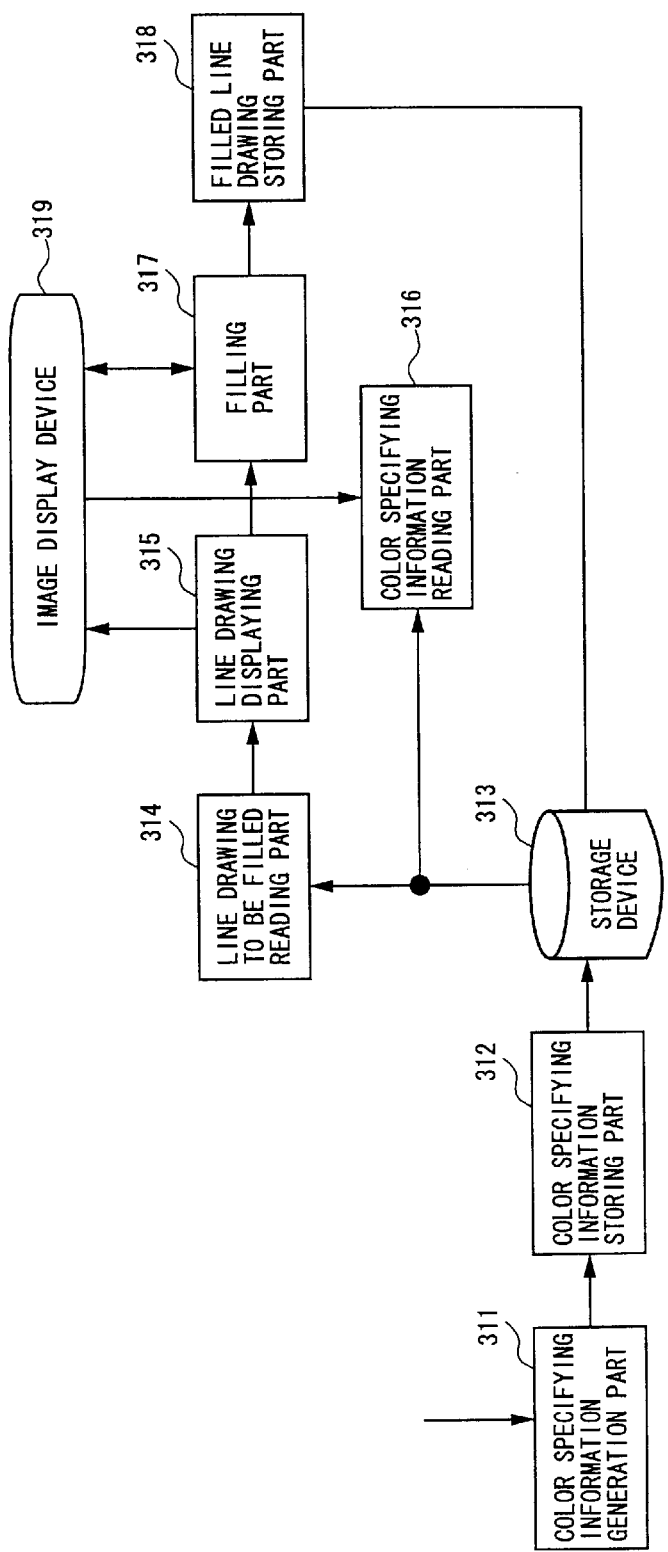

FIG. 54

| COLOR (R, G, B) | COLOR ALIAS |
|---|---|
| 117, 44, 5 | HAIR COLOR 1 |
| 87, 14, 10 | HAIR COLOR 2 |
| 222, 116, 61 | HAIR HIGHLIGHT 1 |
| 173, 62, 4 | HAIR HIGHLIGHT 2 |
| 53, 10, 7 | HAIR FIRST SHADOW COLOR |
| 23, 2, 1 | HAIR SECOND SHADOW COLOR |
| 234, 197, 126 | FLESH COLOR |
| 156, 116, 39 | FLESH SHADOW COLOR |
| 73, 142, 112 | SHIRT COLOR 1 |
| ⋮ | ⋮ |

FIG. 61

| SMALL REGION NUMBER | | | COUNT |
|---|---|---|---|
| NUMBER | SIZE | COORDINATES | CHANGE STATE |
| 0 | num[0] | x[0], y[0] | 0 |
| 1 | num[1] | x[1], y[1] | 0 |
| 2 | num[2] | x[2], y[2] | 0 |
| 3 | num[3] | x[3], y[3] | 0 |
| 4 | num[4] | x[4], y[4] | 0 |
| 5 | num[5] | x[5], y[5] | 0 |
| 6 | num[6] | x[6], y[6] | 0 |
| 7 | num[7] | x[7], y[7] | 0 |
| 8 | num[8] | x[8], y[8] | 0 |
| ⋮ | ⋮ | ⋮ | ⋮ |

IMAGE FILLING METHOD, APPARATUS AND COMPUTER READABLE MEDIUM FOR REDUCING FILLING PROCESS IN PROCESSING ANIMATION

BACKGROUND OF THE INVENTION

1. Field of the Invention

The present invention generally relates to an image processing technique. More particularly, the present invention relates to an image filling method, an apparatus and a computer readable medium storing the program.

2. Description of the Related Art

First, the related art which corresponds to the aftermentioned first object will be described. Conventionally, a line drawing on a sheet of paper is transferred to a cell which is colored manually with a paintbrush when producing animation. Recently, this work is being replaced by digital painting in which the line drawing is digitized by a scanner and is filled by using a computer. Therefore, it becomes easy to fill the line drawing which was very difficult conventionally. However, it is necessary to fill the digitized line drawing data manually one by one even after the digital painting is introduced.

As conventional techniques, Japanese patent No.2835752 and Japanese laid open patent application No.9-134422 disclose a technique for filling a plurality of line drawings at a time by specifying coordinates (a seed point) from which the filling is started, wherein the coordinates are common for regions where a plurality of line drawings are superimposed and filled with the same color.

In the technique of the Japanese patent No. 2835752, the barycenter position of each closed region, and lateral and vertical lengths of a circumscribed rectangle of each closed region are extracted from an unfilled image and the filled image as features. Then, the unfilled image is filled by referring to the corresponding region of the filled image by using the features. According to the above invention, a region which has relatively small movement can be filled with the same color of the corresponding region of the filled image.

In the Japanese laid open patent application No.9-134422, when filling closed regions of a line drawing, a point determined in the closed region and a color selected according to the point are correlated and stored. When the point is located in the same closed region of next images that follows, the color corresponding to the point is called and added to the closed region. Accordingly, filling images which moves successively can be performed speedily and effectively.

However, in the invention of the Japanese patent No.2835752, since only the barycenter position of each closed region and lateral and vertical lengths of a circumscribed rectangle of each closed region are extracted, and used as feature data, there is a problem that the calculation amount for obtaining the barycenter position is large.

In the invention of the Japanese laid open patent application No.9-134422, when overlapping closed regions of a plurality of unfilled line images should be filled with the same color, the closed regions can be filled in a stroke with a seed point which has the same coordinates in the plurality of line drawings. Thus, the invention is built on a premise that there are overlapping closed regions which have the same meaning and should be filled with the same color in a plurality of line drawings. Therefore, this method can be applied to only regions with relatively small movement, thereby there is a problem that many judgments by the operator are necessary.

Next, the related art which corresponds to the second object will be described. Conventionally, a boundary line of red, blue or the like (a colored line) is used as well as a black boundary line when producing animation. There is a following rule.

When a line drawing on a sheet of paper is transferred to a cell, only the black boundary lines are transferred. Then, if a red boundary line is specified when the transferred cell is put on the line drawing, the red boundary line is traced by the brighter color which is one of colors of sides which are divided by the boundary line. If a blue boundary line is specified when the transferred cell is put on the line drawing, the blue boundary line is traced by the darker color which is one of colors of each side which is divided by the boundary line.

In recent years, the line drawings are digitized and digital painting becomes widespread, in which the line drawing is transferred to the cell and is filled on a computer. Thus, the color of the colored line (boundary line) of red or blue should be changed sooner or later on a computer. FIG. 1A shows the line drawing drawn by the colored line and FIG. 1B shows the filled image of the line drawing. The colored line in the filled image needs to be filled with a proper color as shown in FIG. 1C. For this purpose, there are conventional technologies such as a paint bucket tool, a filling process method with function of filling the colored line and the Japanese patent No.2762753.

The paint bucket tool is a common name of a filling tool widely used for a general painting system and the like. When a pixel is specified by a pointing device such as a mouse, pixels which are connected to the pointed pixel and have the same color as the color of the pointed pixel are filled with a predetermined color by the paint bucket tool. FIGS. 2A–2D show a general example for filling a colored line by using the paint bucket tool. When filling a closed region enclosed by a colored line and the colored line shown in FIG. 2A by using the paint bucket tool, the closed region is filled by the paint bucket tool first (FIG. 2B), then the colored line is filled with the same color (FIG. 2C). As a result, the image shown in FIG. 2D is obtained. The order in which the processing shown in FIG. 2B and the FIG. 2C can be reverse.

On the other hand, the filling process method with function of filling the colored line is adopted by software specialized for animation filling. According to the method, the colored line is filled with the color used for filling the region enclosed by the colored line at the same time when the region is filled. FIGS. 3A, 3B shows the example. As shown FIGS. 3A, 3B, the closed region enclosed by the colored line and the colored line are filled at the same time when the inside of the closed region is filled. As a consequence, the colored line is filled with the color which is used first for filling each region enclosed by the colored line.

In the method of the Japanese patent No.2762753, every closed region is labeled and a filter of a size is defined, in which the filter is centered by a target pixel on a boundary line when the boundary line is the colored line. Then, the maximum label number within the filter is provided to the target pixel. The processing will be described with reference to FIGS. 4A–Ac. As shown in FIG. 4A, a label number 5 is assigned to the upper closed region of the colored line and a label number 23 is assigned to the lower closed region. As shown in FIG. 4B, by applying the filter which is wider than the thickness of the colored line, the maximum label number within the filter is assigned to the label number of the colored line. As a result, as shown in FIG. 4C, the label number of the colored line becomes 23.

However, in the case when a colored line should be filled with a plurality of colors, there is a following problem. As shown in FIGS. 5A and 5B, by using the paint bucket tool, the same color pixels which are connected successively to a pixel on which the paint bucket tool is applied are filled with a color. Therefor, for filling such a colored line by using the paint bucket tool, the region on which the paint bucket tool is applied should be specified in advance as shown in FIG. 6A such that the paint bucket tool is applied in the specified region as shown in FIG. 6B. Such a case occurs very frequently in which a colored line should be divided and filled with a plurality of colors. However, there is a problem in that it takes much time to specify the regions to which the paint bucket tool is applied in a shape of the colored line.

FIG. 7 shows the problem of the filling tool with filling function to the colored line. The filling tool has a rule in which the colored line is filled with a color of the closed region which is filled first. Therefore, as shown in FIG. 7, the colored line is filled differently depending on the side which is filled first. That is, when the inside is filled first, the colored line is filled with red. When the outside is filled first, the colored line is filled with blue. Thus, the operator should be aware of the color of the colored line and the colors of the closed regions which are divided by the colored line. That is, when the colored line is red, the closed region which is brighter side of the closed regions which are divided by the colored line should be filled first. When the colored line is blue, the closed region which is darker side of the closed regions which are divided by the colored line should be filled first. There is a problem that the operator should always pay particular attention to the color of the colored line and the order of filling. In addition, the same problem which is explained in FIG. 5 exists in the filling tool with function of filling the colored line as shown in FIGS. 8A and 8B. For avoiding the problem, it is necessary to perform the same tasks shown in FIG. 6 by the filling tool with function of filling the colored line as shown in FIGS. 9A and 9B. Therefore, it takes much time to set regions for applying.

According to the method shown in the Japanese patent No.2762753, the label number of the colored line is determined as one of label numbers of closed regions. Thus, the color of the colored line is not determined until the filling process is performed as shown in FIG. 10A. Therefore, there is a problem that the above-mentioned rule which has been historically established in producing animation can not be considered. In addition, when the size of the filter is too small (FIGS. 10B and 10C) or too large (FIG. 10D), the processing is not performed properly. Thus, it is necessary to adjust the size of the filter according to the thickness or the complexity of the colored lines. However, the Japanese patent No.2762753 does not disclose the method for solving the problem.

Next, the related art corresponding to the third object will be described.

For filling a closed region in a line drawing to be filled, at least coordinates in the closed region and the color to be pained are required. The coordinates can be specified by a pointing device such as a mouse when a computer is used for filling. As for the color, an operator inputs (R, G, B) values or (tint, chroma, lightness) values and the like by using an interface shown in FIGS. 11A and 11B.

There is another method in which a color is obtained by specifying a point by the pointing device on a display such that the color is used for painting. FIGS. 12A and 12B show two representative examples. In the method shown in FIG. 12A, a color specifying table is displayed in which predetermined colors and the corresponding names are shown. The operator specifies a desired color in the table with the pointing device. In the case shown in FIG. 12B, an example image which is already filled is displayed. In this case, the operator finds a closed region in the example image which has a color the operator wants to use and specifies the color with the pointing device.

However, since the color value used for painting each closed region is strictly defined in producing animation, the operator needs to check the color value and input it via a keyboard every time the color is changed by the method shown in FIGS. 11A and 11B. Thus, this operation is burdensome to the operator.

As for the method shown in FIGS. 12A and 12B, there is a problem that the operator needs to move the pointing device extensively every time the color to be painted is changed.

Next, the related art corresponding to the fourth object will be described.

Conventionally, for filling a region enclosed by a line, the operator specifies the color and coordinates (which will be called a seed point) which is a start point for filling. Then, the four connected pixel seed fill algorithm, the eight connected pixel seed fill algorithm or the scan line seed fill algorithm is generally used for painting the region. These methods are explained, for example, in "Hands-on Computer Graphics", Fujio Yamaguchi, Nikkan Kogyo shinbunsha, pp104-, 1987. Each methods will be described in the following.

FIG. 13 is a diagram for explaining the four connected pixel seed fill algorithm. First, the color of the specified seed point is checked. When the color can be changed (that is, when the color is not the color of the outline, for example), the color value of the pixel is saved and the color of the seed point is changed to a specified color. Next, pixels which are connected to each of four sides of the seed point are searched. If the color of the searched pixel can be changed (that is, when the color is the same as the saved color and is not the color of the outline), the color of the pixel is changed to the specified color. Next, the same processing is performed for four pixels which are connected to the pixel in which the color is changed. After that, the same processing is performed recursively until a pixel which has a color different from the saved color or a pixel which has the color same as the outline color is searched. FIG. 13 shows pixels 1–4 which are filled in the first filling process and pixels adjacent to the pixel 1 which are further searched and filled.

FIG. 14 is a diagram for explaining the eight connected pixel seed fill algorithm. In the algorithm, as shown in FIG. 14, this method is different from the four connected pixel seed fill algorithm in that eight connected pixels are searched in this method. FIG. 14 shows pixels 1–8 which are filled in the first filling process and pixels around the pixel 3 which are further searched and painted.

According to the above-mentioned algorithm, the recursive processing tends to become deep and large stack region is necessary. FIG. 15 is a diagram for explaining the scan line seed fill algorithm which is developed for the sake of decreasing the depth of the recursive processing.

First, the color of the seed point which is specified in the first place is checked. When the color can be changed (for example, when the color is not the color of the outline), the color value of the pixel is saved and the color is changed to a specified color. Next, pixels are searched from the seed point in the lateral direction until a pixel in which the color can not be changed is searched (for example, the color of the pixel is different from the saved color or the color of the pixel is that of the outline). When a pixel in which the color can be changed is searched (for example, the color of the pixel is the same as the saved color or the color of the pixel is not that of the outline), the color is changed. In addition, the color of a pixel which is connected to the upper side or the lower side of the searched pixel is checked while searching the pixels. Then, the coordinates of the rightmost (or leftmost) pixel in which the color can be changed are stored. The same processing is repeated recursively by using the pixel of the coordinates as a seed point. As a result, the color of the closed region which includes the seed point which is specified in the first place is changed to a specified color.

In the above-mentioned conventional methods, the four connected pixel seed fill algorithm is easily programmable and the processing is fast. In addition, the four connected pixel seed fill algorithm does not have the after-mentioned problem of the eight connected pixel seed fill algorithm. Therefore, this algorithm is widely used.

However, when a region is painted once by specifying a seed point as shown in FIG. 16A, unfilled regions remain as shown in FIG. 16B due to the basic characteristics of this algorithm. Such a case often occurs when producing animation such as shown in FIG. 17. In many cases, the remaining region is a small region such as one pixel or two pixels. Thus, the remaining region is often undetected by the naked eye. Therefore, the operator must concentrate on checking the minute remaining region, which takes much time.

As for the eight connected pixel seed fill algorithm, the problem of unpainted region remaining does not occur. However, in the case such as one shown in FIG. 18, the color used for painting the inside leaks at the point specified the arrow in FIG. 18 such that the outside is painted by the same color. The case shown in FIG. 18 also often occurs. Therefore, this method is not generally used.

The scan line seed fill algorithm has the same merits and demerits as the four connected pixel seed fill algorithm in terms of painting. As mentioned above, this method require smaller stack region that the other two methods. However, the relatively large stack region used for the other two methods is much smaller that the program region or the data region. Thus, there is no reason to use the scan line seed fill algorithm instead of the four connected pixel seed fill algorithm which is easily implemented at the present time when the price of a computer memory is very low.

Since the remaining region to be checked is minute in any of the above-mentioned algorithms, it is difficult to detect the remaining region. Thus, the operator should intensively concentrate on checking whether-the unfilled region is remained, however, it takes much time.

SUMMARY OF THE INVENTION

It is a first object of the present invention to provide an image filling method, apparatus, and a computer readable medium storing an image filling program in which computational amount can be decreased when determining a color used for filling a closed region of a line drawing with reference to a reference line drawing, and it is not necessary for the user to check overlapping state of line drawings.

It is a second object of the present invention to provide an effective and flexible image filling method, apparatus, and a computer readable medium storing an image filling program in which, even when a colored line extends over a plurality of regions, the user can change the color of only a necessary part of the colored line without affecting other regions such that it is not necessary for the user to consider the filling order.

It is a third object of the present invention for the user to save labor when filling images.

It is a fourth object of the present invention for the user to check and correct easily an unfilled small region (one pixel, two pixels or the like) which is forgotten or is a mistake when filling a digitized line drawing which is used in producing animation, in which high concentration is not necessary for the user to check the small region.

According to a first aspect of the present invention, the above object of the present invention is achieved by an image filling method comprising the steps of:

separating a reference line drawing into first closed regions, the reference line drawing being read from a storage device and being an original line drawing of a reference picture;

extracting at least one feature amount of the first closed regions other than the barycenter;

separating a line drawing to be filled into second closed regions, the line drawing to be filled being read from a storage device;

extracting at least one feature amount of the second closed regions other than the barycenter;

calculating variations of feature amounts between every combination of the first closed regions and the second closed regions, sorting the first closed regions in ascending order by the variation of the feature amount for each of the second closed regions;

generating color candidate lists for each of the second closed regions, wherein color information corresponding to the first closed regions is obtained from the reference picture and duplication of the color information is eliminated;

filling each of the second closed regions with a color which is on the top of the color candidate list corresponding to the second closed region.

According to the above-mentioned invention, the barycenter is not used for the feature amount because calculation amount is very large for obtaining the barycenter of a shape.

According to the present invention, the following feature amounts are used.

a) Central coordinates of a minimum rectangular circumscribing a closed region.

b) The area of the minimum rectangular circumscribing the closed region.

c) The aspect ratio of the minimum rectangular circumscribing the closed region.

d) The number of pixels constituting the closed region.

e) The ratio between b and d.

f) The peripheral length of the closed region.

g) The ratio between f and the square root of d.

According to the present invention, similar shapes can be found accurately by using the above feature amounts instead of calculating the barycenter.

In addition, the line drawing can be automatically filled with the top color in the color candidate list.

Further, according to the above-mentioned invention, the seed point can be placed at any point in a closed region since closed regions between the reference picture and the line drawing to be filled are related by the shape and the location, not by the seed point. Thus, the seed point can be set properly by a program. Therefore, the filling process can be performed automatically without the user's judgment and the like, in which the user does not need to check overlapping state between the line drawings. Even when a filling error occurs, the user can change the erroneous color by displaying the color candidate list at any point in a closed region. Thus, the user does not need to be conscious of the seed point.

The above-mentioned image filling method may further includes the steps of:

presenting the filled line drawing to a user;

presenting the color candidate list corresponding to each closed region of the filled line drawing according to a request by the user;

changing a color of a closed region which is specified by the user into a color which is selected by the user from the color candidate list.

Accordingly, it becomes easy for the user to check and correct an erroneous color of the closed region with a minimum movement of a mouse pointer. In addition, the filled line drawing which is checked and corrected by the user may be used as the next reference picture, and the original line drawing may be used as the reference line drawing such that remained unfilled line drawings are automatically filled again according to an instruction. Further, filling errors can be decreased after this.

Further, the image filling method may include the steps of:

generating a color alias list which has aliases corresponding to color information, and storing the color alias list in a storage device;

reading the color alias list from the storage device; and providing color aliases to the color candidate list to be displayed.

Accordingly, the user can select a color easily and accurately.

According to a second aspect of the present invention, the above object of the present invention is achieved by an image filling method comprising the steps of:

extracting color information of each pixel of a line drawing to be filled, wherein the line drawing to be filled includes a colored line which is a boundary line dividing the line drawing to be filled into regions, a color of the boundary line specifying a color used for filling the boundary line;

extracting boundary line information representing whether the each pixel is on the boundary line or not by using the color information;

filling the line drawing except the boundary line by using the boundary line information; and filling the colored line by using the boundary line information.

According to the above-mentioned invention, a region can be filled without affecting any boundary line. In addition, a colored line can be filled without affecting any other region. Thus, the user can perform filling effectively and flexibly according to the conventional rule in producing animation.

According to a third aspect of the present invention, the above object of the present invention is achieved by an image filling method comprising the steps of:

generating color specifying information including predetermined colors and corresponding names;

displaying the color specifying information at coordinates when a user specifies a closed region by pointing the coordinates with a pointing device; and filling the closed region with a color specified by the user from the displayed color specifying information.

According to the third aspect of the present invention, the above object of the present invention is also achieved by an image filling apparatus comprising:

a part for generating color specifying information including predetermined colors and corresponding names according to an instruction by a user;

a storage device;

a part for storing generated color specifying information in the storage device;

a part for reading a line drawing to be filled from the storage device;

a part for displaying the line drawing to be filled on a display;

a part for reading the color specifying information from the storage device;

a part for displaying the color specifying information at coordinates specified by a pointing device on the display by the user;

a part for filling a closed region which includes the coordinates with a color specified by the pointing device from the color specifying information; and a part for storing the line drawing which is filled in the storage device.

According to a fourth aspect of the present invention, the above object of the present invention is achieved by an image processing method comprising the steps of:

inputting image data;

searching the image data for extracting a small region smaller than or equal to a predetermined size; and outputting a list of the small regions.

The above-mentioned image processing method may include the steps of:

providing a mark to an extracted small region by using a small region list (small region table); and displaying the mark wherein the mark is overlaid on the image data so as to alert the user to an unfilled small region, a color which is not changed or the like.

Further, the above-mentioned image processing method may include the steps of:

providing a mark to the small region;

displaying the mark wherein the mark is overlaid on the image data; and asking the user about processing for the small region such that processing specified by the user is performed in an interactive manner.

BRIEF DESCRIPTION OF THE DRAWINGS

The patent or application file contains at least one drawing executed in color. Copies of this patent or patent application publication with color drawing(s) will be provided by the office upon request and payment of the necessary fee.

Other objects, features and advantages of the present invention will become more apparent from the following detailed description when read in conjunction with the accompanying drawings, in which:

FIGS. 4A–4C are diagrams for explaining a method of Japanese patent No.2762753;

FIGS. 5A and 5B, FIGS. 6A and 6B are diagrams for explaining problems of the paint bucket tool;

FIG. 7, FIGS. 8A, 8B, FIGS. 9A and 9B are diagrams for explaining problems of the filling tool with function of filling the colored line;

FIGS. 16A, 16B and 17 are diagrams for explaining problems of the four connected scan fill algorithm and the scan line seed fill algorithm;

FIGS. 23A–23G show examples of feature amounts of separated closed regions;

FIGS. 30A, 30B show flowcharts of a calculation method of the feature amount 7;

FIGS. 31A, 31B show flowcharts of a method of in the case of calculating all the feature amounts simultaneously;

FIG. 32 is a diagram showing the stored feature amount;

FIG. 33 is a diagram showing variations of feature amounts;

FIG. 34 is a diagram showing normalized feature amounts;

FIG. 35 is a diagram showing integrated variations;

FIG. 36 is a diagram showing color candidate lists which are generated in the order of certainty for every closed region of the line drawing to be filled;

FIG. 41 is a diagram of a color alias list generation storing part 106 of the third embodiment;

FIG. 42 is an example of a color alias list;

FIG. 53 is a block diagram of an image filling apparatus according to a fifth embodiment of the present invention;

FIG. 54 shows an example of color specifying information;

FIG. 61 shows a small region table which is generated in small region searching process;

DETAILED DESCRIPTION OF THE PREFERRED EMBODIMENTS

First to Third Embodiments

First, first to third embodiments will be described with reference to figures. These embodiments corresponds to the first object of the present invention.

Figure 1C:
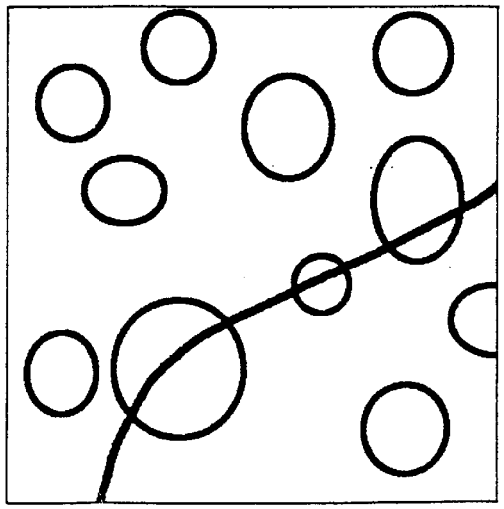
FIGS. 1A–1C are diagrams for explaining filling of boundary lines drawn by colored lines.
Figure 1B:
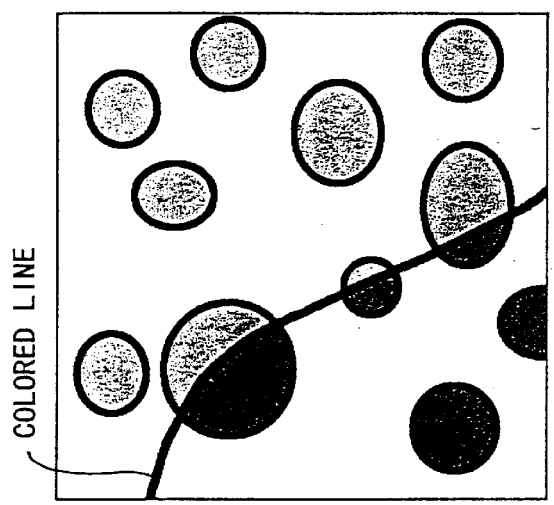
Figure 1A:
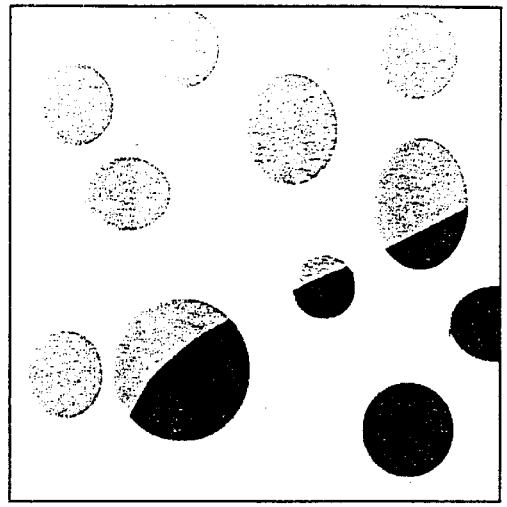
Figure 2A:
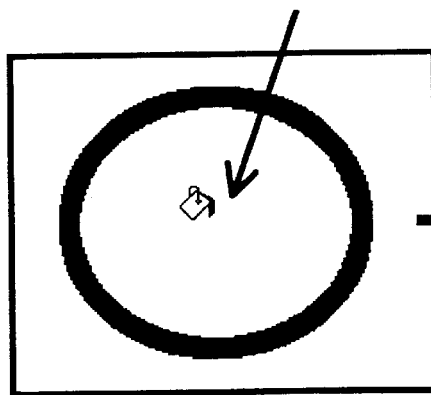
FIGS. 2A–2D show a general example for filling a colored line by using a paint bucket tool.
Figure 2B:
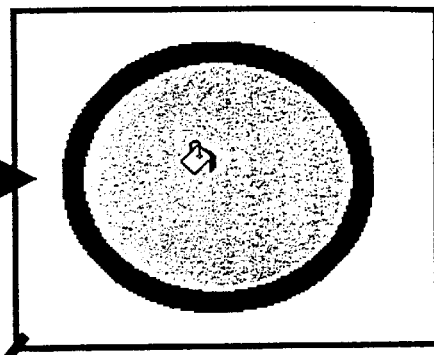
Figure 2C:
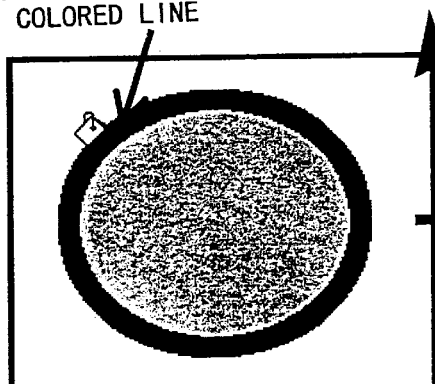
Figure 2D:
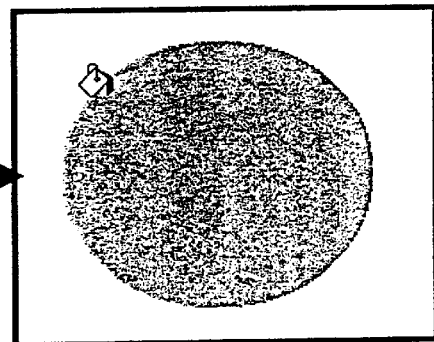
Figures 3A, 3B:
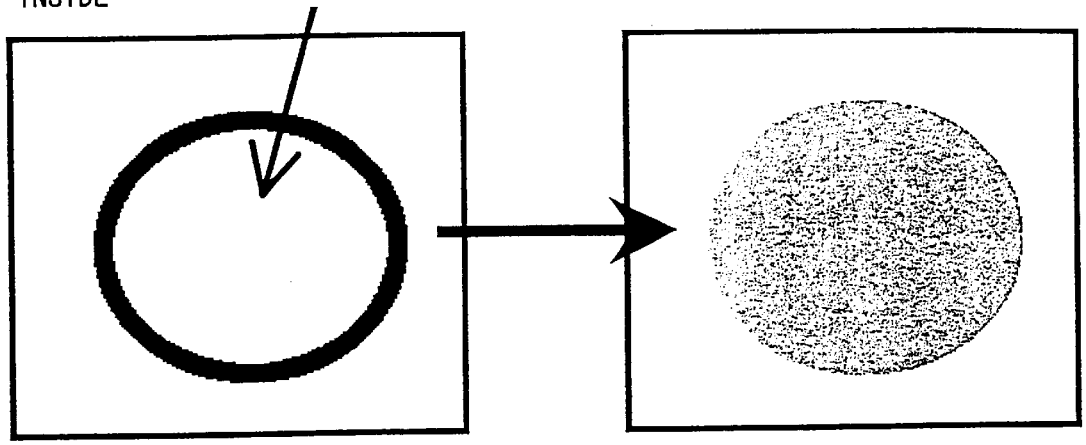
FIGS. 3A and 3B show a filling process method with function of filling the colored line.
Figure 5A:
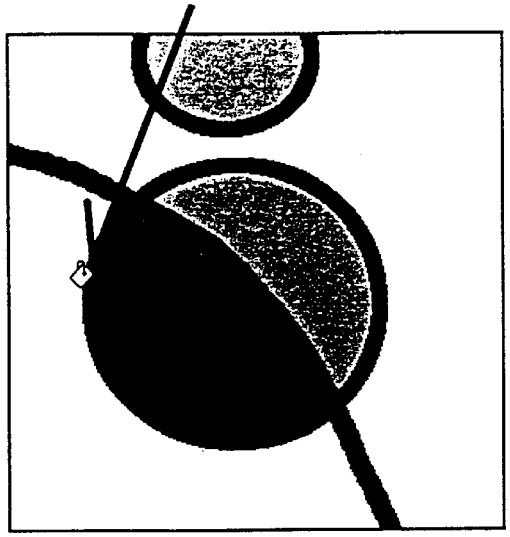
Figure 5B:
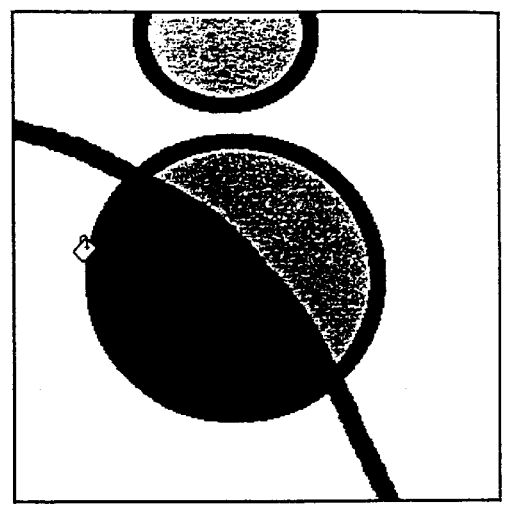
Figure 7:
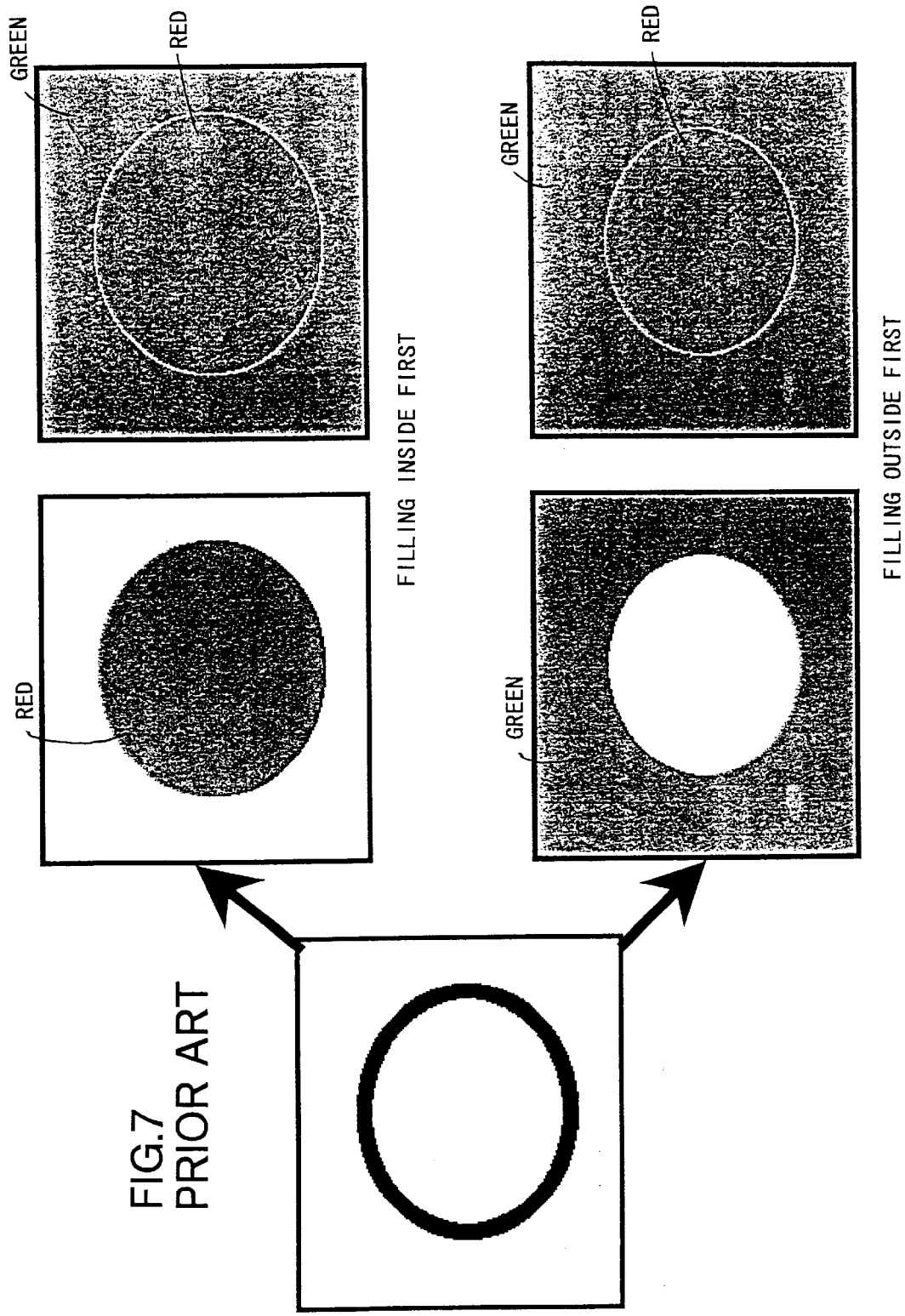
Figures 9A, 9B:
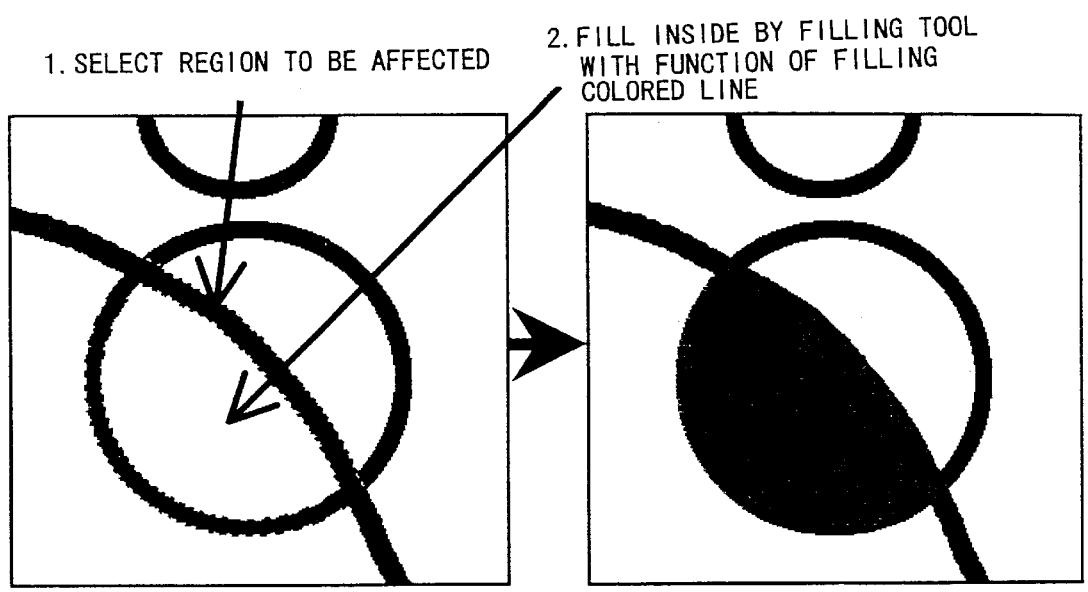
Figure 10A:
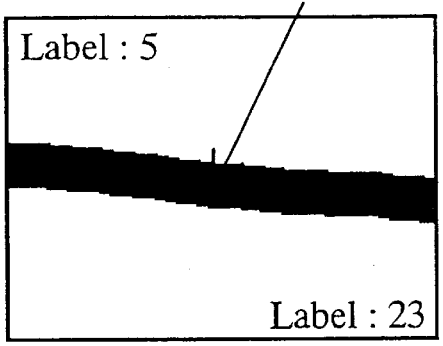
FIGS. 10A–10D are diagrams for explaining problems of the method of the Japanese patent No. 2762753.
Figure 10B:
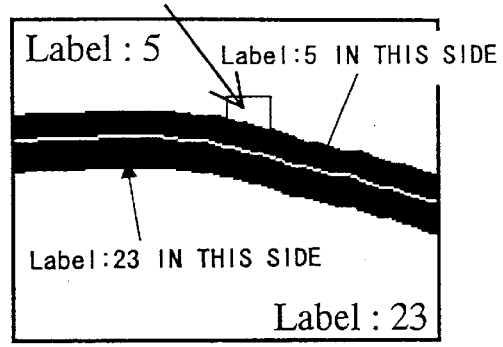
Figure 10C:
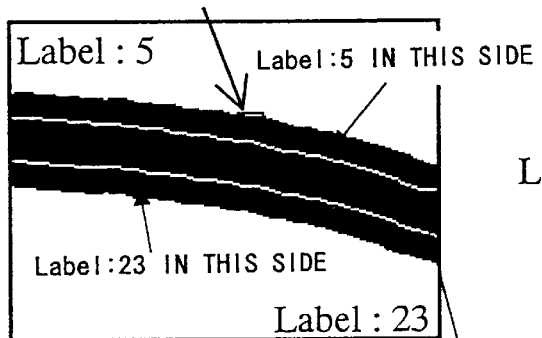
Figure 10D:
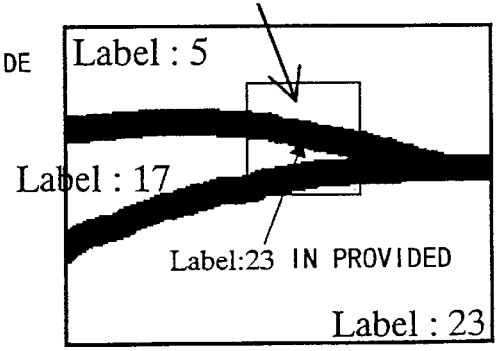
Figure 11A:
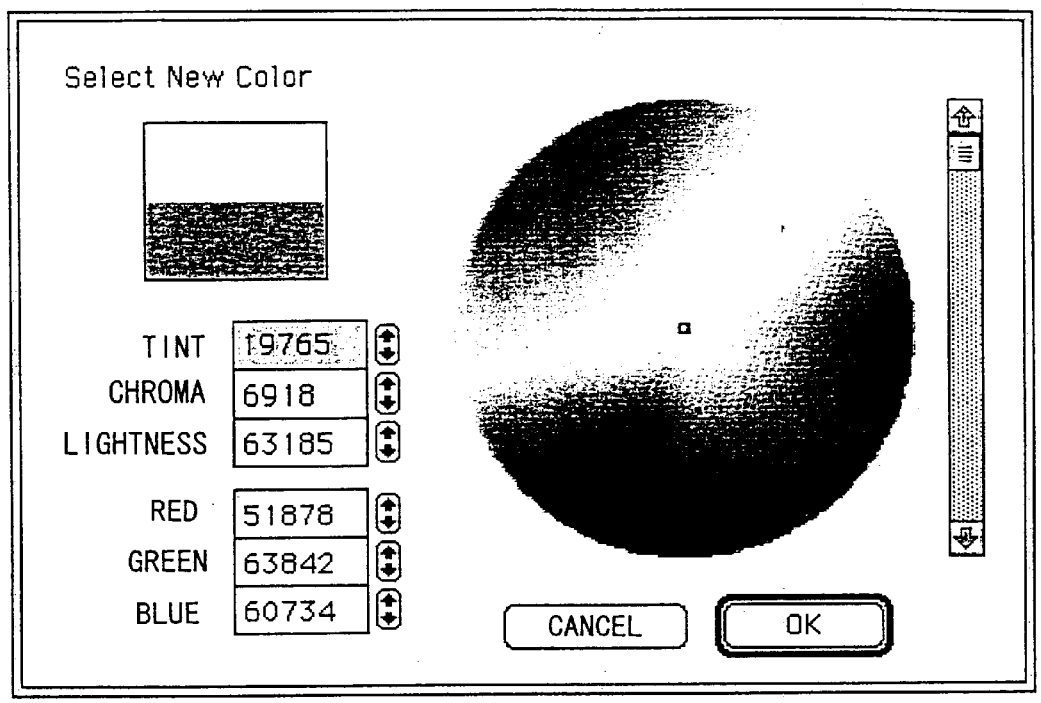
FIGS. 11A and 11B are diagrams for explaining an example of a filling method on a computer according to a conventional technique.
Figure 11B:
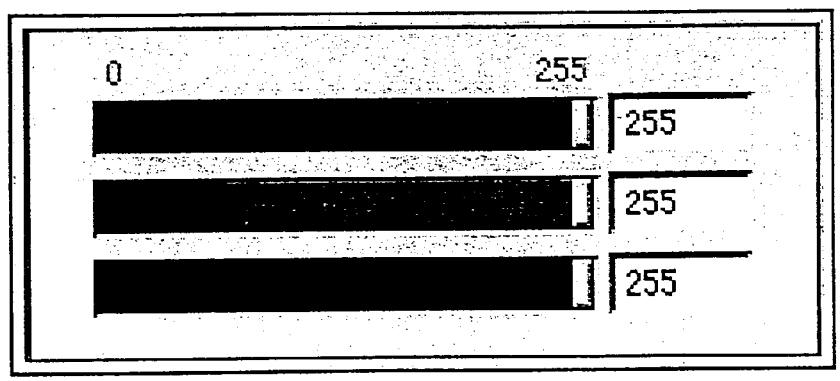
Figure 12A:
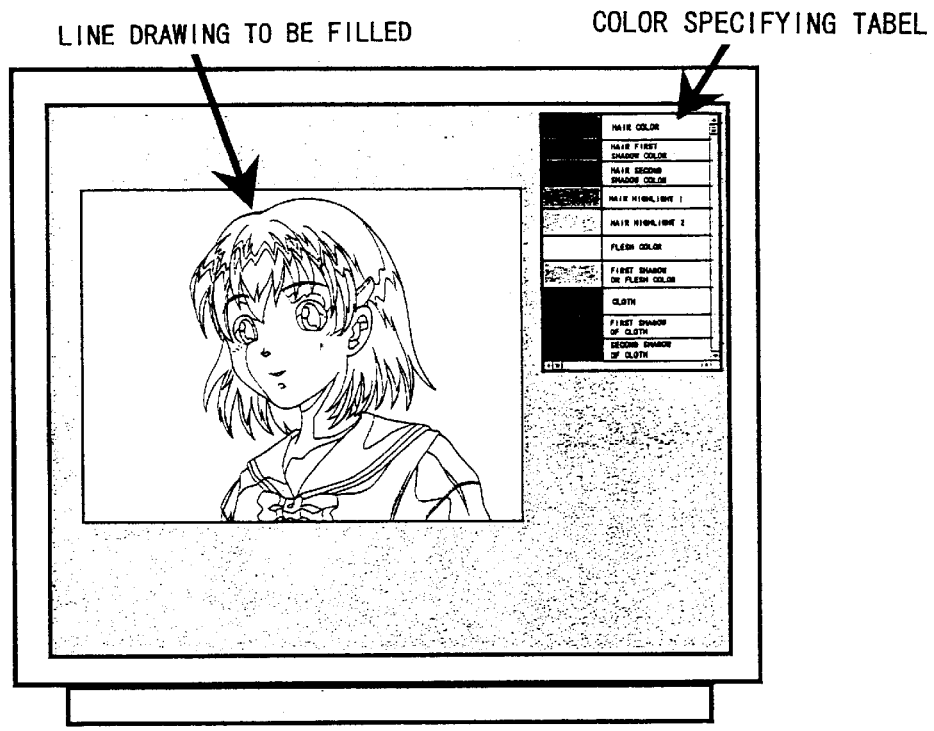
FIGS. 12A and 12B are diagrams for explaining an example of a filling method on a computer according to a conventional technique.
Figure 12B:
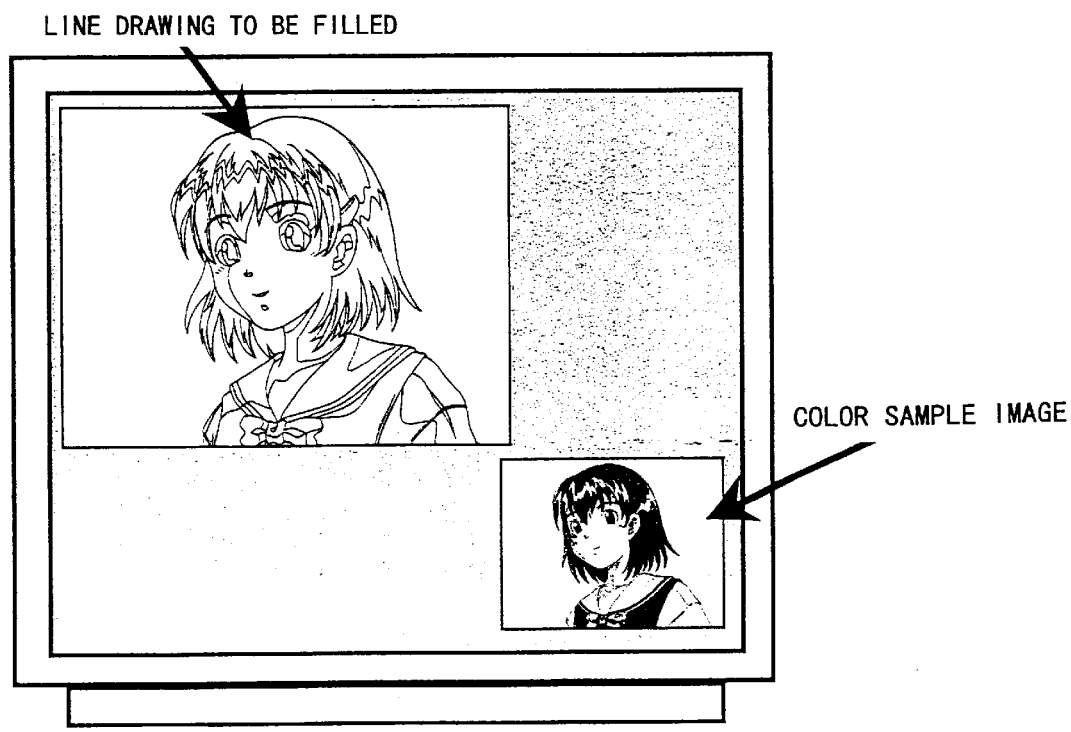
Figure 13:
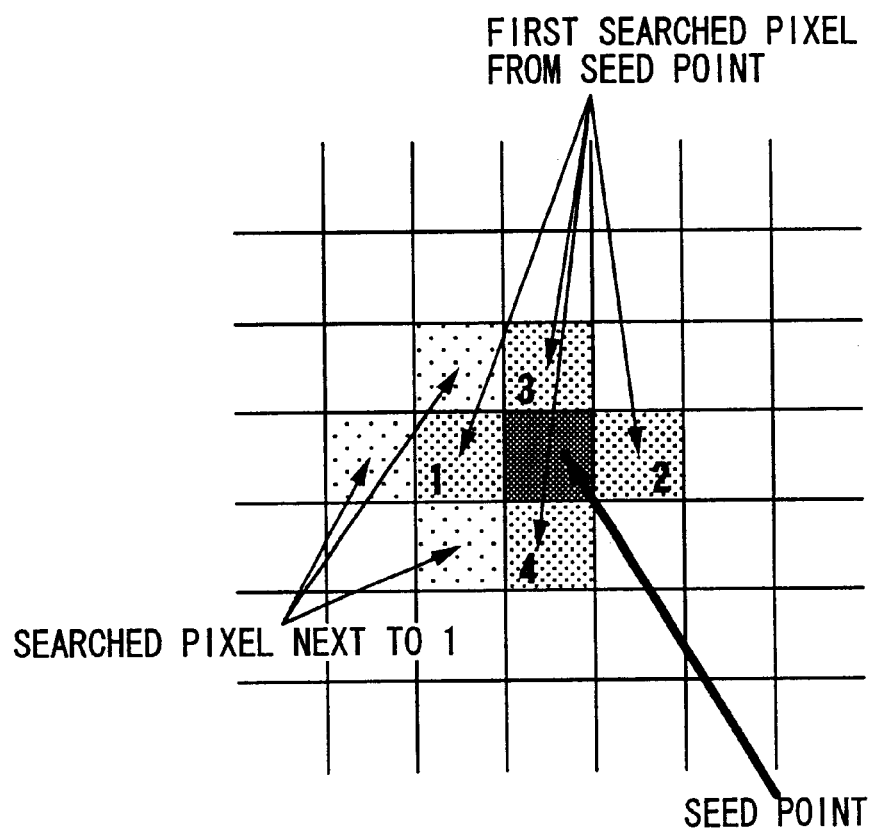
FIG. 13 is a diagram for explaining the four connected pixel seed fill algorithm.
Figure 14:
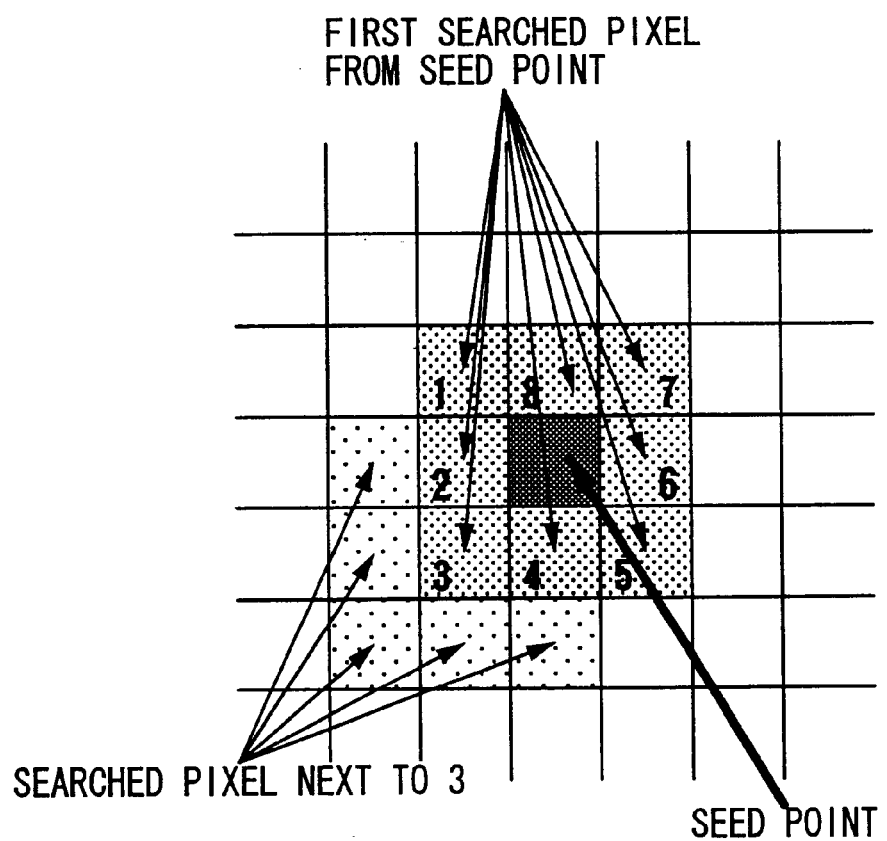
FIG. 14 is a diagram for explaining the eight connected pixel seed fill algorithm.
Figure 15:
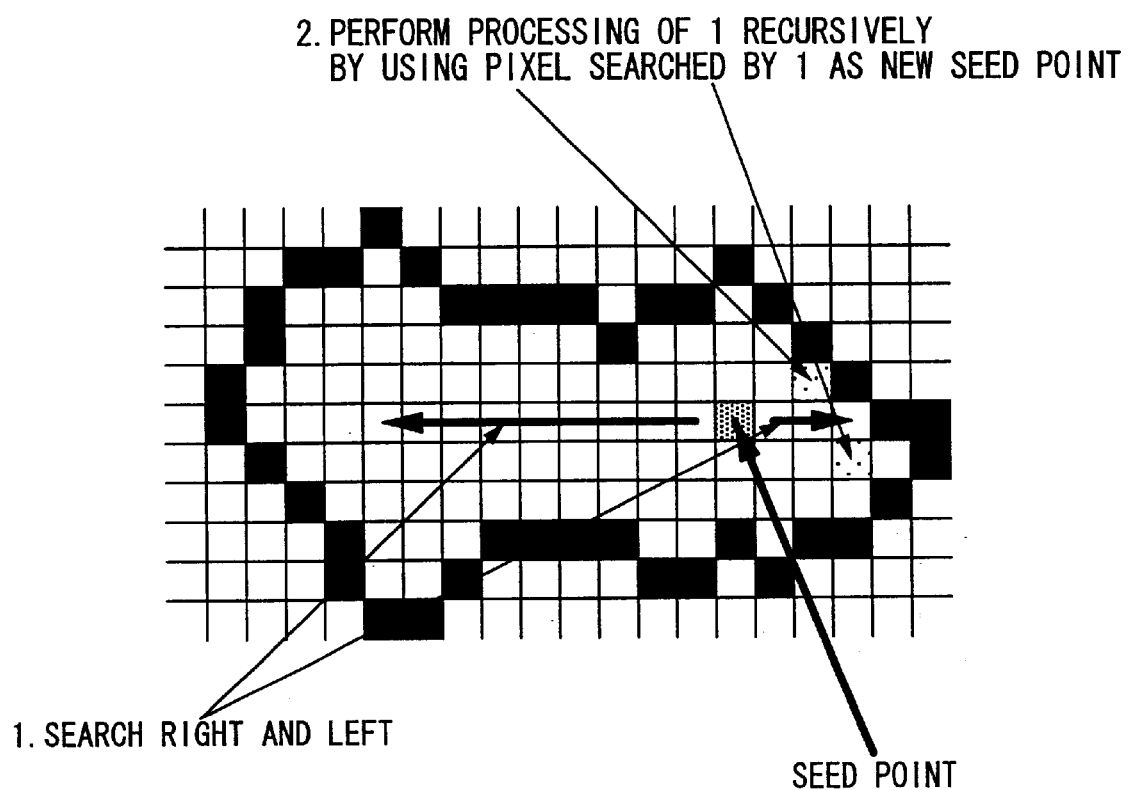
FIG. 15 is a diagram for explaining the scan line seed fill algorithm.
Figures 16A, 16B:
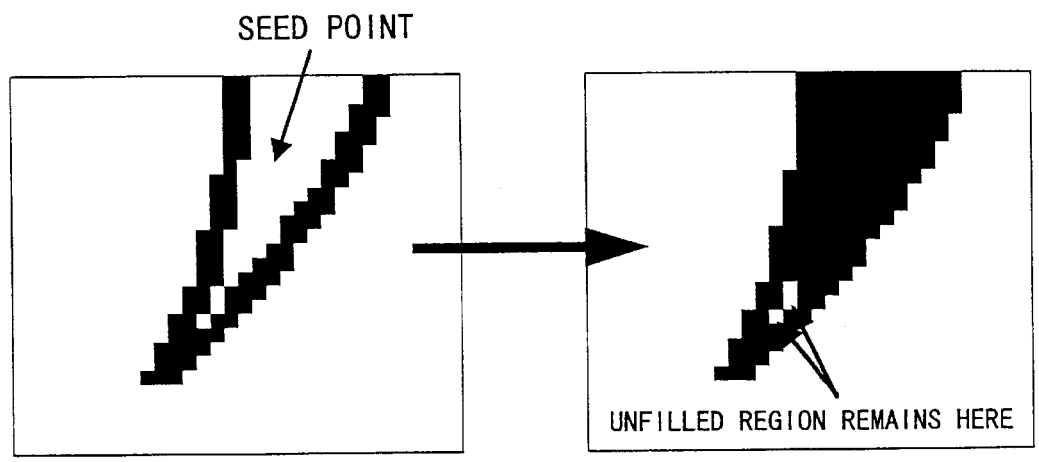
Figure 18:
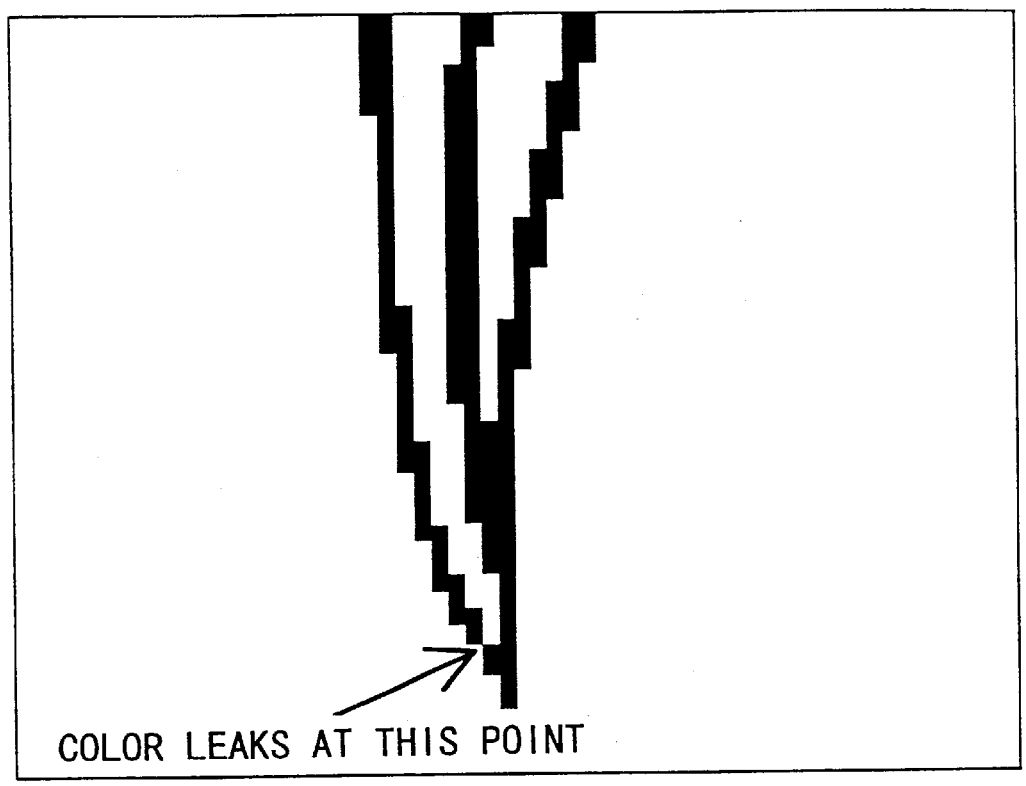
FIG. 18 is a diagram for explaining problems of the eight connected pixel seed fill algorithm.
Figure 19:
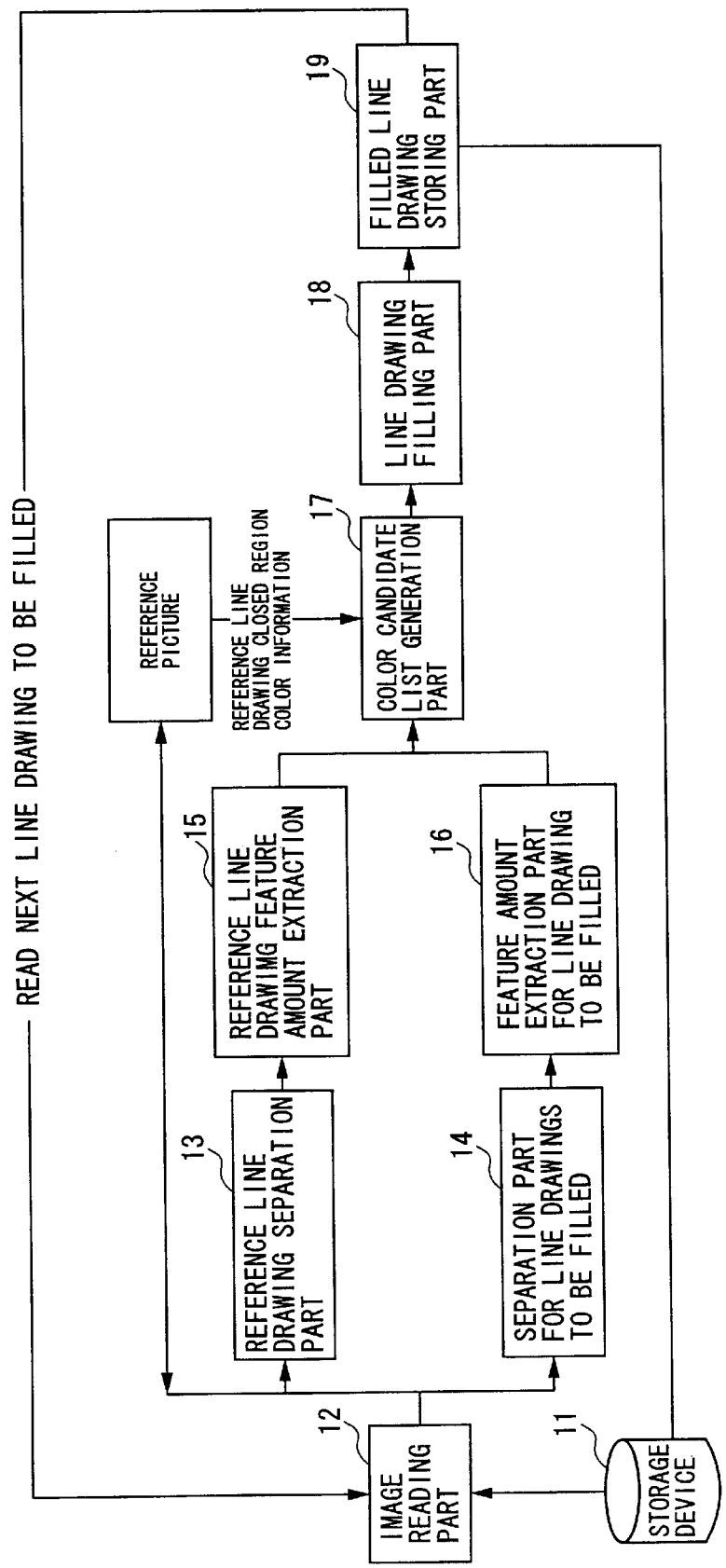
FIG. 19 is a block diagram of an image filling apparatus according to a first embodiment of the present invention.

With reference to FIG. 19, the image filling apparatus according to the first embodiment of the present invention includes a storage device 11, an image reading part 12, a reference line drawing separation part 13, a separation part for line drawings to be filled 14, a reference line drawing feature amount extraction part 15, a feature amount extraction part for line drawing to be filled 16, a color candidate list generation part 17, a line drawing filling part 18 and a filled line drawing storing part 19.

Figure 20:
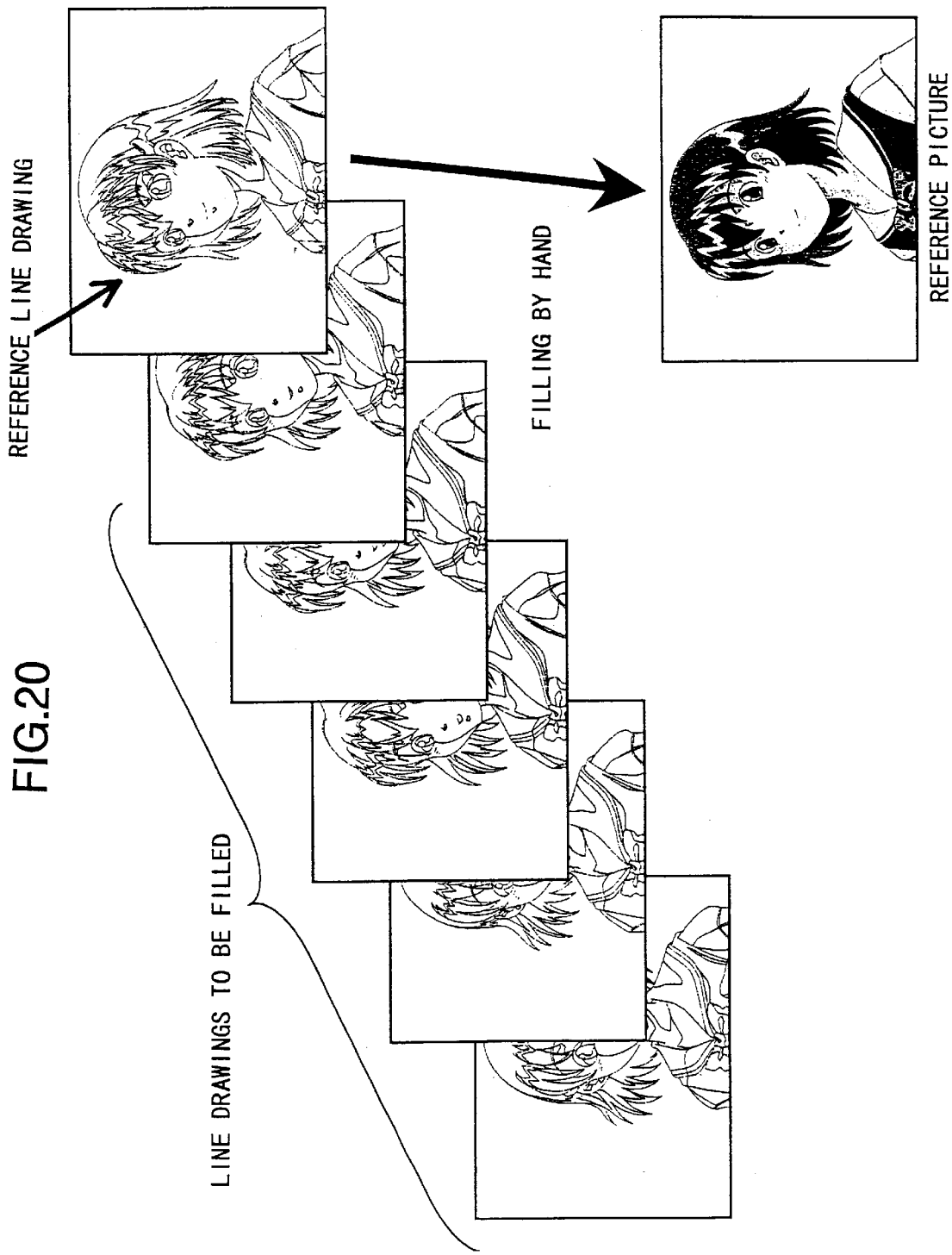
FIG. 20 shows examples of a reference line drawing, a reference picture and a line drawing to be filled.

The storage device 11 stores a reference line drawing, a reference picture and line drawings to be filled as shown in FIG. 20.

The image reading part 12 reads the a reference line drawing, the reference picture and the line drawing to be filled from the storage device 11. In the case when the next line drawing to be filled is filled by using the same reference picture and the same reference line drawing, only the next line drawing to be filled is read from the storage device 11.

The reference line drawing separation part 13 extracts all closed regions which form the reference line drawing. Each closed region to be filled should be completely enclosed by a boundary line (the color is not limited to black), since the closed region is filled digitally.

Figure 21:
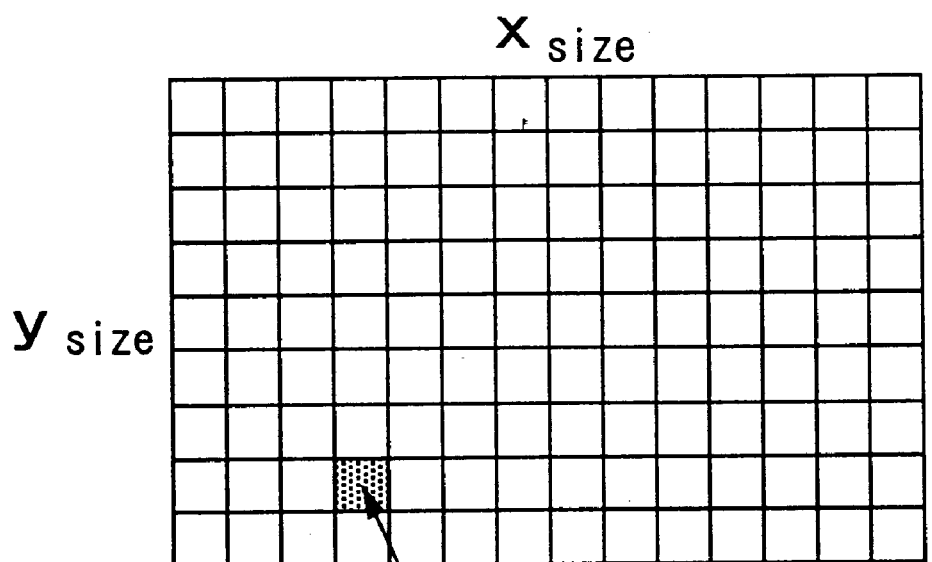
FIG. 21 shows an example of a format of closed region data of the reference line drawing.

There are various method for separating the closed region in an image. In this embodiment, a method will be described as an example in which a different number is assigned to each closed region which constitutes the reference line drawings. FIG. 21 shows an example of the format of the closed region data generated by this method. As shown in this figure, a closed region number is assigned to each pixel wherein the closed region number corresponds to the closed region including the pixel. A special number (possible maximum number in the case shown in FIG. 21) is assigned to a pixel on the boundary line such that it is identified that the pixel is on the boundary line. In addition, by assigning the special number, the boundary line is protected from being filled when filling is performed. The sizes of the x axis direction and the y axis direction are the same as the pixel numbers ($x_{size}$, $y_{size}$) of the x axis direction and the y axis direction of the reference line drawing respectively.

Figure 22A:
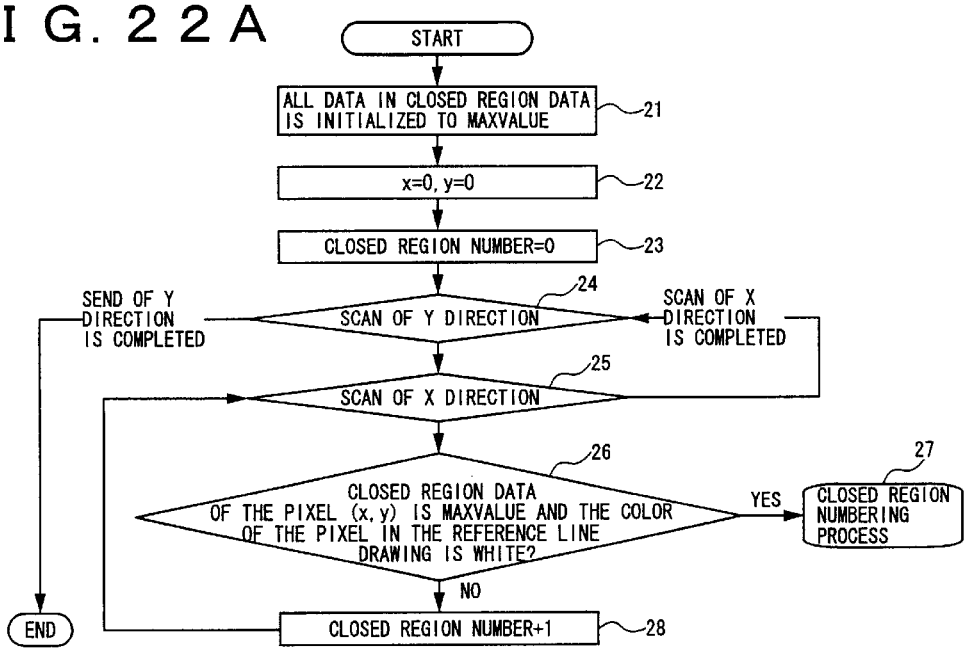
FIGS. 22A and 22B shows flowcharts of a reference line drawing separation part 13.
Figure 22B:
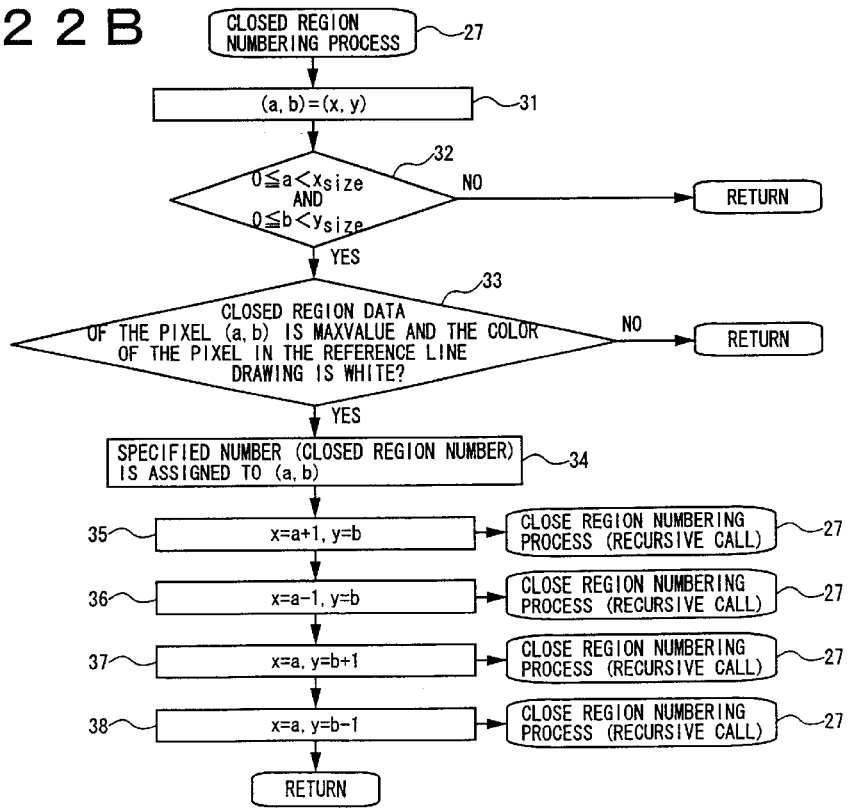

FIGS. 22A and 22B shows flowcharts of the process performed. In step 21, all data in the closed region is initialized to the possible maximum value (MAXVALUE). The MAXVALUE is determined to be more than the number of closed regions which constitute the reference line drawing. In this embodiment, the process starts from the closed region number 0 and (x, y)=(0, 0) in steps 22, 23. (0, 0) is determined as the seed point in this case. When the closed region data of the corresponding pixel is MAXVALUE and the color of the pixel is white (thus, a colored line other than black is treated as a boundary line), the closed region data of the pixel is converted to 0 in steps 24–27. After all data of the object closed region is converted to 0, the closed region data is incremented by 1 in step 28. Then, the same processing is repeated after finding a next seed point in which the color is white and the value is MAXVALUE. As a result, boundary lines which divides the reference line drawing into closed regions have MAXVALUE and each of the closed regions is numbered by a different integer from 0 such that the closed regions are separated.

In the closed region numbering process shown in FIG. 22B, (x, y) is substituted into (a, b) in step 31. If a and b are bigger than 0 and if a and b are smaller than $x_{size}$ and $y_{size}$ respectively and if the color of (a, b) is white and the closed region data is MAXVALUE, a specified number (closed region number) is assigned to (a, b) as closed region data in steps 32–34. Then, after each of a and b is incremented and decremented by 1 in steps 35–38, the closed region numbering process (step 27) is recursively called.

The separation part for line drawings to be filled 14 performs the same processing to a line drawing to be filled as the reference line drawing separation part 13 performs. As a result, as in the case of the reference line drawing, MAXVALUE is assigned to the boundary line and the closed regions are numbered by integers from 0.

The reference line drawing feature amount extraction part 15 extracts a feature amount for each closed region which is separated by the reference line drawing separation part 13. In this embodiment, the following seven kinds of feature amounts are used as shown in FIGS. 23A–23F.

1. Central coordinates of a rectangular circumscribing the closed region (FIG. 23A)
2. The area of a rectangular circumscribing the closed region (FIG. 23B)
3. The aspect ratio of a rectangular circumscribing the closed region (FIG. 23C)
4. The number of pixels constituting the closed region (FIG. 23D)
5. The ratio between 2. and 4. (FIG. 23E)
6. The peripheral length of the closed region (FIG. 23F)
7. The ratio between the square roots of 6. and 4. (FIG. 23G)

In FIGS. 23A–23G, the boundary line is shown for each closed region for the sake of clarity. In reality, the boundary line is not included in the separated closed region.

In the following, the calculation method of the feature amounts 1–7 will be described.

In the following, $x_{min}(i)$, $x_{max}(i)$g $Y_{min}(i)$, $Y_{max}(i)$ are assumed to be the minimum value, the maximum value of x of the rectangular circumscribing the closed region i, and the minimum value, the maximum value of y of the rectangular circumscribing the closed region i respectively, center(i).x and center(i).y are assumed to be the x coordinate and the y coordinate of the center of the rectangular circumscribing the closed region i, area_rec(i) is assumed to be the area of the rectangular circumscribing the closed region i, aspect_ratio(i) is assumed to be the aspect ratio of the rectangular circumscribing the closed region i, pixels(i) is assumed to be the number of pixels constituting the closed region i, circum(i) is assumed to be the peripheral pixel number of the closed region i.

Figure 24A:
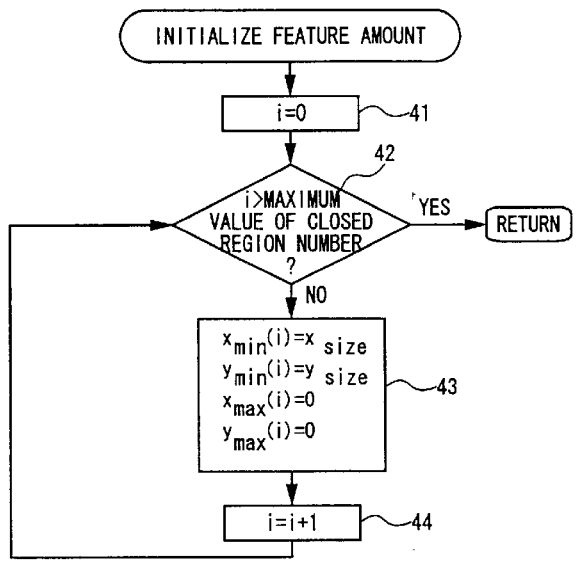
FIGS. 24A, 24B show flowcharts of a calculation method of the feature amount 1.
Figure 24B:
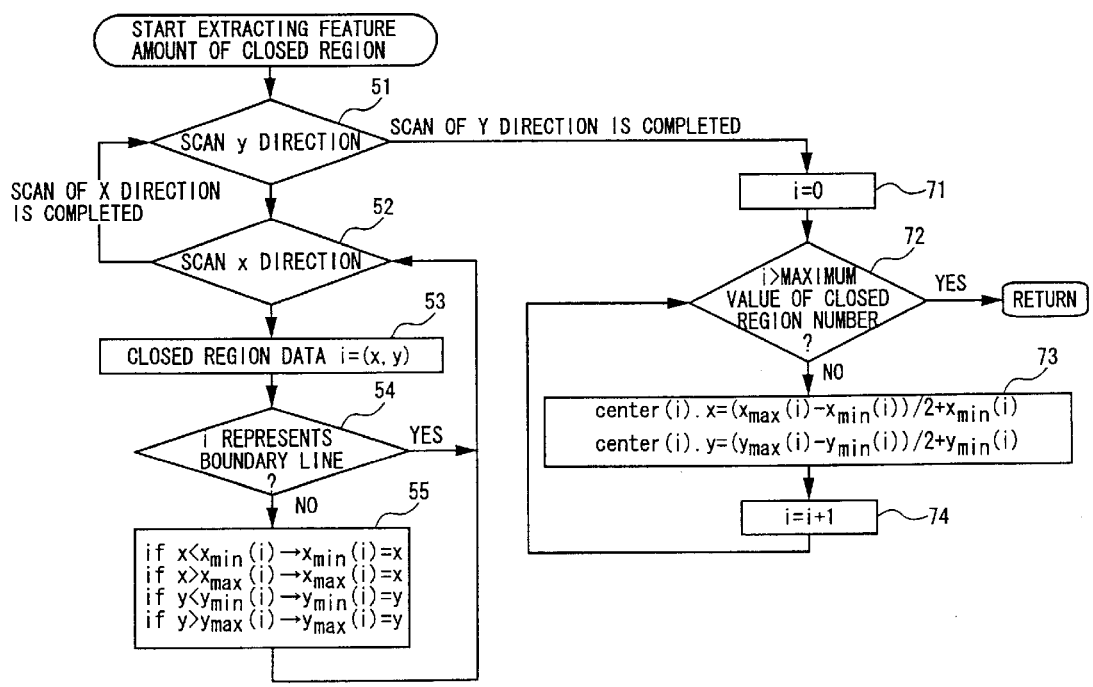

1. the calculation method for the feature amount 1 (FIGS. 24A, 24B)

First, the parameters $x_{min}(i)$, $x_{max}(i)$, $y_{min}(i)$, $Y_{max}(i)$ are initialized. In step 41, the closed region number i is initialized. Then, initialization of $X_{min}(i)=x_{size}$, $Y_{min}(i)=Y_{size}$, $x_{max}(i)=0$, $Y_{max}(i)=0$ is performed for every region in steps 42–44. Next, as shown in FIG. 24B, the coordinates (center(i).x, center(i).y) of the center of the rectangular circumscribing the closed region i are calculated. In steps 51–53, coordinates (x, y) of the closed region i are scanned and the closed region number of the coordinates is substituted into i. When the closed region number i does not represent the boundary line, x is substituted into $x_{min}(i)$ if $x>x_{min}(i)$, x is substituted into $x_{max}(i)$ if $x>x_{max}(i)$, y is substituted into $y_{min}(i)$ if $y<y_{min}(i)$, y is substituted into $y_{max}(i)$ if $y>y_{max}(i)$ in steps 54 and 55. When the scan is completed, the closed region number i is initialized in step 71. Then, the coordinates (center(i).x, center(i).y) of the center of the rectangular circumscribing the closed region i in steps 72–74 are calculated.

Figure 25A:
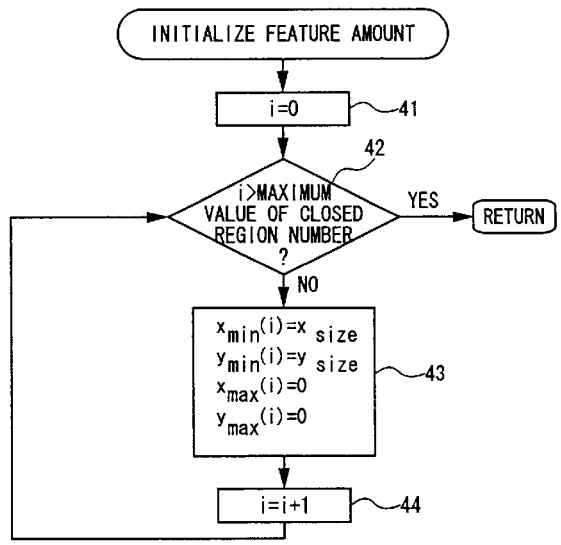
FIGS. 25A, 25B show flowcharts of a calculation method of the feature amount 2.
Figure 25B:
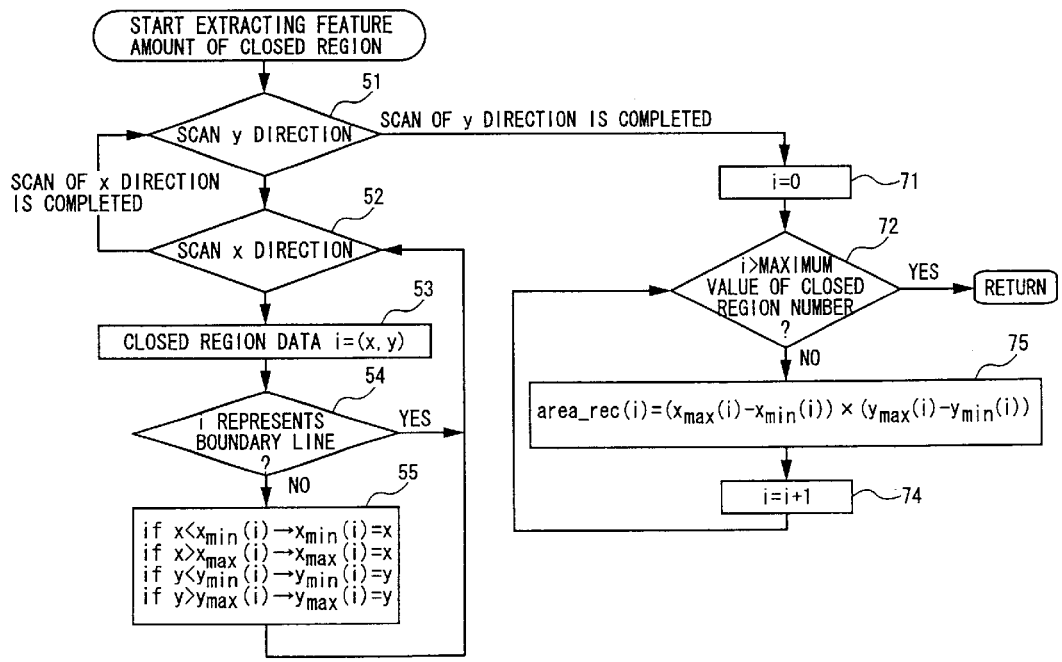

2. The calculation method for the feature amount 2 (FIGS. 25A, 25B) First, the parameters $x_{min}(i)$, $x_{max}(i)$, $y_{min}(i)$, $y_{max}(i)$ are initialized in the same way as the feature amount 1 as shown in FIG. 25A. Next, as shown in FIG. 25B, the area area_rec(i) of the rectangular circumscribing the closed region i is calculated. This processing is the same as the case of the feature amount 1 except that the step 75 is performed instead of the step 73.

3. The calculation method for the feature amount 3 (FIGS. 26A, 26B)

Figure 26A:
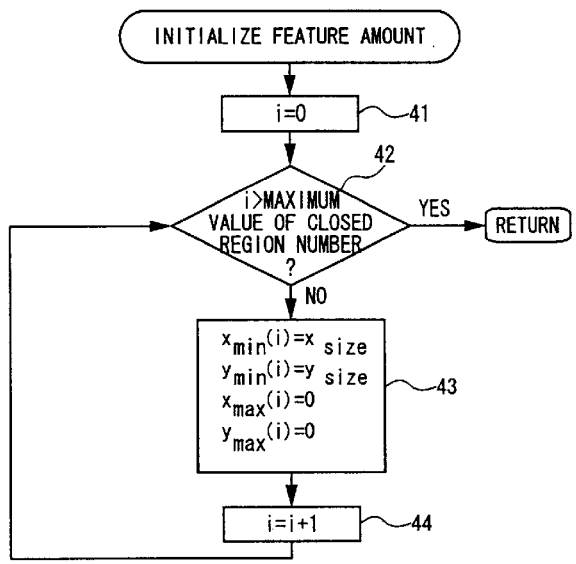
FIGS. 26A, 26B show flowcharts of a calculation method of the feature amount 3.
Figure 26B:
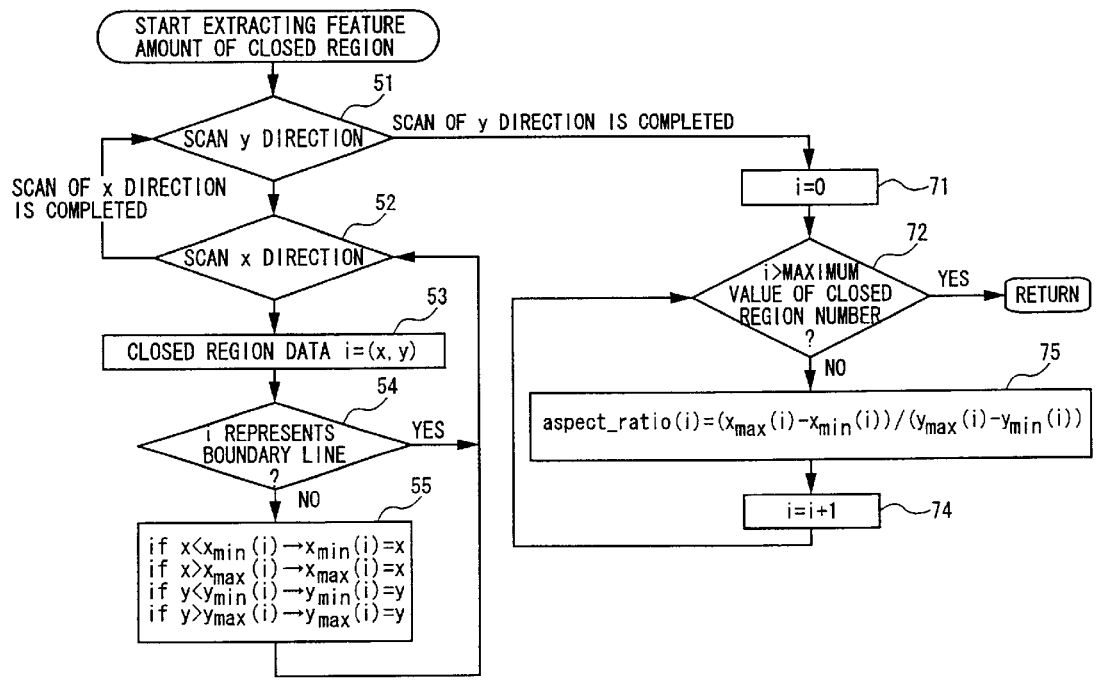

First, the parameters $x_{min}(i)$, $x_{max}(i)$, $y_{min}(i)$, $y_{max}(i)$ are initialized in the same way as the cases of the feature amounts 1, 2 as shown in FIG. 26A. Next, as shown in FIG. 26B, the aspect ratio aspect_ratio (i) of the rectangular circumscribing the closed region i is calculated. This processing is the same as the case of the feature amount 1 except that the step 76 is performed instead of the step 73.

4. The calculation method for the feature amount 4 (FIGS. 27A, 27B)

Figure 27A:
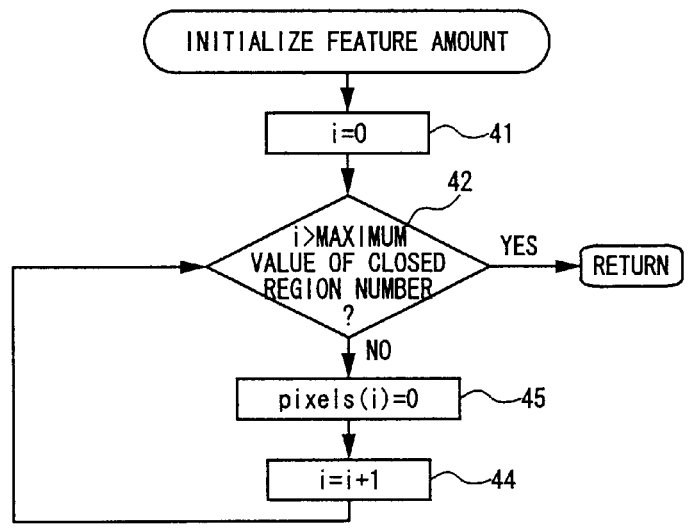
FIGS. 27A, 27B show flowcharts of a calculation method of the feature amount 4.
Figure 27B:
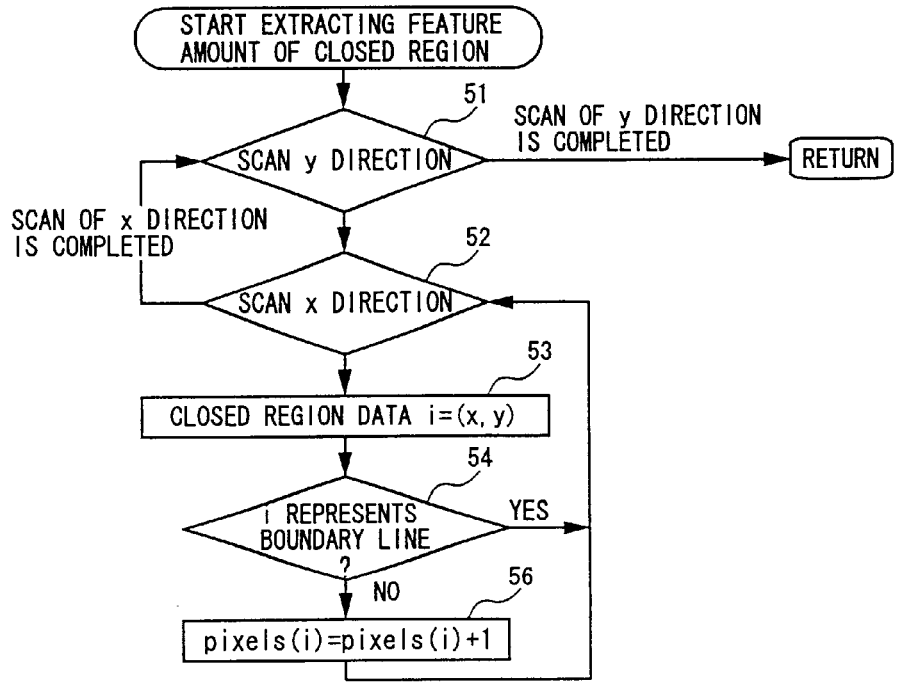

First, the number of pixels pixels(i) in the closed region i which is necessary for calculating the feature amount 4 is initialized as shown in FIG. 27A. For this purpose, the step 45 is performed instead of the step 43 shown in FIG. 24A. Next, as shown in FIG. 27B, the number of pixels constituting the closed region i is calculated. For this purpose, the step 56 is performed instead of the step 55 shown in FIG. 24B and the steps 71–74 are not performed.

5. The calculation method for the feature amount 5 (FIGS. 28A, 28B)

Figure 28A:
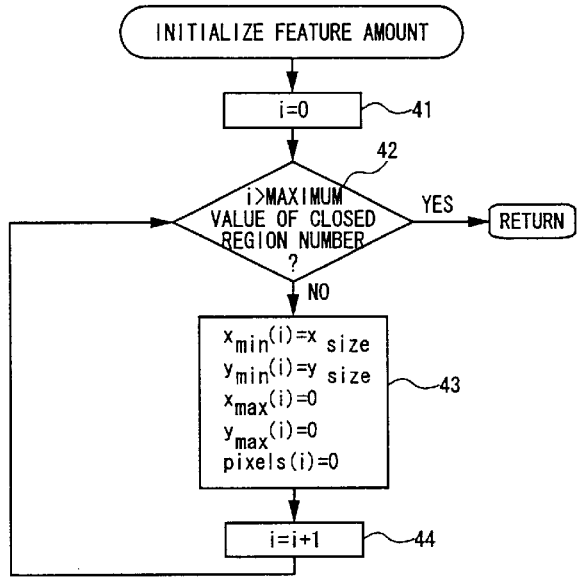
FIGS. 28A, 28B show flowcharts of a calculation method of the feature amount 5.
Figure 28B:
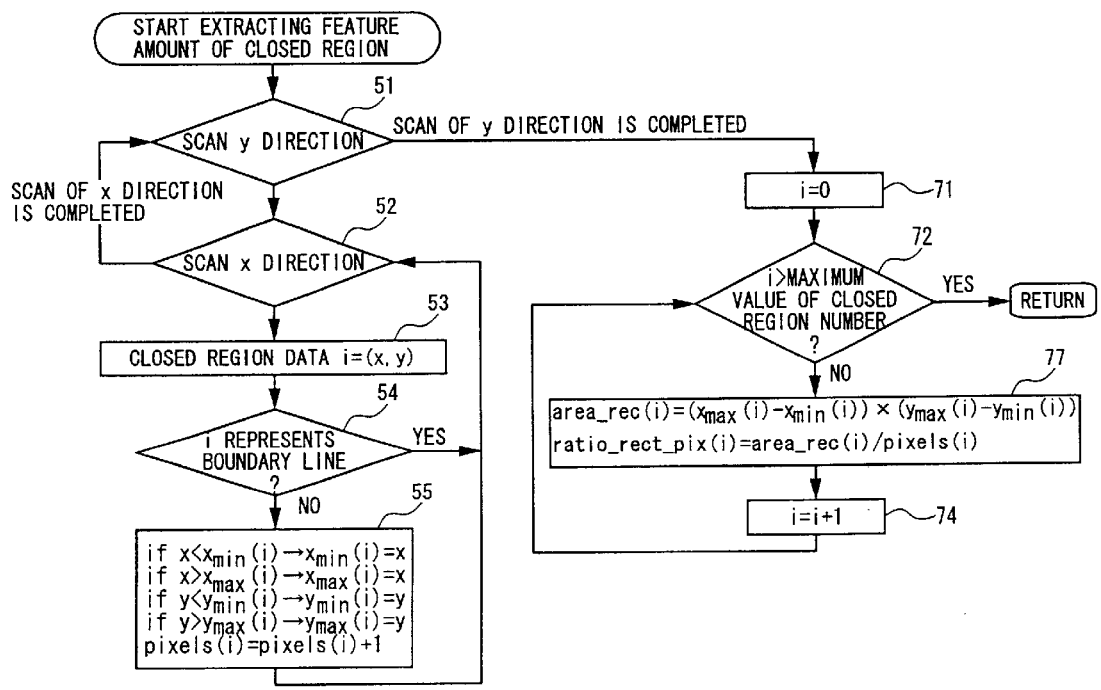

First, $x_{min}(i)$, $x_{max}(i)$, $y_{min}(i)$, $y_{max}(i)$, pixels(i) which are necessary for calculating the feature amount 5 are initialized as shown in FIG. 28A. For this purpose, the step 46 is performed instead of the step 43 shown in FIG. 24A. Next, as shown in FIG. 28B, the ratio between the area and the number of pixels of the rectangular circumscribing the closed region i ratio_rect pix(i) is calculated. For this purpose, the step 57 is performed instead of the step 55 shown in FIG. 24B and the step 77 is performed instead of the step 73.

6. The calculation method for the feature amount 6 (FIGS. 29A, 29B)

Figure 29A:
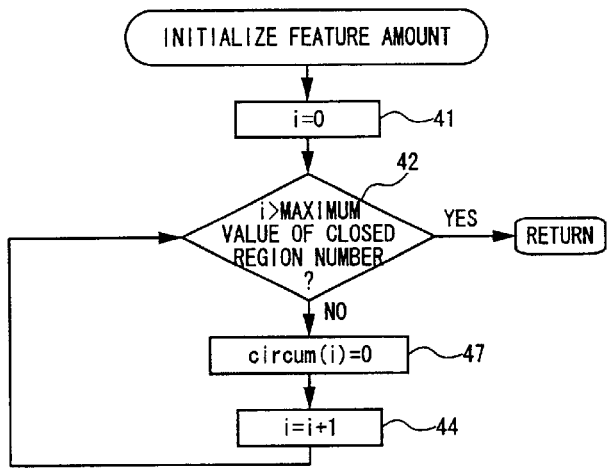
FIGS. 29A, 29B show flowcharts of a calculation method of the feature amount 6.
Figure 29B:
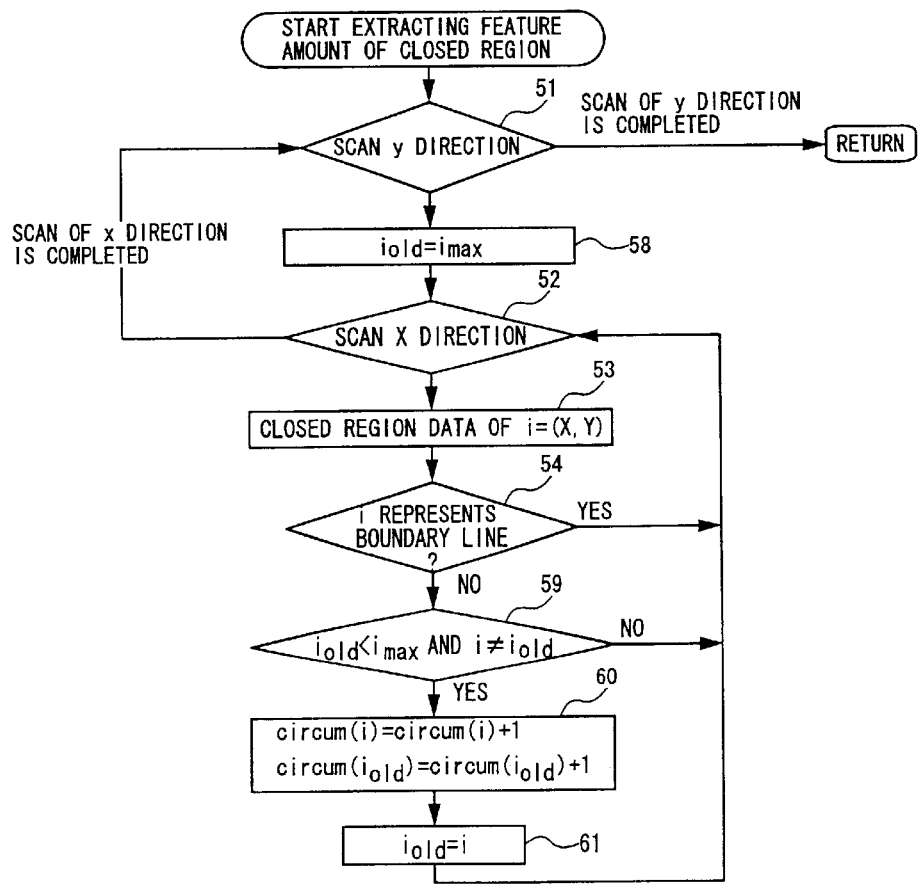

First, the number of pixels constituting the periphery of the closed region i which is necessary for calculating the feature amount 6 are initialized as shown in FIG. 29A. For this purpose, the step 47 is performed instead of the step 43 shown in FIG. 29A. Next, as shown in FIG. 29B, the peripheral length circum(i) of the closed region is calculated. Before the scan of the y axis direction is started, $i_{max}$ which is the possible maximum number for i is substituted into $i_{old}$ which is a closed region number detected just previously in step 58. In step 59, when i does not represent the boundary line, it is judged whether $i_{old<imax}$ and $i \neq i_{old}$ in step 59. When the result is "NO", the process returns to the step 52 since it means that the corresponding pixel is in the outside of the reference line drawing. When the result is "YES", each of circum(i) and circum($i_{old}$) is incremented by 1 in step 60. Then, i is substituted into $i_{old}$ in step 61.

7. The calculation method for the feature amount 7 (FIGS. 30A, 30B)

First, pixels(i) and circum(i) which are necessary for calculating the feature amount 7 are initialized as shown in FIG. 30A. For this purpose, the step 48 is performed instead of the step 43 shown in FIG. 24A. Next, as shown in FIG. 30B, the ratio between the square root of pixels(i) and circum(i) is calculated. For this purpose, the step 62 is added next to the step 54 shown in FIG. 29B.

FIGS. 31A and 31B show the method in which the feature amounts 1–7 are calculated simultaneously such that each feature amount can be calculated with less calculation amount. The steps 49, 63, 78 are performed instead of the steps 48, 62, 77 shown in FIGS. 30A, 30B.

As mentioned above, the feature amounts (feature amounts 1–5 in the following) of all closed regions which constitutes the reference line drawing are calculated and stored for each closed region as shown in FIG. 32.

The feature amount extraction part for line drawings to be filled 16 performs the same processing as the processing by the reference line drawing feature amount extraction part 15 to the line drawing to be filled. As a result, the above-mentioned feature amounts are stored for every closed amount which constitutes the line drawing to be filled.

The color candidate list generation part 17 calculates variation amounts of the feature amounts for all combinations between every closed region of the line drawing to be filled and every closed region of the reference line drawing. The definition of the variation amount differs according to the kind of the feature amount. For example, it is appropriate to consider the variation amount of the feature amount 1 to be the distance between coordinates and to consider the variation amount of the feature amounts 2–5 to be the ratio. For a feature amount, differences may be appropriately used for the variation amount. For every variation amount between the closed region of the line drawing to be filled and the closed region of the reference line drawing, when the variation amount is smaller than one, the inverse of it is calculated, sorted in ascending order and stored as shown in FIG. 33.

FIGS. 33–36 shows the case in which the reference line drawing includes four closed region. In the description for the FIGS. 33–36, the number of the closed region of the line drawings to be filled is not mentioned. There occurs no problem if the number of the closed region between the reference line drawing and the line drawing to be filled is different.

Next, each variation amount of the closed region of the line drawing to be filled is normalized. In this embodiment, when it can be regarded that the smaller the variation amount is, the closer the feature is between the corresponding closed regions of the line drawing to be filled and the reference line drawing, the minimum value $V_{min}$ of the variation amount is normalized to 0.0 and the maximum value $V_{max}$ of the variation amount is normalized to 1.0. As for the above-mentioned five feature amounts, this assumption is applicable.

The value $V_{org}$ between $V_{min}$ and $V_{max}$ can be converted to the following value V by applying simple linear transformation.

$$V = \frac{V_{org} - V_{min}}{V_{max} - V_{min}} \quad (1)$$

This normalization is performed to every variation amount. FIG. 34 shows an example of the result.

Next, the variation amounts which are calculated for each feature amount are integrated and evaluated. The user can specify weights for each of the variation amounts ($V_1$, $V_2$, $V_3$, $V_4$, $V_5$) of feature amounts. In this embodiment, the weights are represented as $W_1$, $W_2$, $W_3$, $W_4$, $W_5$ and these are provided after normalized as $0.0 \leq W_1$, $W_2$, $W_3$, $W_4$, $W_5 \leq 1.0$. By using these weights, integrated variation amounts between every closed region of the line drawing to be filled and every closed region of the reference line drawing are calculated from the following equation.

$$Veq = \sqrt{W_1 \cdot V_1^2 + W_2 \cdot V_2^2 + W_3 \cdot V_3^2 + W_4 \cdot V_4^2 + W_5 \cdot V_5^2} \quad (2)$$

This calculation is performed for each of the variation amounts. Then, the results of the calculation are sorted in ascending order as shown in FIG. 35.

Next, the color corresponding to the closed region of the reference line drawing is extracted from the reference picture. When two or more closed regions of the reference line drawing has the same color on the reference picture, duplication is eliminated from below in the list as shown in FIG. 36. In this way, the color candidate list is generated in the order of certainty for every closed region of the line drawing to be filled as shown in FIG. 36.

The user can specify a threshold for the variation amount of each feature amount. In this case, the combination of the closed regions in which at least a variation amount exceeds the threshold should be below a combination which does not exceed any threshold for every variation amount in the list after being integrated by the formula (2) and sorted. The manipulations for this are performed when performing normalization. For this, the normalization using the formula (1) is performed for values which do not exceed the threshold, wherein $V_{max}$ is regarded as the maximum value which does not exceed the threshold. A value which satisfies the following equation is provided for values which exceed the threshold. For example, the variation amount for the feature amount 1 exceeds the threshold, the value which satisfies the following equation is provided.

$$V_{ex1} > \sqrt{\frac{W_1 + W_2 + W_3 + W_4 + W_5}{W_1}} \quad (3)$$

As a result, even when all of the other variation amounts which are normalized are 0, the integrated variation amount becomes more than an integrated amount in the case when all of normalized variation amount are 1. Thus, the color candidate list may be generated including the value. In addition, the value may be excluded. In the above equation (3), when $W_1 = 0$, the result of the equation becomes indeterminate. In such a case, any value which is substituted into $V_{ex1}$ is not evaluated in the equation (2).

In addition, if the variation amounts of the feature amounts 2 and 4 decreases as the closed region becomes large, for example, when a camera approaches an object or the object approaches the camera, the variation amounts are regarded as exceeding the thresholds. Conversely, if the variation amounts of the feature amounts 2 and 4 increases as the closed region becomes small, for example, when a camera moves away from an object or the object moves away from the camera, the variation amounts are regarded as exceeding the thresholds. As a result of this, the color candidate list becomes more certain.

Figure 37A:
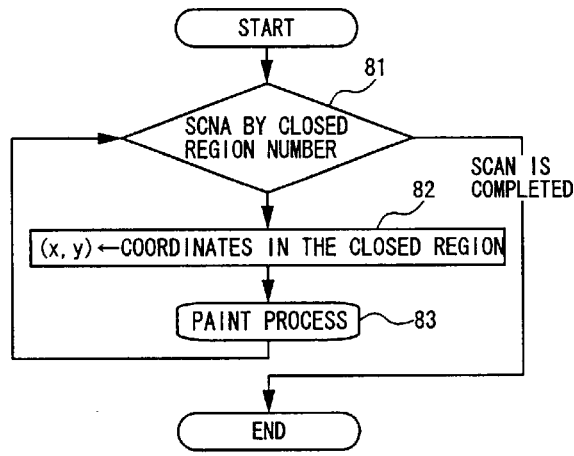
FIGS. 37A and 37B are flowcharts of a method for filling each closed region of the line drawing to be filled with the top color in the color candidate list of the closed region.
Figure 37B:
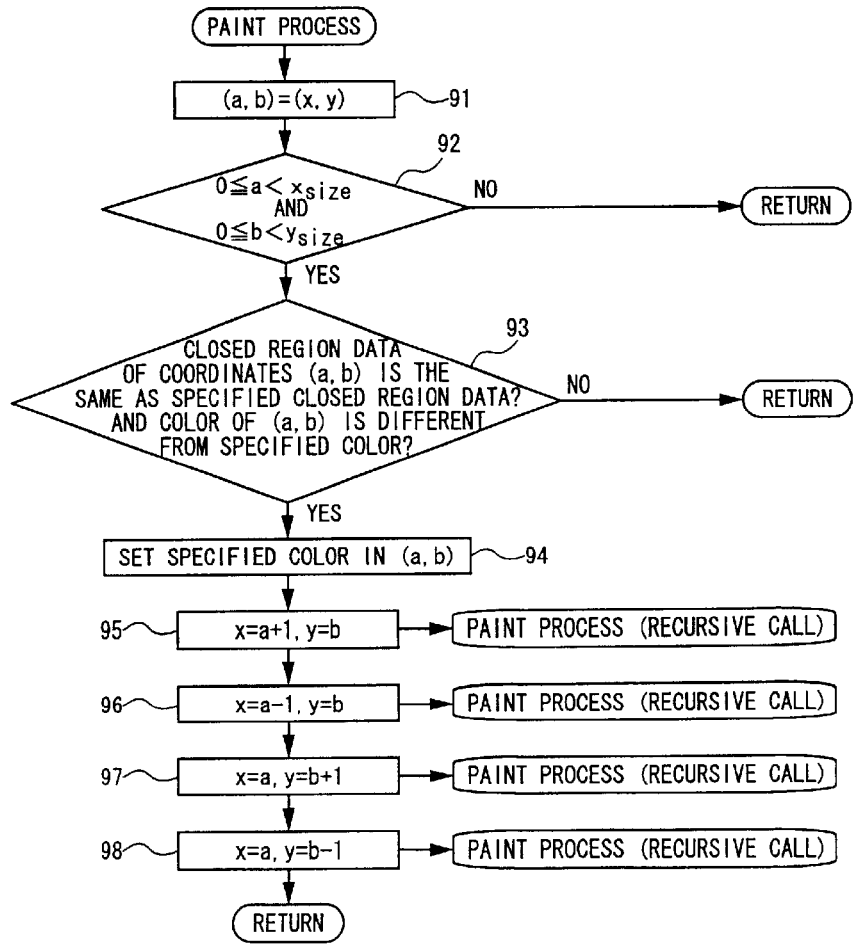

The line drawing filling part 18 colors every closed region of the line drawing to be filled with the top color in the color candidate list for the closed region. There are various methods for filling. In this embodiment, a method which conforms to the above-mentioned separation method of the closed region will be described with reference to FIGS. 37A and 37B.

In steps 81–83, filling is started by pointing coordinates (x, y) in the closed region to be filled as a seed point. If the coordinates (x, y) are appropriate and if the closed region data of the coordinates (x, y) is the same as a specified closed region data, the specified color value is provided to the coordinates in steps 91–94.

Then, each of x and y is incremented or decremented by 1 for performing the above-mentioned process on coordinates around the seed point in steps 95–98. Then, the paint processing is recursively called. According to the above-mentioned process, filling an unrelated closed region with an unrelated color can be prevented such that the boundary line is completely protected.

The filled line drawing storing part 19 stores the filled line drawing which is filled according to the above-mentioned process in the storage device 11. This process will not be described in detail since this process is general.

After completing the above-mentioned process, next line drawing to be filled is read and filled in the same way. When the same reference picture/reference line drawing are used, the image reading part 12 is instructed to read the next line drawing leaving all information on the reference picture/reference line drawing retained. In the case, processing by the reference line drawing separation part 13 and reference line drawing feature amount extraction part 15 is not necessary. In addition, when using the filled line drawing and the original line drawing as a new reference picture/a new reference line drawing, all information of the filled line drawing is moved to the reference picture and all information of the original line drawing is moved to the reference line drawing. After that, the image reading part 12 is instructed to read the next line drawing to be filled. Then, the next line drawing is filled by the above-mentioned processing. If the reference picture/the reference line drawing are newly specified, the above-mentioned process is performed.

Figure 38:
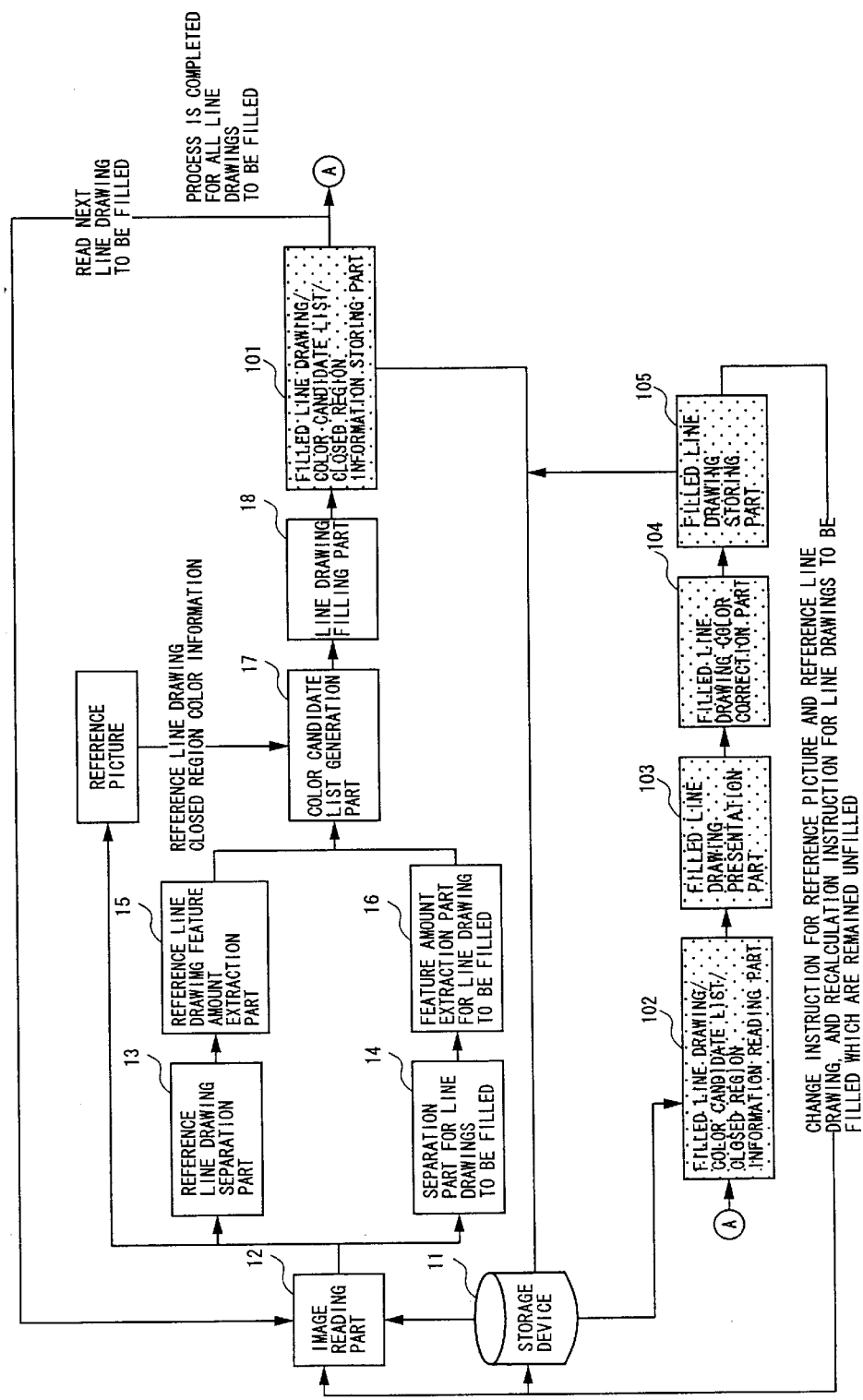
FIG. 38 is a block diagram of an image filling apparatus according to a second embodiment of the present invention.

FIG. 38 is a block diagram showing the image filling apparatus according to a second embodiment of the present invention. This image filling apparatus of the second embodiment includes a filled line drawing/color candidate list/closed region information storing part 101 instead of the filled line drawing storing part 19 of the first embodiment shown in FIG. 19. In addition, a filled line drawing/color candidate list/closed region information reading part 102, a filled line drawing presentation part 103, a filled line drawing color correction part 104 and a filled line drawing storing part 105.

The filled line drawing/color candidate list/closed region information storing part 101 stores only the filled line drawing in the first embodiment. In the second embodiment, the filled line drawing/color candidate list/closed region information storing part 101 stores the corresponding color candidate list and the separated closed line data additionally. Every specified line drawing to be filled is stored in the storage device The filled line drawing/color candidate list/closed region information reading part 102 reads successively the color candidate list and the closed region information corresponding to the filled line drawing from the storage device 11 according to instructions by the user, wherein the color candidate list and the closed region information corresponding to the filled line drawing are obtained by filling processing for all specified line drawings.

The filled line drawing presentation part 103 displays the filled line drawing to a monitor such as a CRT, a LCD and the like.

The filled line drawing color correction part 104 changes a color of a closed region. More specifically, when the user clicks a mouse button on a closed region specified by the mouse pointer in the filled line-drawing displayed on the monitor, the closed region number is identified from the coordinates of the mouse pointer. Then, the color candidate list corresponding to the closed region number is displayed on the filled line drawing in which the color order of the displayed list is the same. When the user selects a color in the list with the mouse pointer, the color of the specified closed region is changed to the selected color. Thus, even when there is an error in colors determined in the first embodiment, the color can be easily changed with a small mouse movement since it is probable that the correct color is in the upper part of the list.

Figure 39:
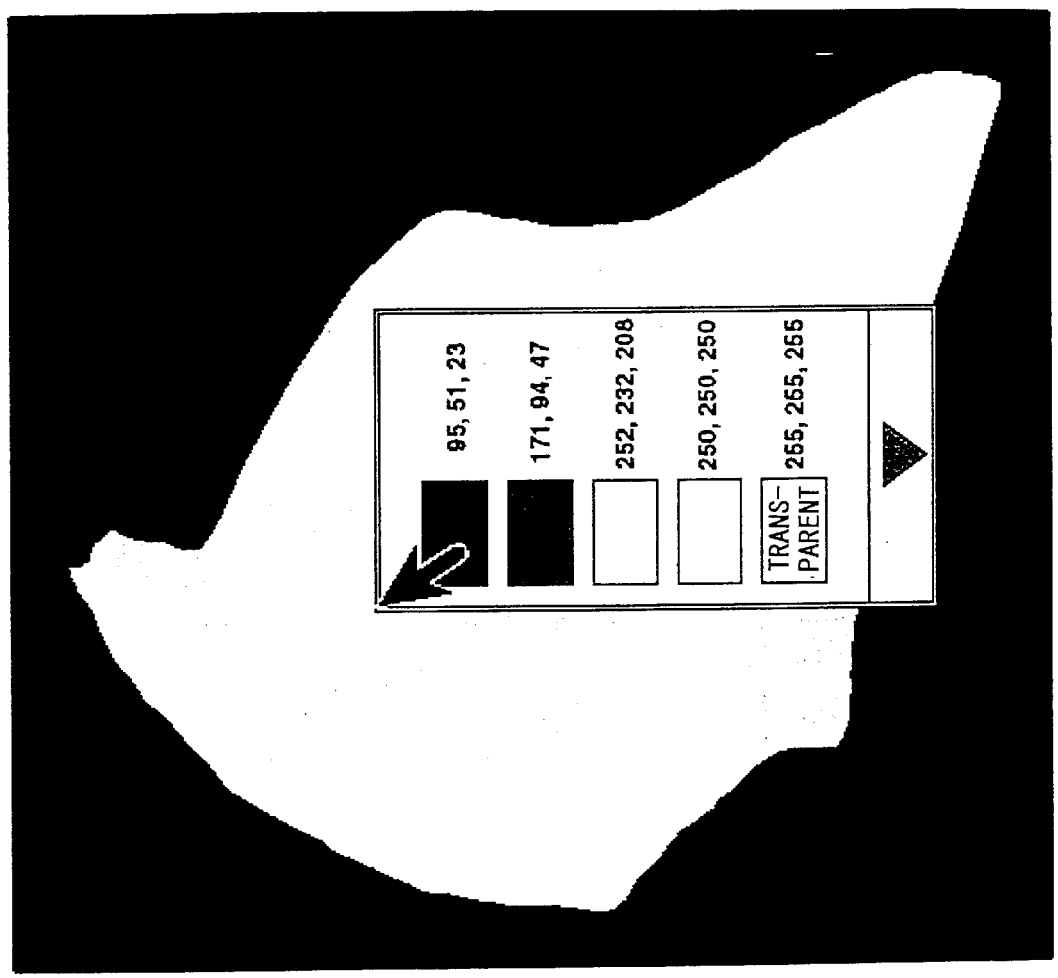
FIG. 39 shows an example of the displayed color candidate list.

FIG. 39 shows an example of the displayed color candidate list. The order of candidate colors is the same as that in the color candidate list obtained in the first embodiment. At the beginning, the region is filled with the top color in the list. If only the colors of the color candidate list are displayed, it becomes difficult to select a color when similar colors are used. Therefore, in this embodiment, the color data is displayed next to the color. In addition, if (R, G, B)=(255, 255, 255) is treated as transparent, it is difficult to recognizes the difference between transparent (255, 255, 255) and white (254, 254, 254) on the screen. In this case, the user can easily recognize the difference since the color data is displayed. Moreover, a description which describes that the color is transparent is displayed on the color (in this case "transparent") such that the user can recognize the color.

When the selected color is different from a color which is already filled, the closed region is filled with the specified color. For this purpose, the processing shown in FIGS. 37A and 37B can be used.

The filled line drawing storing part 105 stores the filled line drawing in which the color is changed in the storage device 11. The corresponding color candidate list is not necessarily stored since it is the same as the stored color candidate list.

When every filled line drawing which is automatically filled in the first embodiment needs to be checked and corrected by the user, the user repeats the above-mentioned operation. The filled line drawing which is checked and corrected by the user may be used as the reference picture, and the original line drawing may be used as the reference line drawing such that line drawings which are remained unfilled are automatically filled again. In this case, the image reading part 12 is instructed to change the reference picture and the reference line drawing, and to calculate the line drawings to be filled. By using the corrected filled line drawing, the line drawings to be filled next can be filled automatically more properly.

Figure 40:
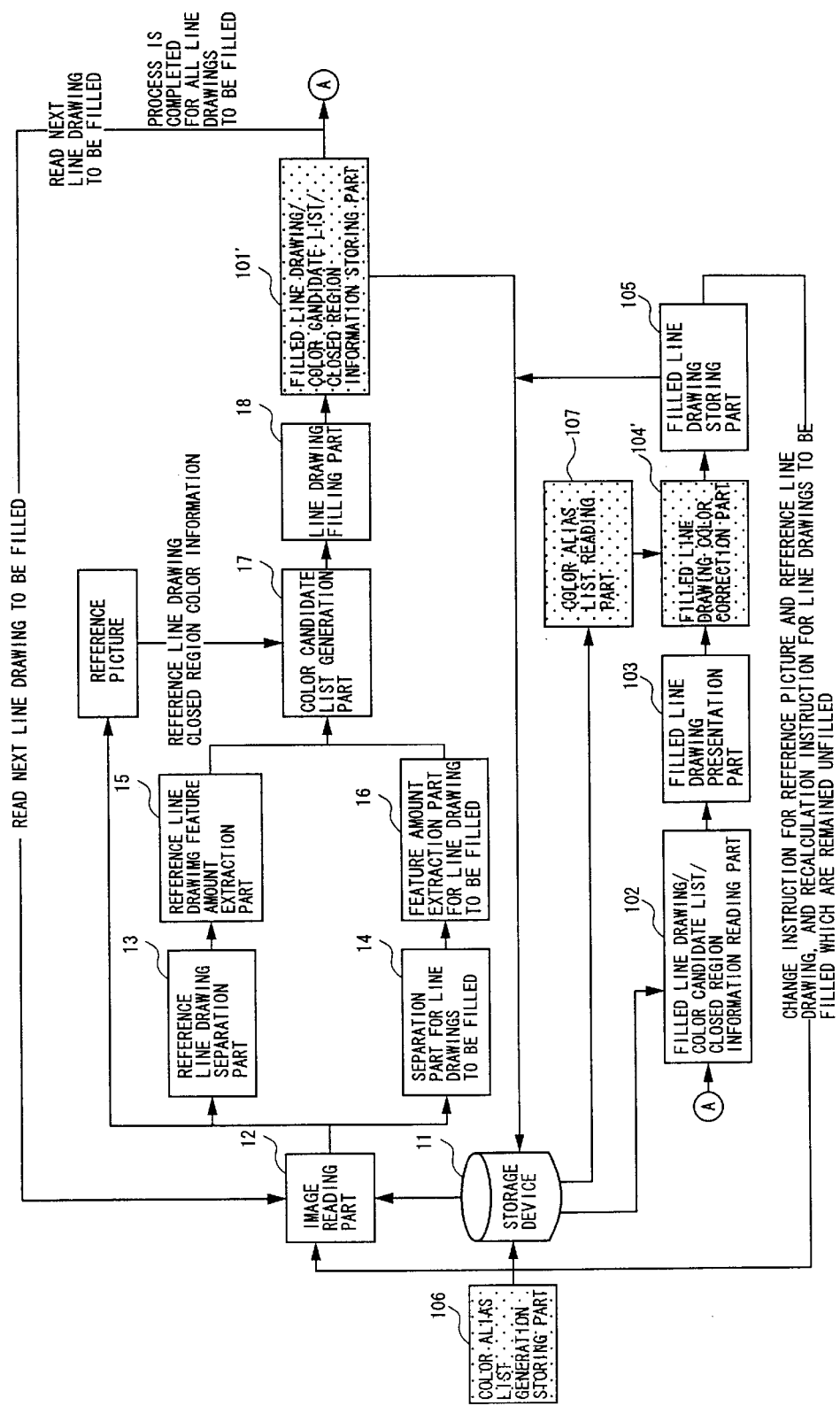
FIG. 40 is a block diagram of an image filling apparatus according to a third embodiment of the present invention.

FIG. 40 shows a block diagram of an image filling apparatus according to a third embodiment of the present invention. The image filling apparatus of the third embodiment includes a filled line drawing/color candidate list/ closed region information storing part 101' and a filled line drawing color correction part 104' instead of the filled line drawing/color candidate list/closed region information storing part 101 and the filled line drawing color correction part 104 of the second embodiment. In addition, a color alias list generation storing part 106 and a color alias list reading part 107 are provided.

The color alias list generation storing part 106 provides and stores aliases of the colors used in a sequence in color correction of the second embodiment. For example, aliases which are easy to identify and are self-explanatory for performing color correction in the second embodiment are entered as shown FIG. 41. The color alias list is stored in the form shown in FIG. 42.

The color alias list reading part 107 reads one or a plurality of color alias lists stored in the storage device 11.

Figure 43:
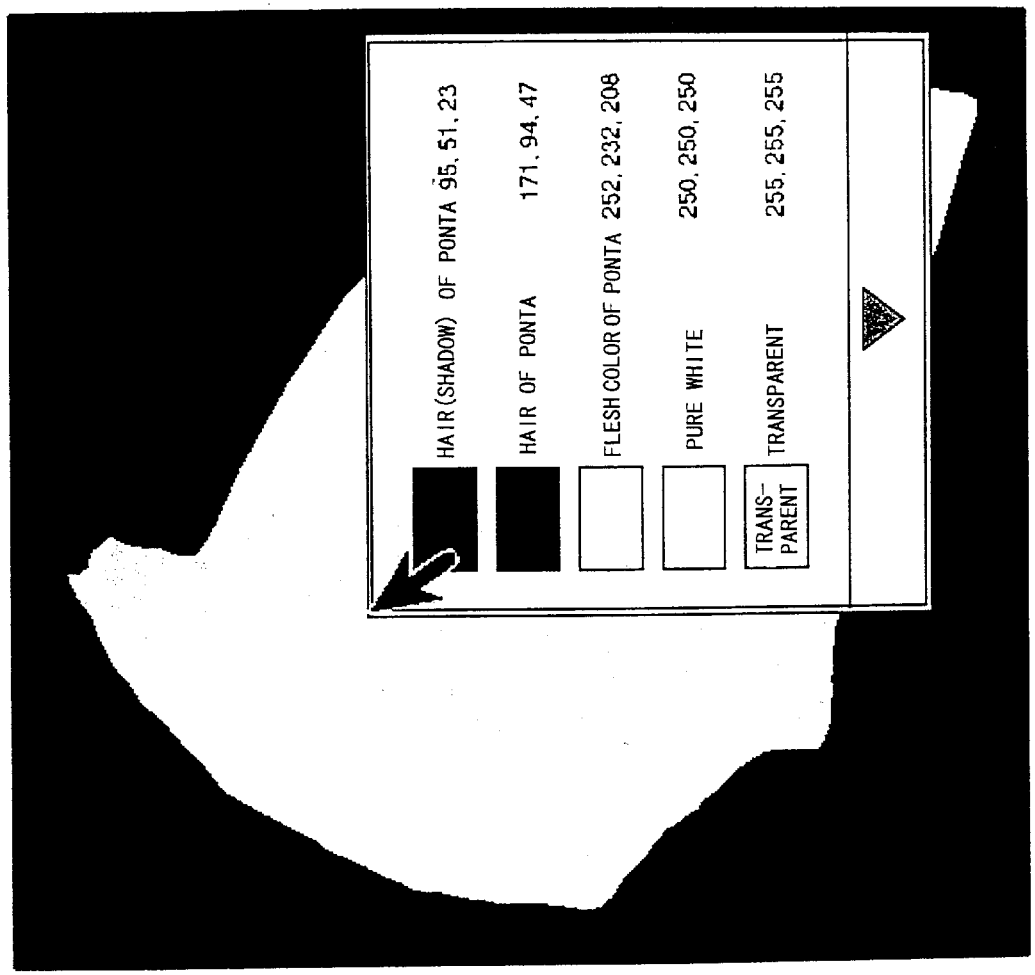
FIG. 43 is an example in which the color alias list is displayed with corresponding color candidate list.

The filled line drawing color correction part 104' displays the color alias list with the corresponding color of the color candidate list as shown in FIG. 43. Thus, an filling error can be checked and corrected more easily than the second embodiment.

Figure 44:
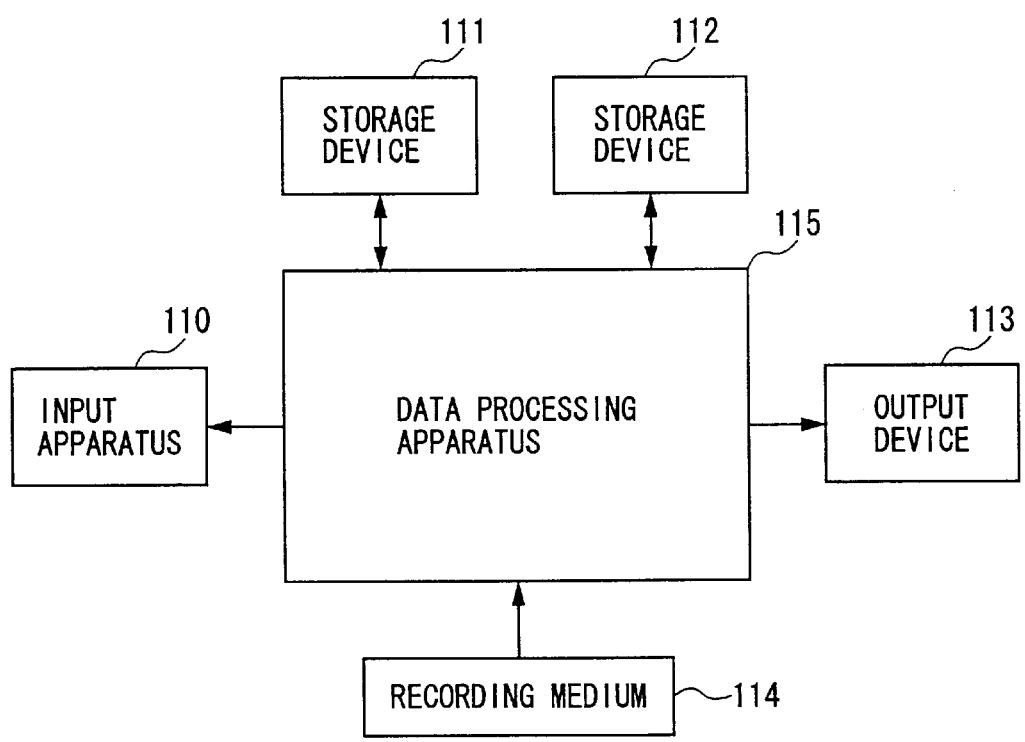
FIG. 44 is a block diagram of another example of the image filling apparatus according to the third embodiment of the present invention.

As shown in FIG. 44, the image filling apparatus of the embodiments of the present invention can also be configured by an input apparatus 110, storage devices 111, 112, an output device 113, a recording medium 114 and a data processing apparatus 115. The input device 110 inputs data such as images. The storage medium 111 corresponds to the storage device 11 in FIGS. 19, 38, 40. The storage device 112 corresponds to a main storage. The output device 113 displays data such as images. The recording medium 114 is, for example, a FD (floppy disk), a CD-ROM, an MO (magneto-optic disk) and the like, and stores a image filling program which has parts shown in FIGS. 19, 38, 40. The data processing apparatus 115 is a CPU which reads the image filling program from the storage device 114 and executes it.

According to the present invention, the computational amount can be decreased when determining the color used for filling the closed region of the line drawing with reference to the reference line drawing. In addition, the color candidate list is generated in which the candidate colors are sorted in the order of certainty for every closed region of the line drawing to be filled. Further, the top color in the list is used for automatically filling. Thus, any unfilled region does not remain.

Furthermore, it is easy to check and correct the error of the color. Thus, the user can save effort for filling.

Fourth Embodiment

Next, the fourth embodiment of the present invention will be described with reference to figures. The fourth embodiment corresponds to the second object.

Figure 45:
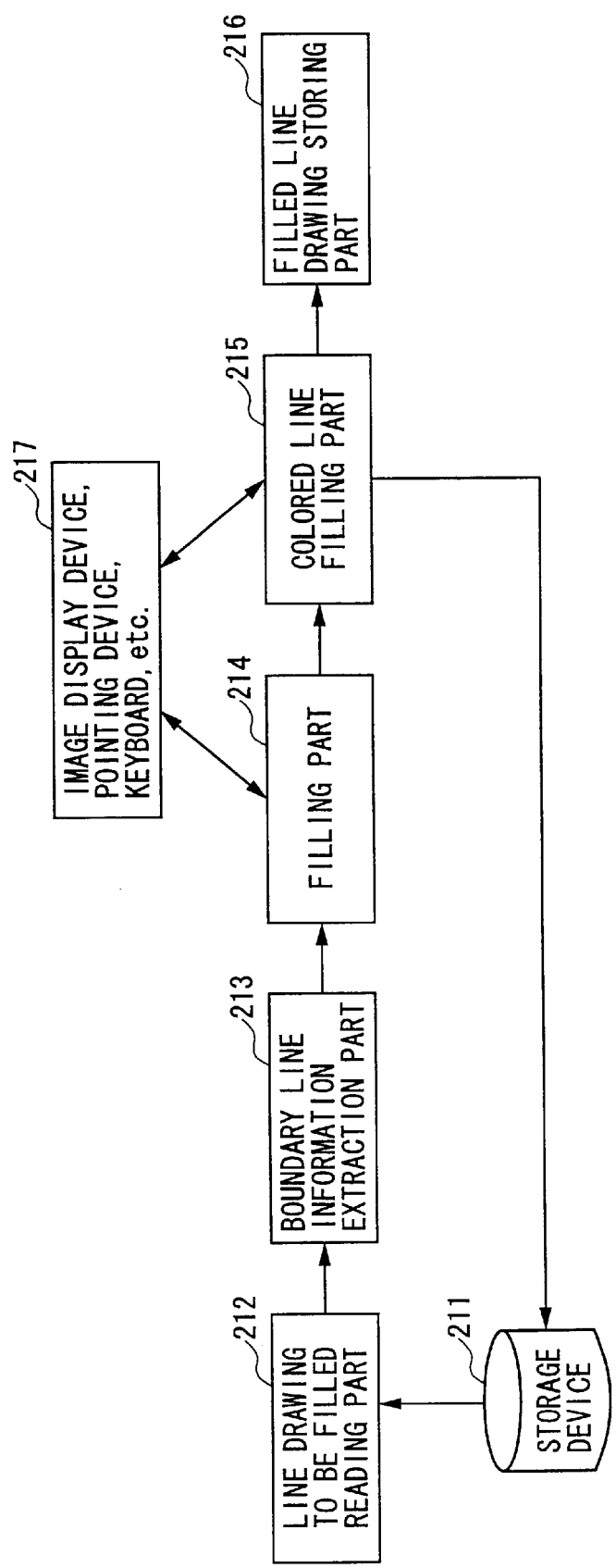
FIG. 45 is a block diagram of an image filling apparatus according to a fourth embodiment of the present invention.

As shown in FIG. 45, the image filling apparatus of the fourth embodiment includes a storage device 211, a line drawing to be filled reading part 212, a boundary line information extraction part 213, a filling part 214, a colored line filling part 215, a filled line drawing storing part 216 and an image display device 217, a pointing device, keyboard and the like.

The storage device 211 stores line drawings to be filled which include colored lines. The line drawing to be filled reading part 212 reads the line drawing to be filled from the storage device 211. The boundary line information extraction part 213 extracts a boundary line by using the color of the line drawing to be filled as a key.

Figure 46:
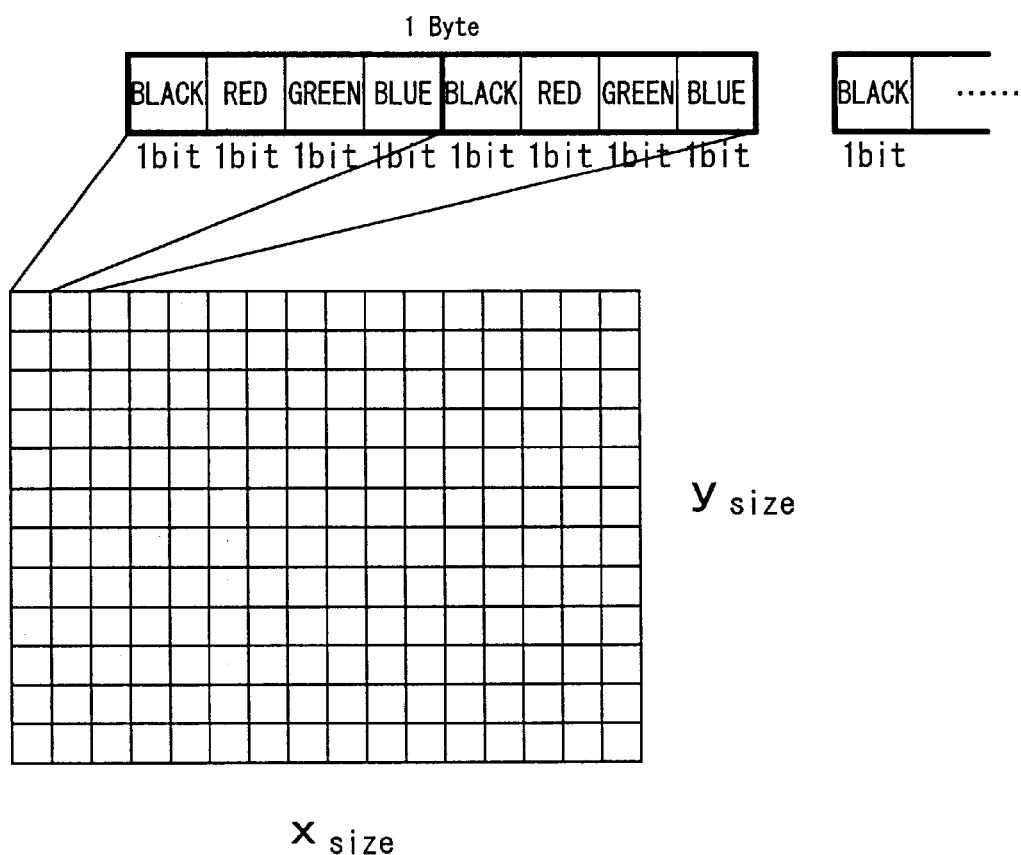
FIG. 46 shows an example of a format of boundary line information.

FIG. 46 shows an example of the boundary line information which is generated. In this embodiment, there are four kinds of boundary lines which are black, red, green, blue (as the colored line, there are three kinds, red, green, blue). One bit is assigned to each pixel of the boundary line information for a color. In the figure, $X_{size}$ and $y_{size}$ represent the number of pixels horizontally and vertically respectively. 0 is assigned to a pixel of the region (white) other than the boundary line as the boundary line information. Therefore, there are five kinds of color information, which are white, black, red, green, blue. Thus, three bits are enough for representing one pixel of the boundary line information since the colors are mutually independent events. However, assigning three bits is equivalent to assigning four bits to the boundary line information for one pixel since memory amount for storing the boundary line information in the case of assigning three bits is the same as that in the case of assigning four bits due to the byte length. In addition, when the user treats the three kinds (red, green, blue) of colored line likewise, two bits are enough. In this case, it becomes impossible to recover the color of the colored line when an error is detected after changing the color of the colored line by after-mentioned colored line filling part 15. However, when there is no problem if the changed color is recovered to a color, for example, red, two bits can be assigned to the boundary line information for one pixel such that the memory amount can be decreased.

Figure 47:
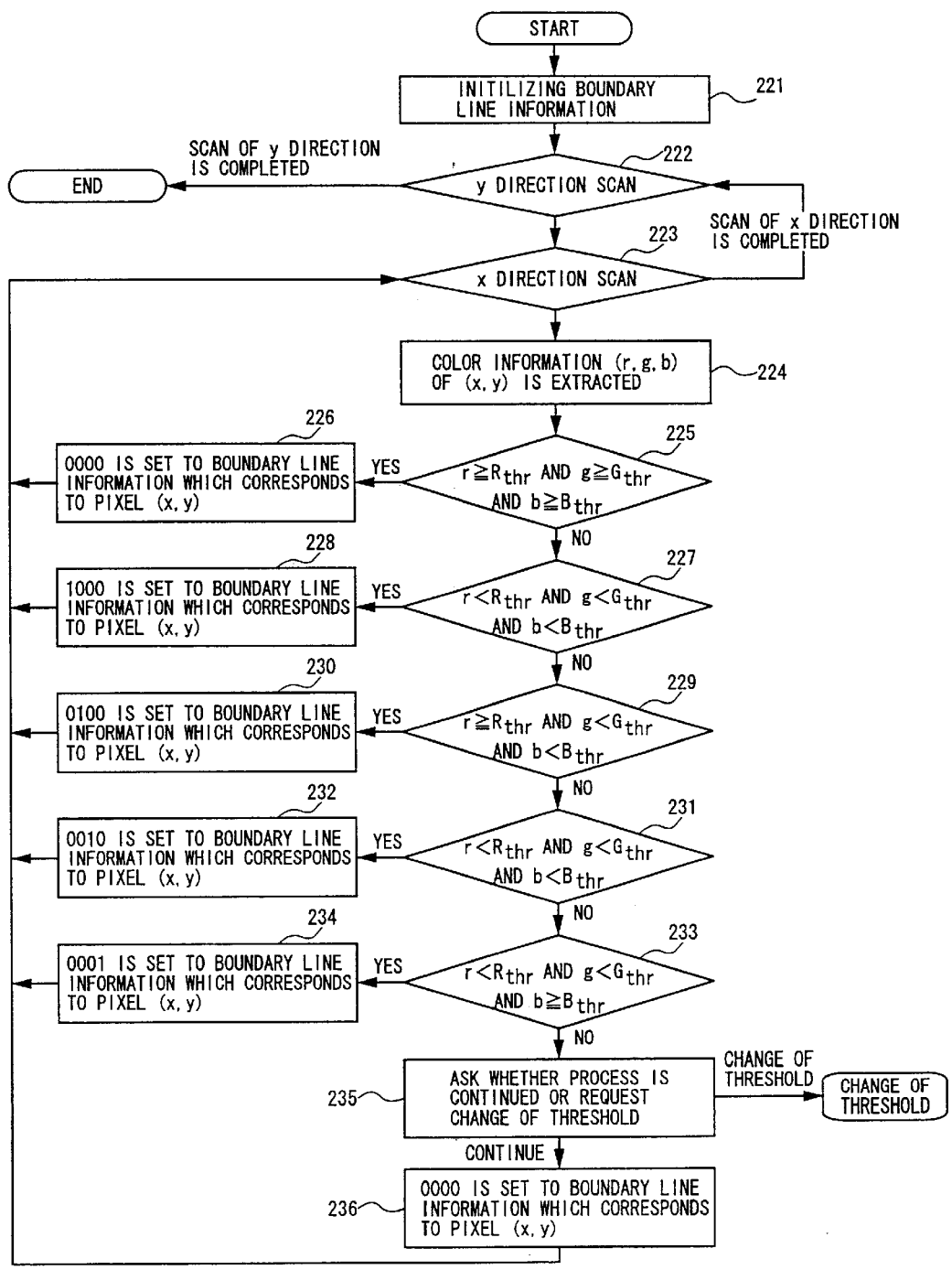
FIG. 47 is a flowchart showing extraction of the boundary line information.

FIG. 47 shows an example of extraction of the boundary line information. A threshold is provided for each of R, G, B by the use beforehand as $R_{thr}$, $G_{thr}$, $B_{thr}$. In step 221, the boundary line information is initialized. Then, the line drawing to be filled is scanned in the x axis direction and y axis direction in steps 222, 223. Color information (r, g, b) of (x, y) is extracted in step 224. Then, the pixels of the line drawing are scanned while comparing color information (r, g, b) of each pixel with the thresholds $R_{thr}$, $G_{thr}$, $B_{thr}$ in steps 225, 227, 229, 231, 233.

If every color r, g, b is lager than or equal to the corresponding threshold, that is, if the following equations are satisfied, $r \geq R_{thr}$ $g \geq G_{thr}$ $b \geq B_{thr}$ (4)

the pixel is determined to be white and 0000 is set to the boundary line information which corresponds to the pixel (x, y) in step 226.

If every color r, g, b is smaller than the corresponding threshold, that is, if the following equations are satisfied, $r < R_{thr}$ $g < G_{thr}$ $b < B_{thr}$ (5)

the pixel is determined to be black and 1000 is set to the boundary line information which corresponds to the pixel (x, y) in step 228.

If only r is lager than or equal to the corresponding threshold $R_{thr}$ and g, b are smaller than $G_{thr}$, $B_{thr}$ respectively, that is, if the following equations are satisfied, $r \geq R_{thr}$ $g < G_{thr}$ $b < B_{thr}$ (6)

the pixel is determined to be red and 0100 is set to the boundary line information which corresponds to the pixel (x, y) in step 230.

If only g is lager than or equal to the corresponding threshold $G_{thr}$ and r, b are smaller than $R_{thr}$, $B_{thr}$ respectively, that is, if the following equations are satisfied, $r < R_{thr}$ $g \geq G_{thr}$ $b < B_{thr}$ (7)

the pixel is determined to be green and 0010 is set to the boundary line information which corresponds to the pixel (x, y) in step 232.

If only b is lager than or equal to the corresponding threshold $B_{thr}$ and r, g are smaller than $R_{thr}$, $G_{thr}$ respectively, that is, if the following equations are satisfied, $r < R_{thr}$ $g < G_{thr}$ $b \geq B_{thr}$ (8)

the pixel is determined to be blue and 0001 is set to the boundary line information which corresponds to the pixel (x, y) in step 234.

The above-mentioned process by using the equations (4)–(8) is displayed to the image display device 217 one after another such that the user can change the thresholds $R_{thr}$, $G_{thr}$, $B_{thr}$ while checking the process on the display device.

When a pixel which does not satisfy any one of equations (4)–(8) is detected, the image filling apparatus makes an inquiry to the user whether the thresholds need to be changed or the pixel is not on the boundary line in step 235. In the former, the apparatus requests to the user to input new thresholds after suspending the process. In the latter, the process is continued after 0000 is set to the boundary line information which corresponds to the pixel in step 236.

In this embodiment as shown in FIG. 47, the boundary line is judged in the order of white, black, red, green, blue. However, any other order can be used since the colors are mutually independent for a pixel.

Figure 48:
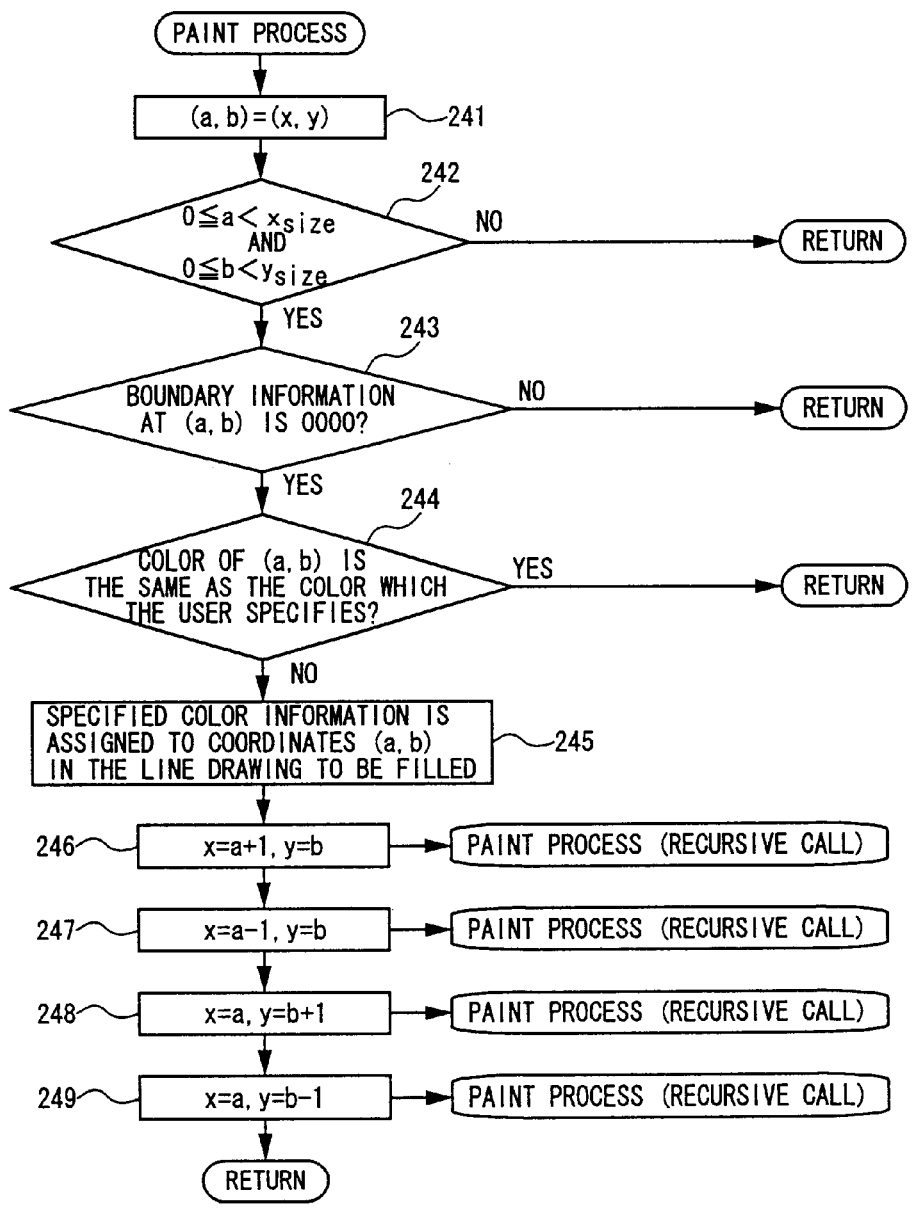
FIG. 48 is a flowchart showing a filling method by using the boundary line information.

The filling part 214 colors the region other than the boundary line by using the boundary line information which is generated by the boundary line information extraction part 213. More specifically, only the region which has 0000 as the boundary information is filled in this embodiment. General filling method can be used for filling regions which have other than 0000 as the boundary information. FIG. 48 shows an example. In this example, the line drawing to be filled is displayed on the image display device 217 one after another while the user colors the line drawing to be filled. Coloring is started from coordinates (x, y) which is pointed by the user with a pointing device such as a mouse, in which the color used for filling is specified by the user with the pointing device, a keyboard or the like in step 241. When the coordinates is in the line drawing to be filled, the boundary information is 0000 and the color of (x, y) is not the same as the color which the user specifies, specified color information is assigned to the coordinates in steps 242–245. The same process (paint process) is performed to coordinates around the coordinates recursively in steps 246–249. Thus, the closed region which includes the coordinates specified initially by the user and does not include the boundary line is filled by the color specified by the user.

As a result, the line drawing is filled without filling the boundary line. The filled line drawing to be filled is called the filled line drawing.

The colored line filling part 215 changes the color of the colored line (boundary line) to an appropriate color.

The processing by the colored line filling part 215 will be described with reference to FIGS. 49A and 49B. In the following description, a mouse is used for a pointing device. If the mouse is replaced by a trackball, a graphics tablet or the like, the following method is the same.

Figure 49A:
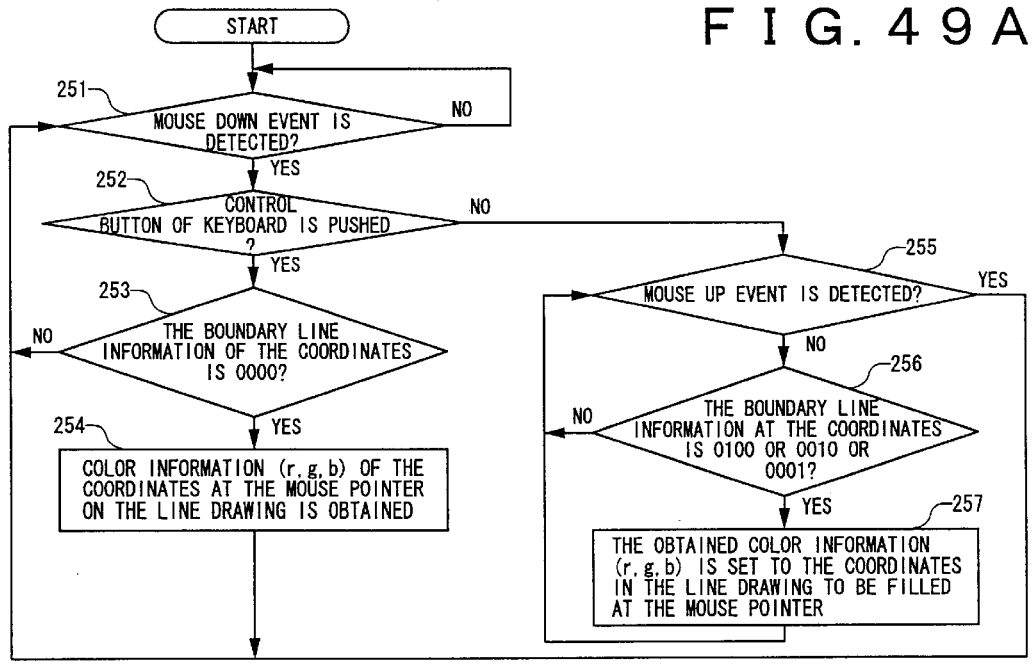
FIGS. 49A and 49B shows flowcharts of a method for changing a color of a colored line.

As shown in FIG. 49A, when a mouse button and a button of the keyboard (for example, a control button in this case) are pushed, color information (r, g, b) of the coordinates at the mouse pointer on the line drawing is obtained if the boundary line information of the coordinates is 0000 in steps 251–254. If the boundary line information is not 0000, nothing is done. When only the mouse button is pushed, the obtained color information (r, g, b) is set to the coordinates at the mouse pointer if the boundary line information at the coordinates is 0100 or 0010 or 0001 until a mouse up event is detected (that is, while the mouse button is pushed) in steps 255–257. Accordingly, in the case shown in FIG. 49A, the color specified by the mouse pointer is obtained when the mouse button is pushed in conjunction with the control button. Then, when the mouse pointer is moved while pushing only the mouse button, the color of a part of the boundary line on which the mouse pointer passed is changed to the obtained color.

Therefore, when the user wants to change the color of the boundary line (colored line) to a brighter color of region colors divided by the boundary line, the user may push the mouse button in conjunction with the control button at the side of the brighter color for obtaining the color, and, then, the user may move the mouse pointer on a part where the user wants to change the color while pushing the mouse button. Then, the color of the part is changed to the color the user wants. When there region plurality of different color regions divided by colored lines, only a color of a part of the colored line can be changed in the same way. When the mouse has two mouse buttons, the above-mentioned process can be realized by pushing the left button instead of pushing only the above-mentioned mouse button and by pushing the right button instead of pushing the mouse button with the control button.

Figure 49B:
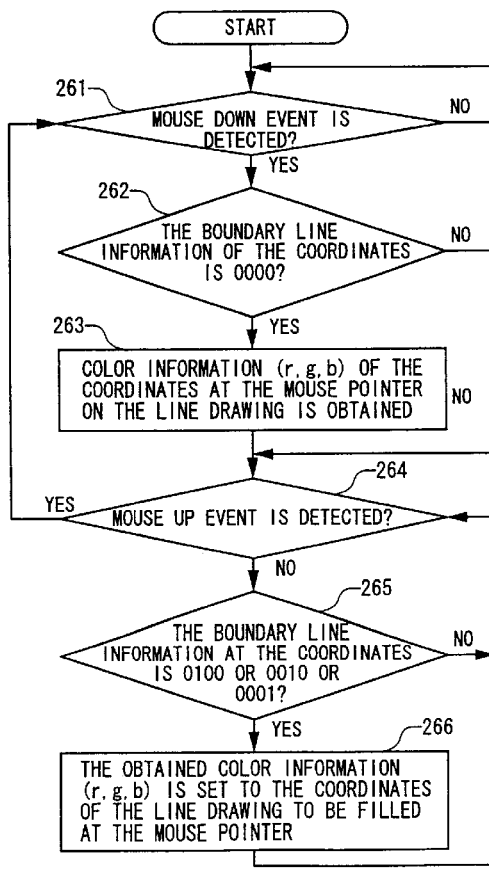
Figure 50:
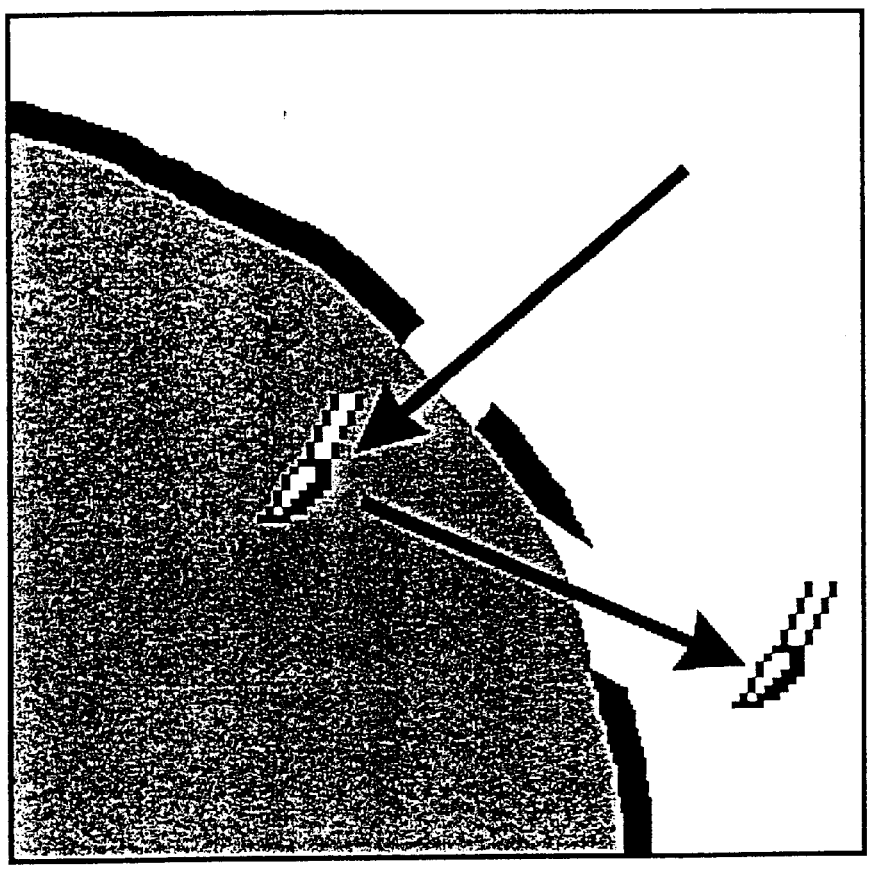
FIG. 50 is a diagram showing an example of changing the color of the colored line.

In the case shown in FIG. 49B, when the mouse button is pushed and the boundary line information of the coordinates at the mouse pointer is 0000, the color information (r, g, b) is obtained in steps 261–263. In other cases (0100 or 0010 or 0001), the color of the coordinates specified the mouse pointer is changed to the obtained color until a mouse up event is detected (that is, while the mouse button is pushed). Thus, according to the method shown in FIG. 49B, when the mouse pointer is moved from a region to another region across the colored line, the color of the colored line is changed to the color of the region where the mouse pointer is initially located. Therefore, when the user pushes the mouse button at a brighter color region of regions divided by the colored line and moves the mouse pointer on a part of the colored line where the user wants to change the color, the color of the part where the mouse pointer passed through can be changed to the brighter color as shown in FIG. 50. When there are plurality of different color regions divided by colored lines, the color of only a part of the colored line can be changed in the same way.

In both of the methods shown in FIGS. 49A and 49B, since all boundary line information is kept stored, the above-mentioned process can be performed any number of times when the user makes a mistake. In addition, since each of the colored lines of red, blue, green is represented separately in the boundary line information, the changed color of the colored line can be turned back to the initial state.

Figure 51A:
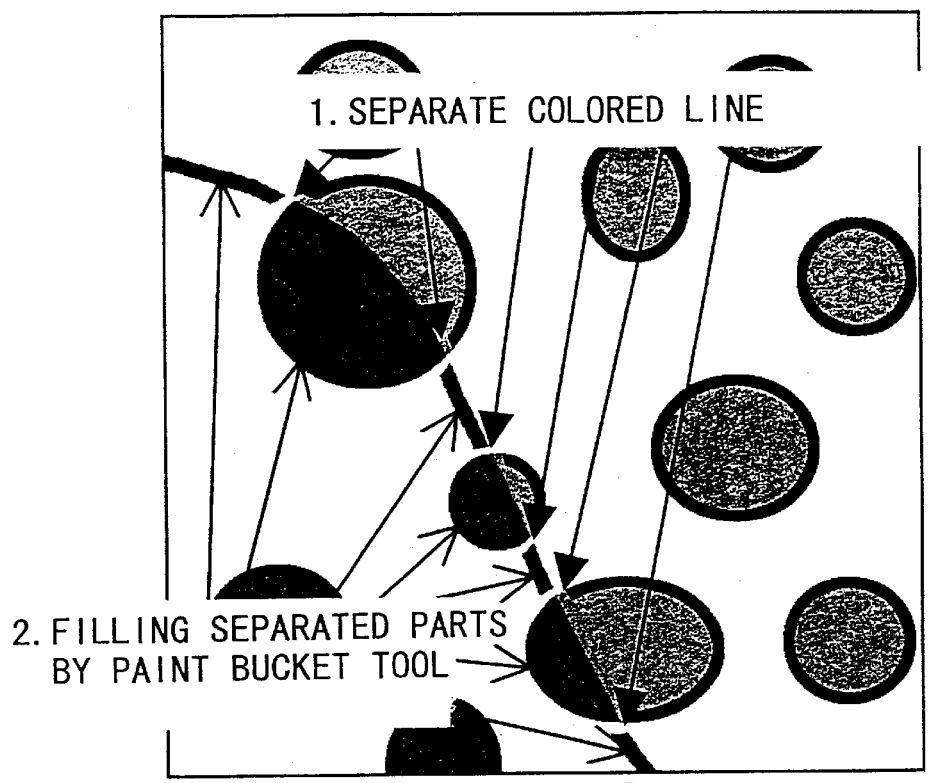
FIGS. 51A and 51B are diagrams showing an example in which the fourth embodiment and the paint bucket tool are combined.
Figure 51B:
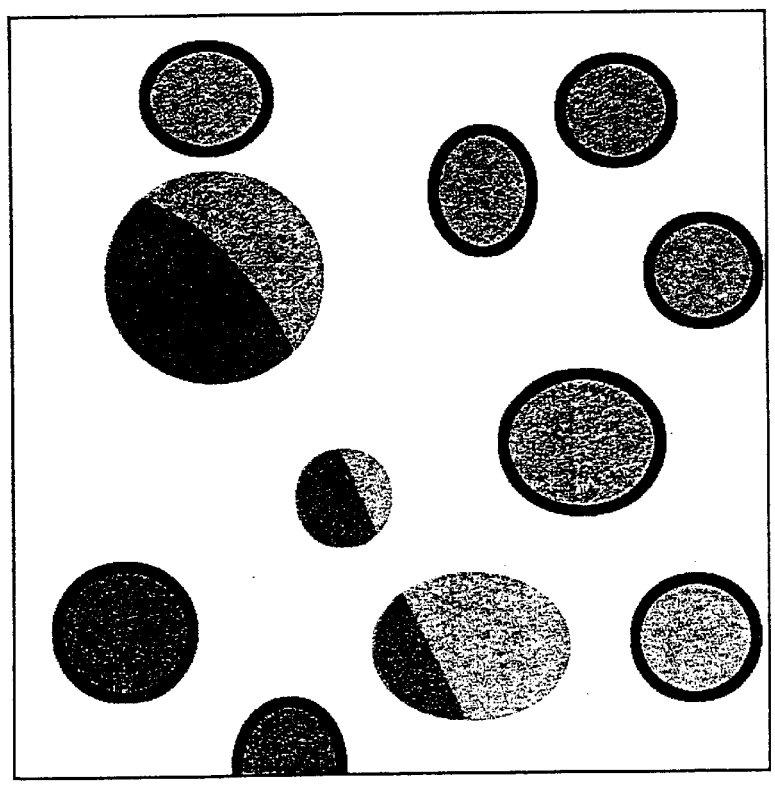

The present invention and the paint bucket tool can be combined. More specifically, when a colored line should be filled with a plurality of colors, the user divides the colored line by using the present invention as shown in FIG. 51A. Then, the user can color the divided colored line with the paint bucket tool as shown in FIG. 51B.

The filled line drawing storing part 216 stores the filled line drawing in the storage device 11.

Figure 52:
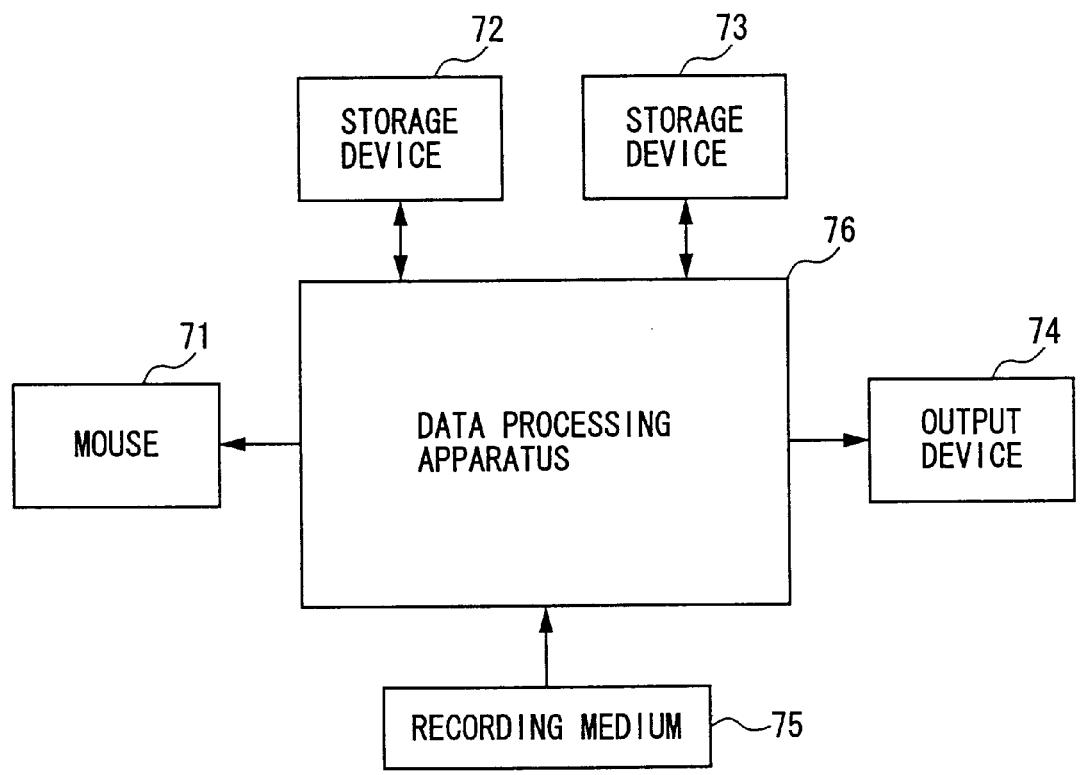
FIG. 52 is a block diagram of another example of the image filling apparatus according to the fourth embodiment of the present invention.

As shown in FIG. 52, the image filling apparatus of the embodiments of the present invention can also be configured by a mouse 71, storage devices 72, 73, an output device 74, a recording medium 75 and a data processing apparatus 76. The storage device 72 corresponds to the storage device 211 in FIG. 45. The storage device 73 is a main storage device. The output device 74 displays data such as images. The recording medium 75 corresponds to a recording medium such as a FD (floppy disk), a CD-ROM, an MO (magneto-optic disk) and the like which stores an image filling program which has the line drawing to be filled reading part 212—the filled line drawing storing part 216 shown in FIG. 45. The data processing apparatus 76 is a CPU which reads the image filling program from the recording medium 75 and executes it.

According to the present invention, the color of the colored line can be changed without being affected from filling operation of other regions. Thus, it is not necessary for the user to consider the filling order. In addition, even when a colored line extends over a plurality of regions, the user can change the color of only a necessary part of the colored line without affecting other regions. Thus, the user can perform filling effectively and flexibly.

The above-mentioned fourth embodiment can be realized in concert with other embodiments of the present invention. For example, the fourth embodiment can be used for filling the colored line in the first—third embodiments.

Fifth Embodiment

In the following, the fifth embodiment will be described with reference to figures. The fifth embodiment corresponds to the third object of the present invention.

As shown in FIG. 53, an image filling apparatus of the fifth embodiment includes a color specifying information generation part 311, a color specifying information storing part 312, a storage device 313, a line drawing to be filled reading part 314, a line drawing displaying part 315, a color specifying information reading part 316, a filling part 317 and a filled line drawing storing part 318.

The color specifying information generation part 311 generates color specifying information according to instructions by the user, wherein the color specifying information includes colors used for filling and names corresponding to the colors. FIG. 54 shows an example of the color specifying information.

The color specifying information storing part 312 stores the generated color specifying information in the storage device 313.

The storage device 313 stores line drawings to be filled, the color specifying information and filled line drawings.

The line drawing to be filled reading part 314 reads the line drawing to be filled from the storage device 313 according to instructions by the user.

The line drawing displaying part 315 displays the line drawing to be filled on a image displaying device 319 such as a CRT.

The color specifying information reading part 316 reads the color specifying information from the storage device according to instructions by the user.

The filling part 317 obtains coordinates in a closed region where the user wants to color in the line drawing to be filled displayed on the image displaying device 319, in which the coordinates are specified by a pointing device. Then, the filling part 317 overlays the color specifying information on the line drawing at the coordinates. When the user specifies a color in the color specifying information with a pointing device, the filling part 317 obtains the corresponding color value from the color specifying information and colors the closed region specified by the coordinates with the specified color.

In the following, the fifth embodiment will be described more specifically with reference to FIGS. 55, 56, 57A, 57B, 57C.

Figure 55:
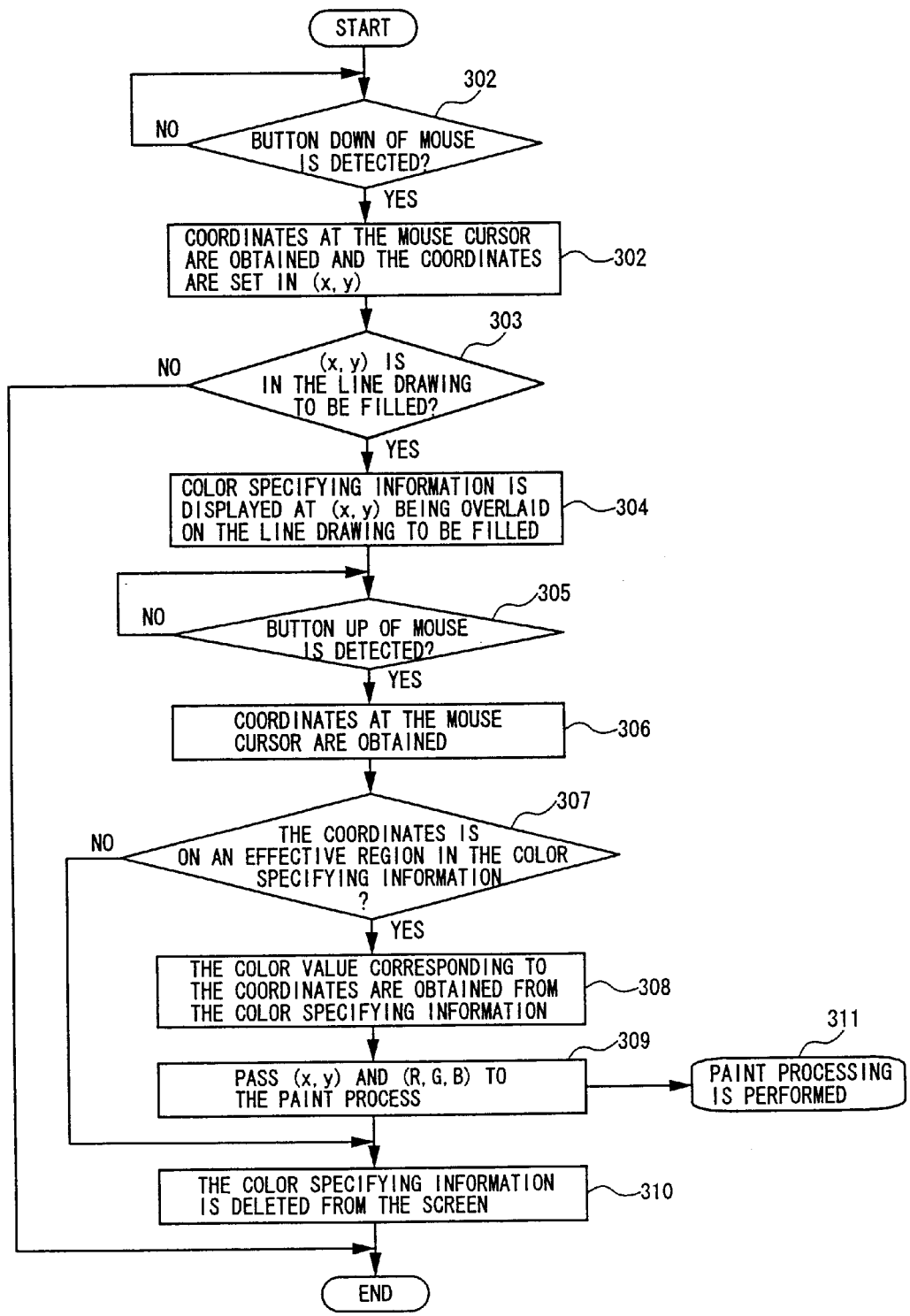
FIGS. 55 and 56 are flowcharts of the filling part 317.
Figure 57A:
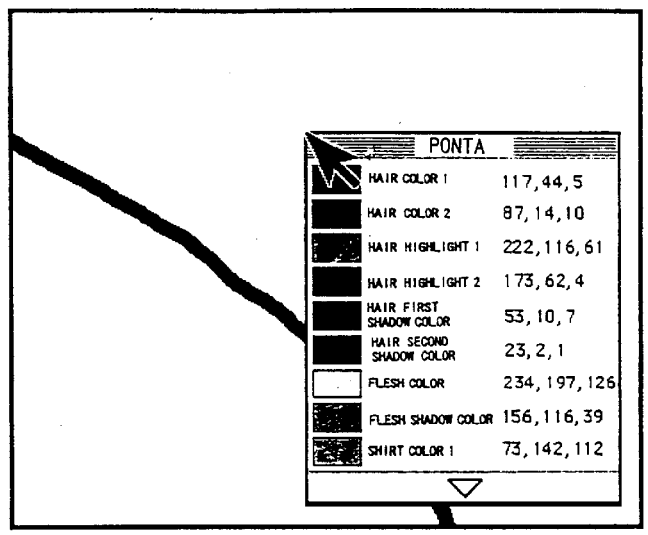
FIGS. 57A–57C shows displayed examples in the process of image filling.
Figure 57B:
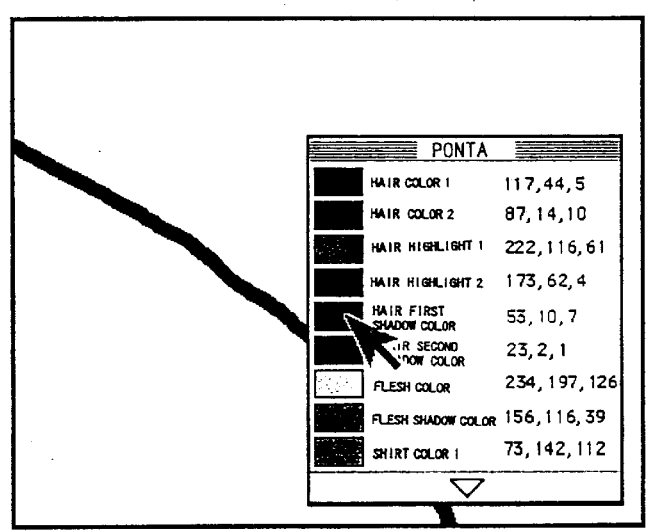
Figure 57C:
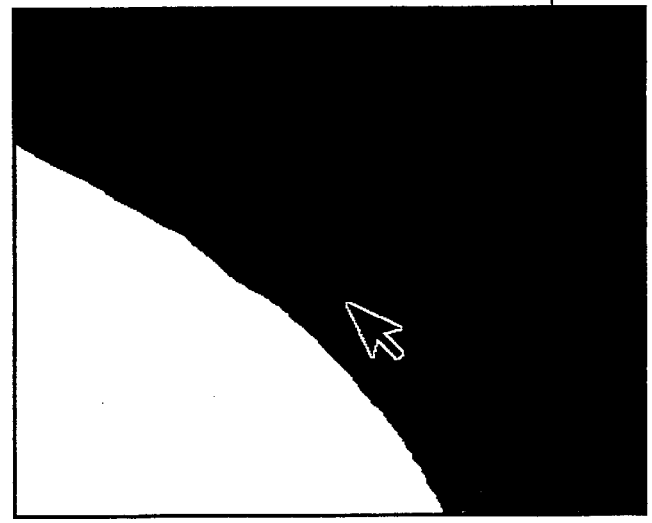

In the process shown in FIG. 55, a mouse which has one button is used as the pointing device. In step 301, the user pushes the mouse button at coordinates in a closed region in the line drawing to be filled where the user wants to color by using the mouse cursor displayed on the image displaying device 319. Then, coordinates at the mouse cursor are obtained when the mouse button is pushed, and the coordinates are set in (x, y) in step 302. It is checked whether (x, y) is in the line drawing to be filled in step 303. If (x, y) is not in the line drawing, the process is completed without performing any process. If (x, y) is in the line drawing, the color specifying information which was previously read is displayed at (x, y) overlaying on the line drawing to be filled as shown in FIG. 57A in step 304. The user moves the mouse cursor to a color in the color specifying information which the user wants for filling while pushing the mouse button as shown in FIG. 57B. Then, the user releases the mouse button in step 305. The coordinates at the time of releasing the mouse button are obtained in step 306. In step 307, it is checked whether the coordinates is on an effective region in the color specifying information. If not, the color specifying information is deleted from the screen and the process is completed in step 310. If the coordinates are on the effective region in the color specifying information, the color value corresponding to the coordinates are obtained from the color specifying information in step 308, and an paint processing is performed by passing (x, y) and (R, G, B) to the paint process in step 309. Then, the closed region including (x, y) is filled with (R, G, B) in step 311. When the paint processing is completed, the color specifying information is deleted from the screen as shown in FIG. 57C in step 310. The above-mentioned process is repeated until filling of the line drawing is completed.

Figure 56:
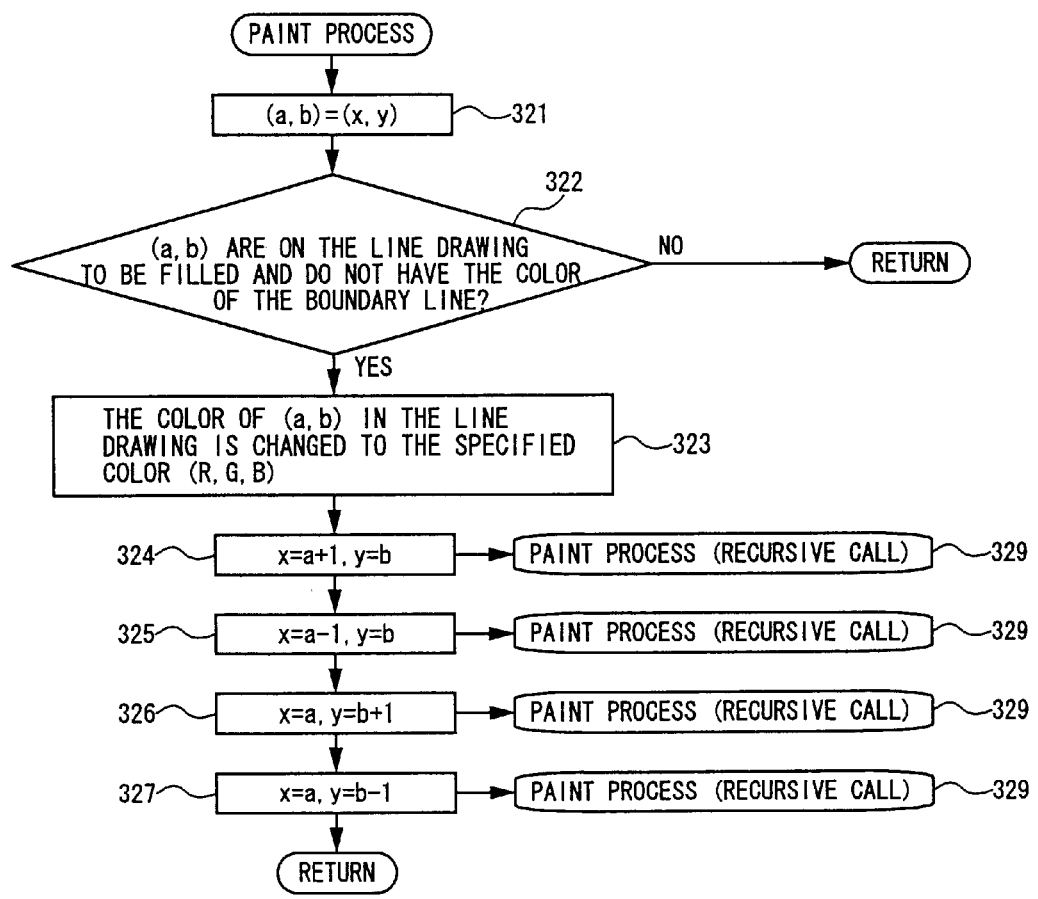

FIG. 56 shows an example of the paint processing. As mentioned above, when filling the closed region, it is necessary to specify the coordinates in the closed region and the color value. There are various methods for filling the closed region by using the coordinates and the color value. In this embodiment, a method using a recursive call will be described.

The (x, y) passed from the step 310 is saved in working coordinates (a, b) in step 321. It is checked whether (a, b) are on the line drawing to be filled and do not have the color of the boundary line in step 322. If this condition is not satisfied, the process returns in step 328. When it is satisfied, the color of (a, b) in the line drawing is changed to the color (R, G, B) which was passed from the step 310 in 323. After that, coordinates which are adjacent to (a, b) are generated and are input to (x, y) in steps 324–327. Then, this paint process is recursively called in step 329. Accordingly, filling by (R, G, B) is performed from (x, y) passed from the step 310 until the coordinates reach the boundary line or the end of the closed region. That is, the inside of the closed region is filled with the color (R, G, B).

The filled line drawing storing part 318 stores the filled line drawing in the storage device 313.

Figure 58:
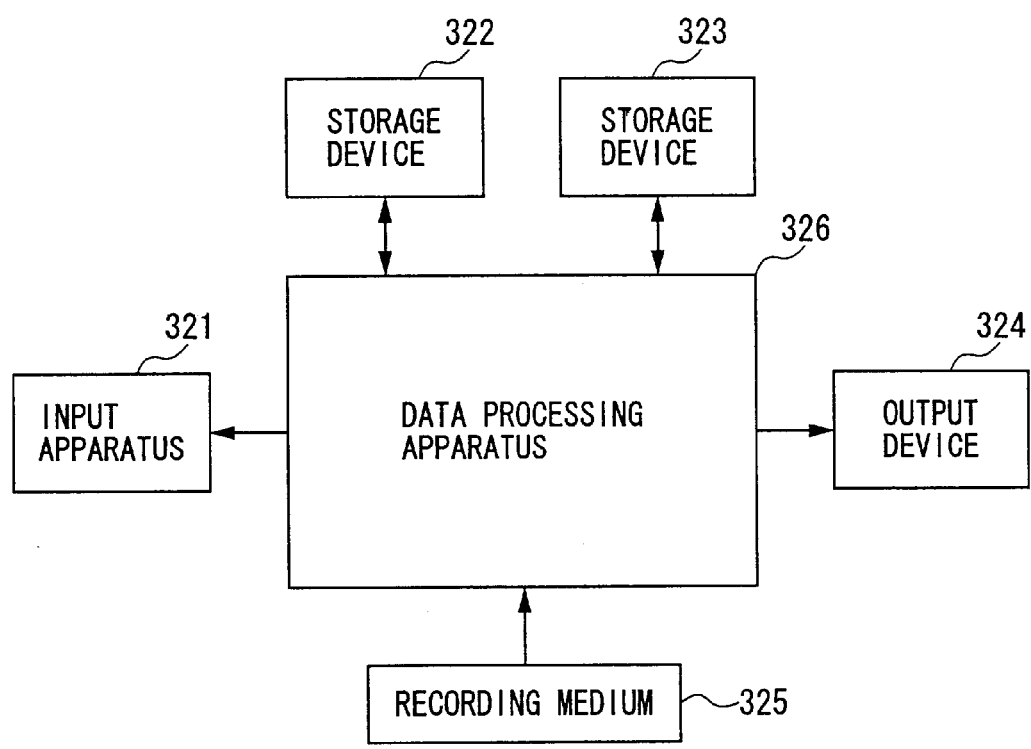
FIG. 58 is a block diagram of another example of the image filling apparatus according to the fifth embodiment of the present invention.

As shown in FIG. 58, the image filling apparatus of the embodiments of the present invention can also be configured by an input device 321, storage devices 322, 323, a display device 324, a recording medium 325 and a data processing apparatus 326. The input device 321 is a pointing device, keyboard and the like for inputting colors and the corresponding names. The storage device 322 corresponds to the storage device 313 in FIG. 53. The storage device 322 is a hard disk for example. The display device 324 corresponds to the image displaying device 319 in FIG. 53. The recording medium 325 corresponds to a recording medium such as a FD (floppy disk), a CD-ROM, an MO (magneto-optic disk) and the like which stores an image filling program which has the color specifying information generation part 311, the color specifying information storing part 312, the line drawing to be filled reading part 314, the line drawing displaying part 315, the color specifying information reading part 316, the filling part 317 and the filled line drawing storing part 318. The data processing apparatus 326 is a CPU which reads the image filling program from the recording medium 325 and executes it.

According to the above-mentioned invention, the user can save labor in producing animation in which digitized line drawings are filled with predetermined colors. That is because the user can specify a color for filling the line drawing with small movement of the pointing device.

The above-mentioned fifth embodiment can be realized in concert with other embodiments of the present invention. For example, the fifth embodiment can be used with the first—third embodiments. In addition, the color which is painted by the first—third embodiments can be changed by the fifth embodiment. Thus, filling becomes speedy and accurate.

Sixth Embodiment

The sixth embodiment of the present invention will be described in the following. The sixth embodiment corresponds to the fourth object of the present invention.

Figure 59:
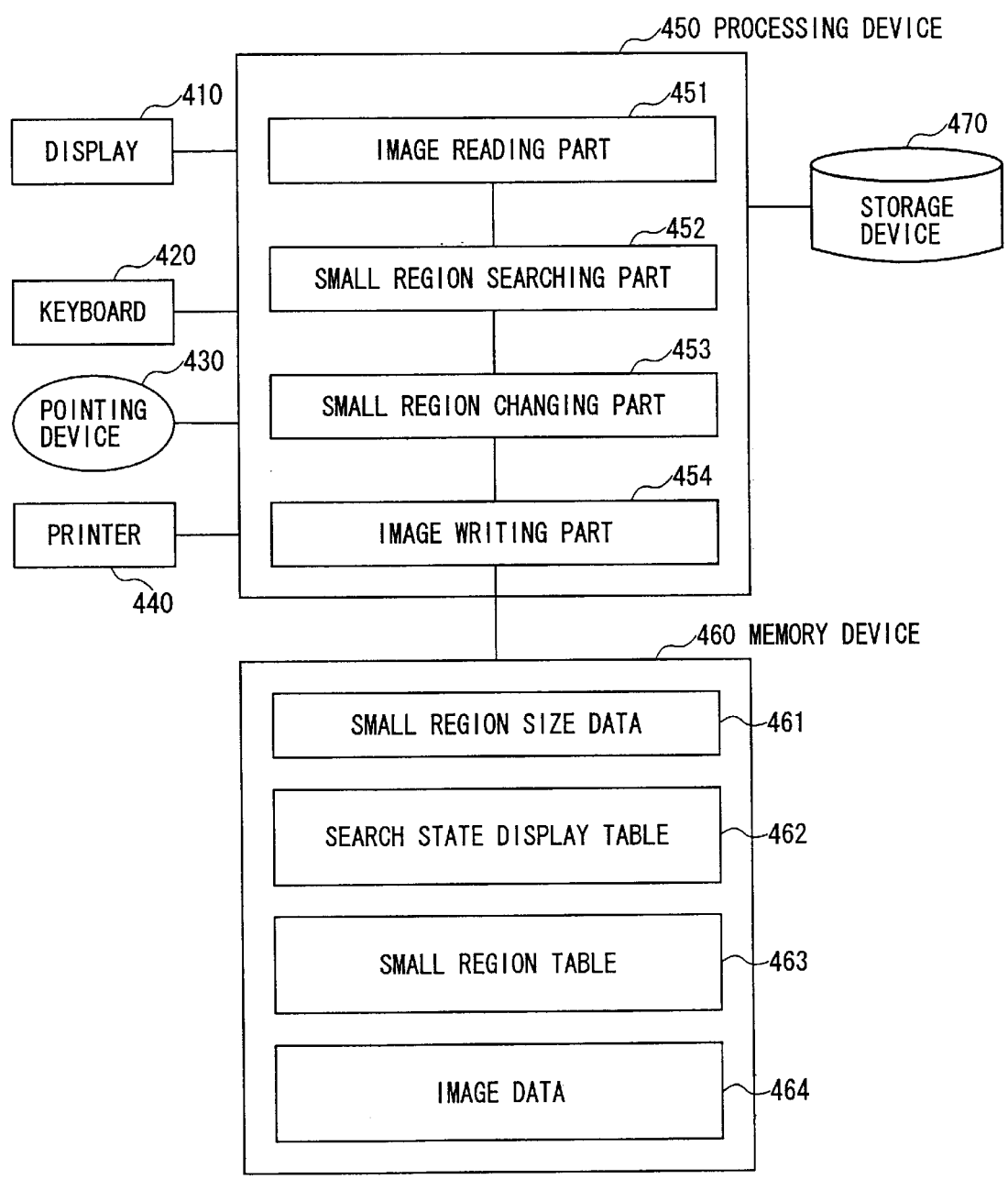
FIG. 59 is a block diagram of an image filling apparatus according to a sixth embodiment of the present invention.

FIG. 59 shows an example of an image processing apparatus of the sixth embodiment. The image processing apparatus includes a display 410, a keyboard 420, a pointing device 430 (a mouse), a printer 440, a processing device 450, a memory device 460 and an external storage device 470. This configuration itself is basically the same as a computer system.

The processing device 450 includes an image reading part 451, a small region searching part 452, a small region changing part 453 and an image writing part 454. The processing device 450 also includes a control part and the like which is not shown in the figure for controlling each part. The memory device 460 is a so-called working memory. The memory device 460 stores small region size data 461 which is input from the keyboard 420, a search state display table 463 and a small region table 463 which are generated by the small region searching part 420, and image data 464 which is processed halfway. The memory device 460 may be included in the processing device 450.

The external storage device 470 stores an unfilled line drawing file and a line drawing file which is filled by the four connected pixel fill seed algorithm or the scan line seed fill algorithm. The line drawing will be called an image file in the following. This storage device can be realized by a magnetic disc, a magneto-optic disk or any other devices. The external storage device 470 may be included in the memory device 460.

The image reading part 451 reads an object image file which is stored in the external storage device 470, stores it in the memory device (the working memory) 460 as the image data 464 and displays it on the display 410. The image data to be processed may be also input by an image scanner for example. The small region searching part 452 generates the search state display table 462 and the small region table 463 on the memory device 460. Then, the small region searching part 452 searches the image data 464 for extracting small regions which are smaller than the small region size (for example, one pixel, two pixels) which is specified beforehand by the user, wherein the searched pixel is recorded in the search state display table 462 and the extracted small region is recorded in the small region table 463.

The small region changing part 453 reads the small region table 463 from the memory device 460. Then, the small region changing part 453 displays a mark representing the small region extracted by the small region searching part 452 on the image data, and makes an inquiry about next processes for the extracted small region to the user. The user provides instructions about the next processes by the keyboard 420 or the mouse 430. The small region changing part 453 performs processing on the small region according to the instructions such that the image data 464 in the memory device is changed. The processing by the small region changing part is performed in an interactive manner between the user and the apparatus wherein the small region changing process is displayed on the display 410 one after another. The image writing part 455 writes the image data 454 which is processed to the external storage device 470. The processed image data may be printed out by the printer 440 according to a user's instruction and the like.

In the following, the processes by the small region searching part 452 and the small region changing part 453 will be described in detail.

Figure 60:
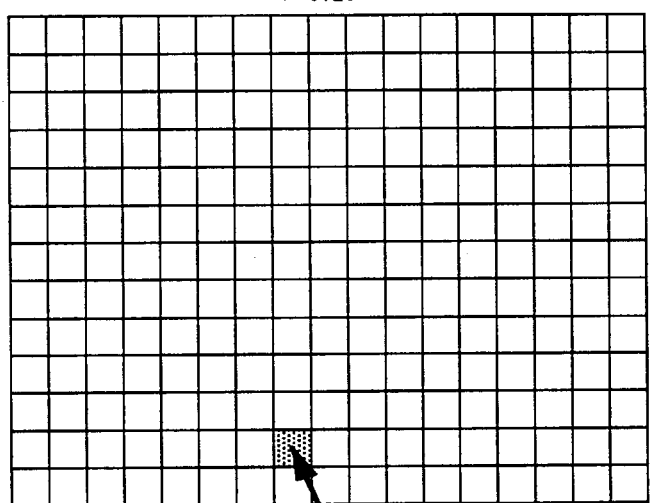
FIG. 60 shows a search state display table used for small region searching.

FIG. 60 shows the search state display table 462 for checking the searched pixel in the image data 464. The search state display table 462 is generated corresponding to each of image data 464 to be processed. In the table, one bit is assigned for one pixel because it is enough to represent two states (unsearched or searched) for one pixel, for example, 0 is assigned to the unsearched state and 1 i assigned to the searched state. The sizes of the x, y directions are the same as the sizes ($x_{size}$, $y_{size}$) of the image data 464 to be processed.

FIG. 61 shows the small region table 463 which stores the extracted small regions (a small region list). The small region table 463 has the number of extracted small region (count), the size (number of pixels) of each small region (num), coordinates x, y of a pixel which is in the each small region and a flag indicating whether the small region has been processed by the small region changing part 453 (change state flag). In the same way as the search state display table 462, the small region table 463 is generated for each image data 464 to be processed.

Figure 62:
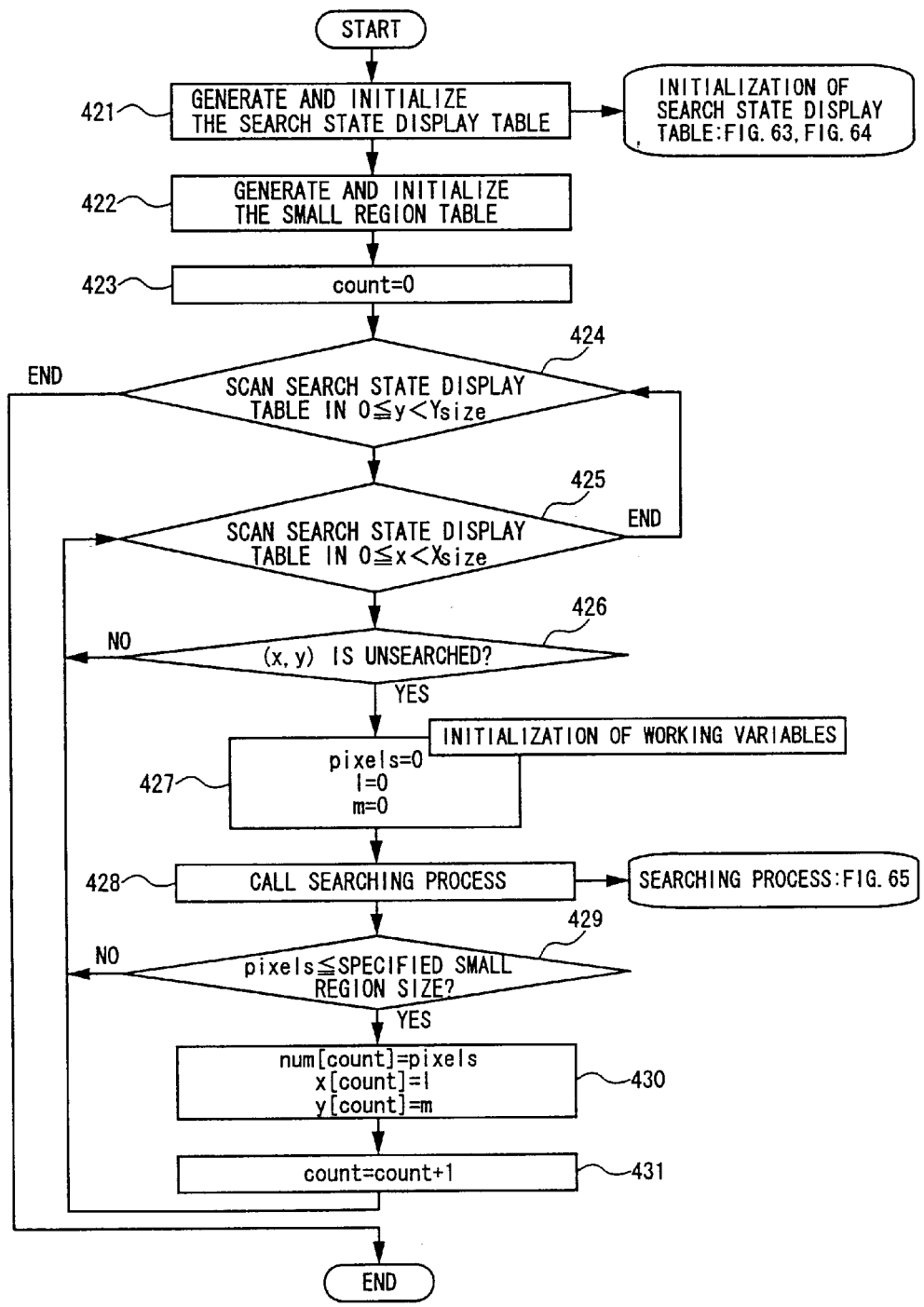
FIG. 62 is a flowchart showing the whole process of the small region searching part.
Figure 63:
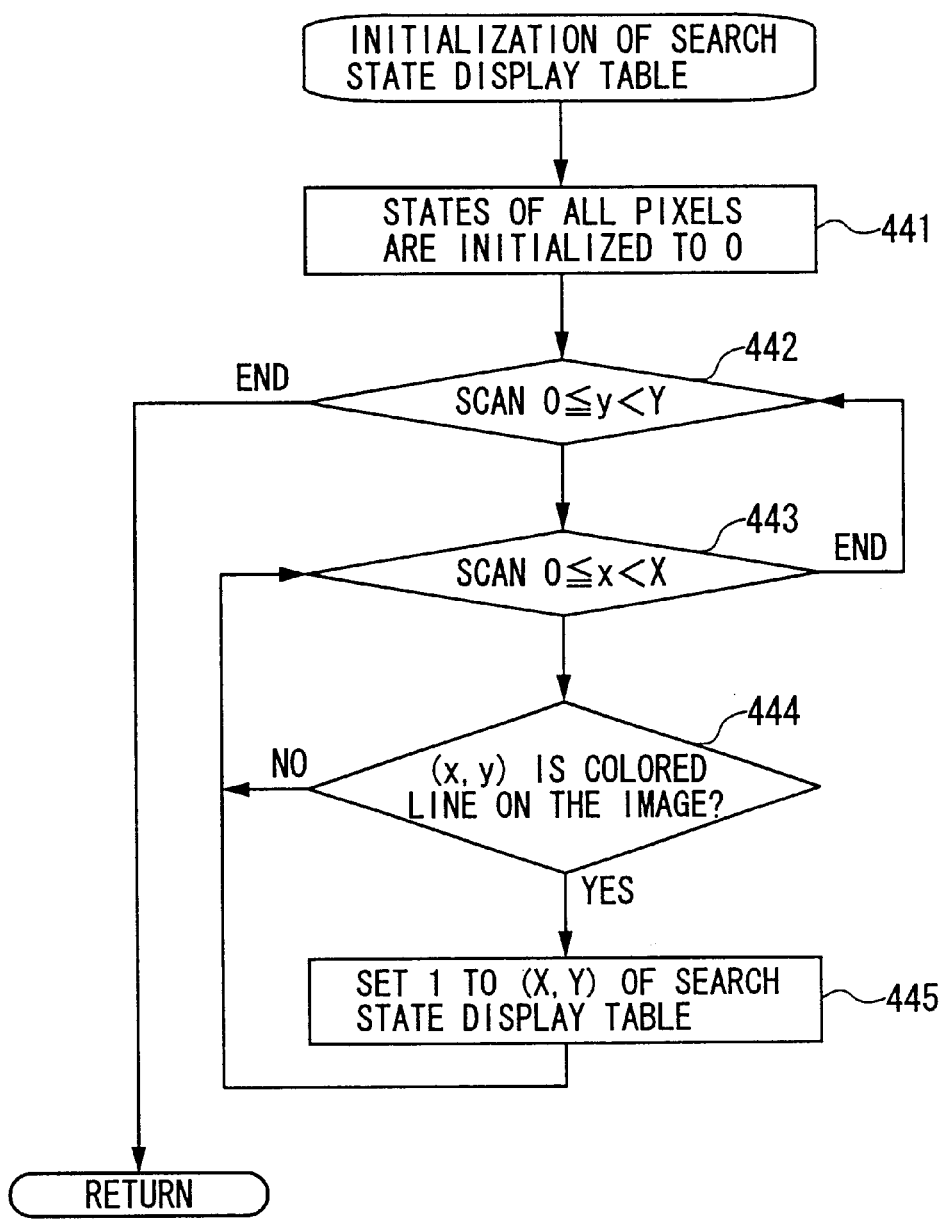
FIG. 63 shows an initialization flowchart of the search state display table used for checking small regions included in image data whichever the small region is unfilled or filled.
Figure 64:
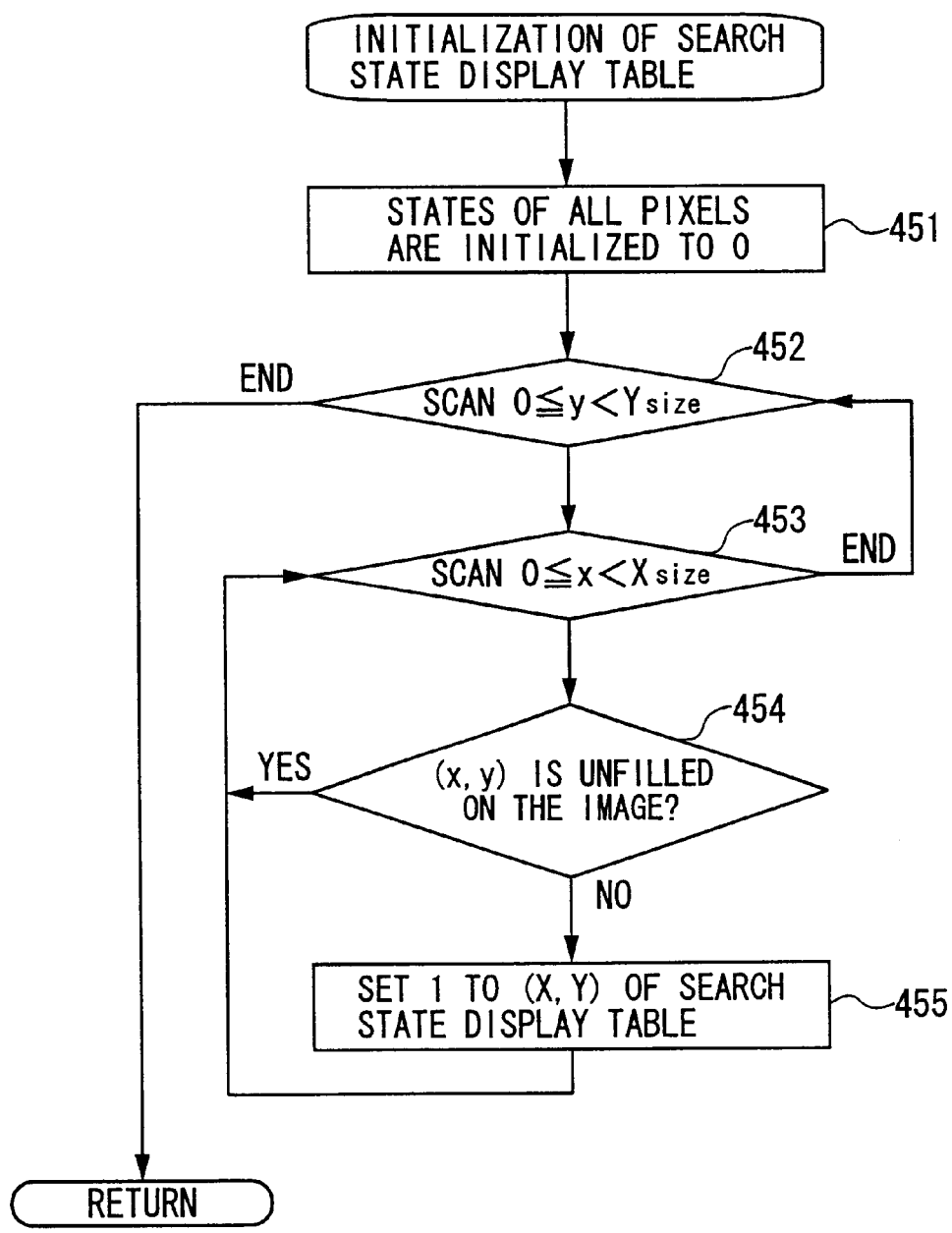
FIG. 64 shows an initialization flowchart of the search state display table used for checking unfilled small regions.
Figure 65:
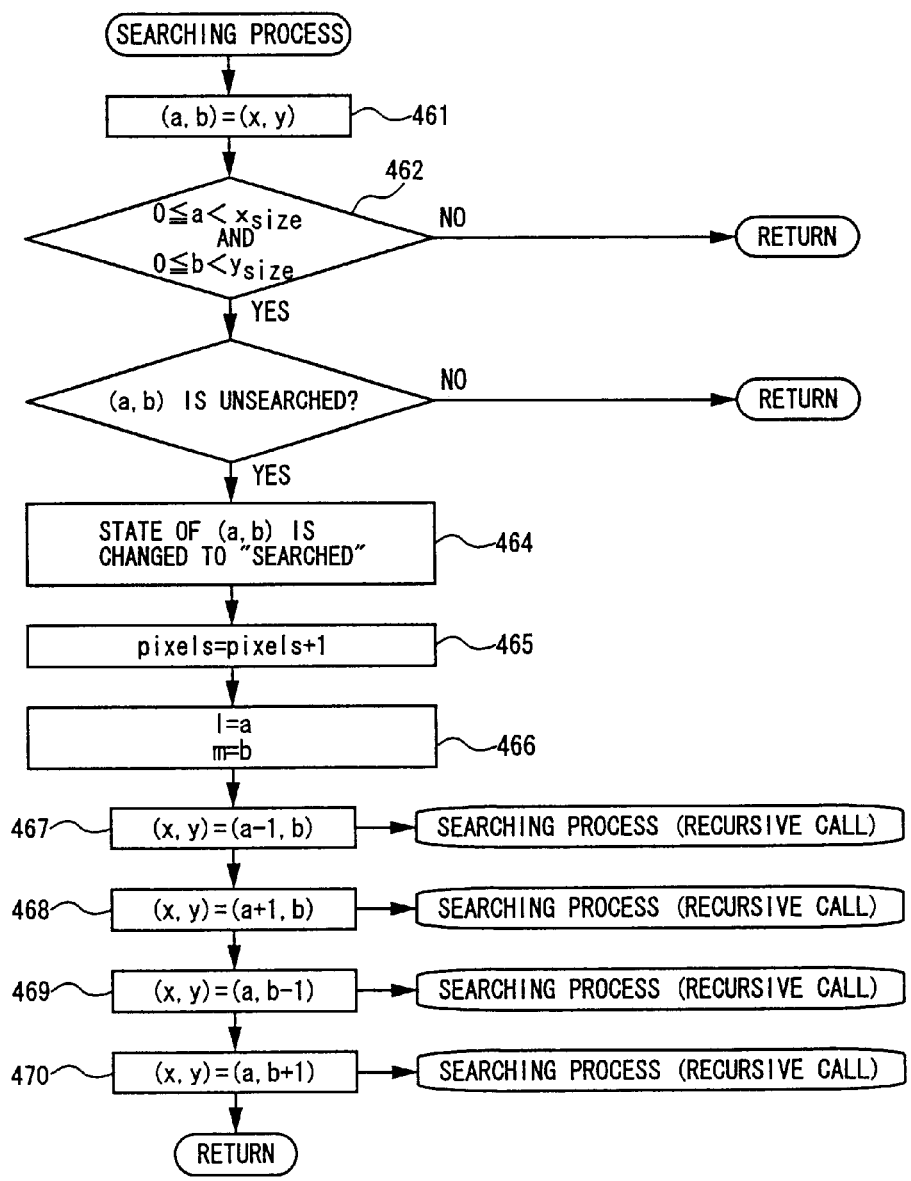
FIG. 65 shows a search process flow.

FIGS. 62–65 show process flowcharts of the small region searching part 452. FIG. 62 is a flowchart showing the whole process of the small region searching part 452, FIGS. 63 and 64 shows generation and initialization flow of the search state display table, and FIG. 65 shows a search process flow.

The process flow shown in FIG. 63 is used for checking small regions included in image data whichever the small region is unfilled or filled. The process flow shown in FIG. 64 is used for checking unfilled small regions included in image data in which the image data has been filled by the 4 connected pixel fill algorithm or the scan line seed fill algorithm and the like. The process shown in FIG. 63 is effective for prevent the user from forgetting about changing a color of the small region. The user specifies the flow shown in FIG. 63 or 64 beforehand.

In step 421, the small region searching part 452 generates and initializes the search state display table 462. As mentioned above, the process flow shown in FIG. 63 is used when checking small regions included in image data 464 whichever the small region is unfilled or filled. The process flow shown in FIG. 64 is used when checking unfilled small regions included in image data 464.

When checking small regions included in image data whichever the small region is unfilled or filled, it is unnecessary to search lines included in the image data. Therefore, 1 (searched state) is assigned to coordinates of a pixel of a predetermined color representing the line, and 0 (unsearched) is assigned to coordinates of a pixel which not is included in the line since searching is necessary for the pixel.

As shown in FIG. 63, states of all pixels in the search state display table 462 are initialized to 0 in step 441, and the image data 464 is scanned in steps 442 and 443. Then, when the color of a scanned pixel is not the line color, the state of the corresponding coordinates remains 0, and when it is the line color, the state is changed to 1 in steps 444, 445.

When checking only unfilled small regions, it is necessary to search unfilled pixels. Therefore, 0 is set to the state of the coordinates of the unfilled pixel since searching is necessary for the unfilled pixel, and 1 is set to the state of the coordinates of the filled pixel since searching is not necessary for the filled pixel.

As shown in FIG. 64, states of all pixels in the search state display table 462 are initialized to 0 (unsearched) in step 451, and the image data is scanned in steps 452 and 453. Then, when the scanned pixel is unfilled, the state of the corresponding coordinates remains 0, and when it is filled, the state is changed to 1 in steps 454, 455.

Next, the small region searching part 452 generates and initializes the small region table 463 in step 422. For this, all information is changed to 0 except the number.

After that, the small region searching part 452 initializes the number of the small regions (count) to 0 in step 423, and scans the search state display table 462 in steps 424 and 425. When an unsearched pixel is found, working variables (counter of pixels: pixels, the x coordinate of a pixel in the small region: l, the y coordinate of a pixel in the small region: m) are initialized in steps 426 and 427. Then, the searching process shown in FIG. 65 is called in step 428.

In the searching process shown in FIG. 65, after the coordinates (a, b) at the time when the process is called are set in step 461, it is checked whether the coordinates is in the image data and unsearched. When the coordinates is not in the image data or searched, the process returns. When the coordinates is in the image data and unsearched, the coordinates (the pixel) in the search state table 462 are changed to searched in step 464, the working variable counter (pixels) is incremented by 1 in step 465, and a, b are substituted into l, m respectively in step 466. Then, four coordinates around the pixel are generated in steps 467–470 so that the same searching process is recursively called.

After the searching process shown in FIG. 65 ends, the small region searching part 452 checks the size of the working variable (pixels) in step 429. If the size is larger than the small region size 461 specified by the user, the region is not regarded as a small region. Thus, the process returns to the step 425 in which the search state display table is scanned. When the size is smaller than or equal to the small region size 461 specified by the user, the value of "pixels" is substituted into num[count], the value of "1" is substituted into x[count], and the value of "m" is substituted into y[count] in step 430. Then, "count" which represents the small region number is incremented by 1 in step 431 and the same process is repeated.

According to the above-mentioned procedure, the number of all extracted small regions, the size of each small region and coordinates of a pixel included in the small region are obtained regardless of whether the image data is unfilled or filled. They are stored in the small region table 463 as the small region list.

Figure 66:
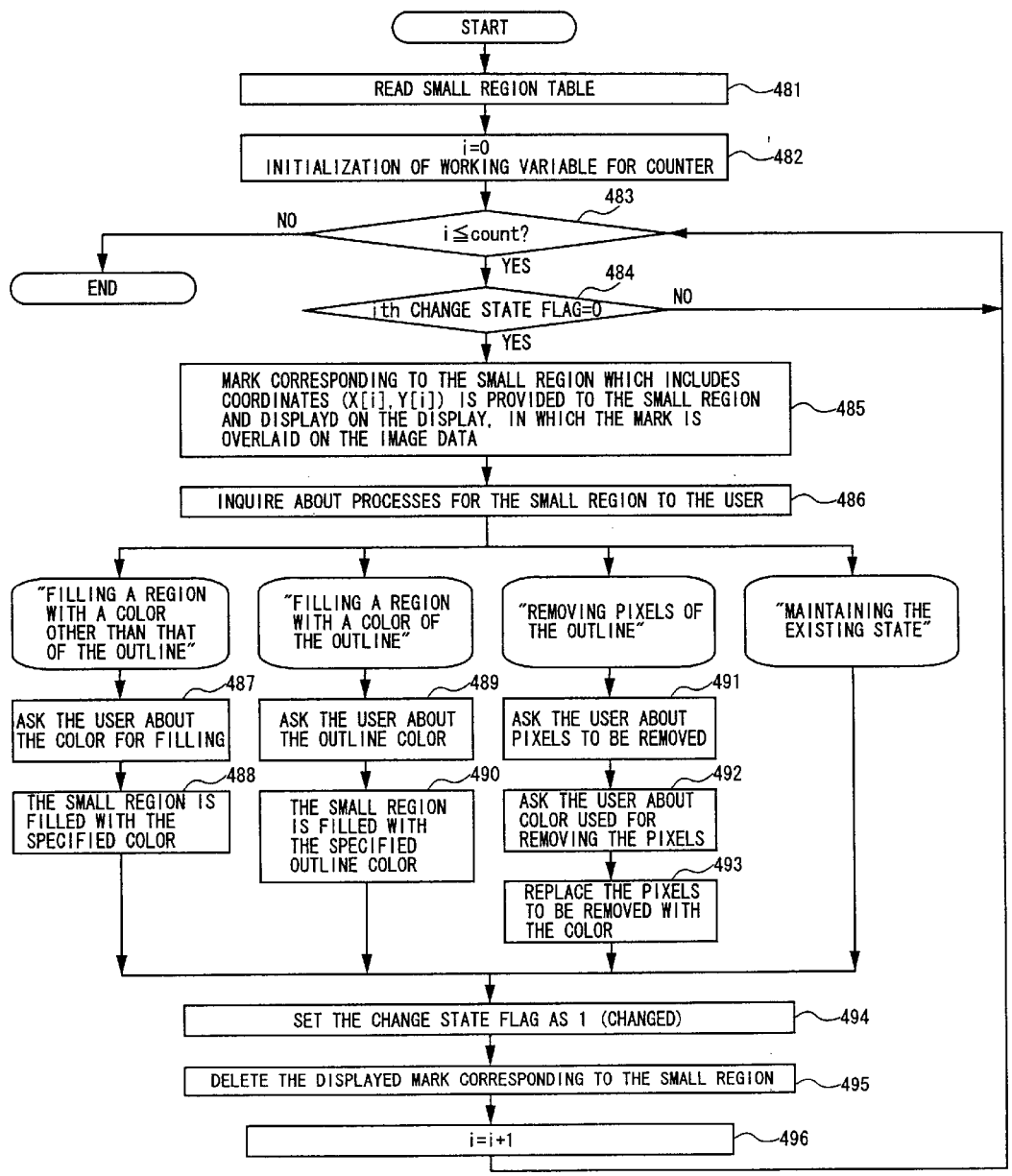
FIG. 66 shows an example of a process flow of the small region changing part.

FIG. 66 shows a process flow example of the small region changing part 453. The small region changing part 453 performs processes for each small region extracted by the small region searching part 452 in an interactive manner with the user. In this embodiment, the processes include (1) filling a region with a color other than that of the outline (filling of the small region)
(2) filling a region with a color of the outline (filling the small region with the color of the outline)
(3) removing pixels of the outline (enlarging the small region by deleting the pixels constituting the outline while keeping the closed region, and filling)
(4) maintaining the existing state (maintaining the small region as it is)

As shown in FIG. 66, the small region changing part 453 reads the small region table 463 from the memory device 460 in step 481 and initializes the working variable (the small region number counter: i) in step 482. Next, when i is smaller than or equal to the number of the small regions (count) in the small region table 462 in step 483, the small region changing part 453 checks whether the change state flag of the ith row in the small region table 462 is 0 or not in step 484. When the flag is 0 (unchanged), a mark corresponding to the small region which includes coordinates (x[i], y[i]) is provided to the small region and displayed on the display 410 in step 485, in which the mark is overlaid on the image data by using the coordinates (x[i], y[i]) which is in the ith row of the small region table 462. The small region changing part 453 inquires about processes for the small region to the user in step 486.

The user sees the mark displayed on the image data, recognizes the small region and the place, and specifies a process for the small region.

When the user specifies "filling a region with a color other than that of the outline", the small region changing part 453 asks the user about the color for filling in step 487 such that the small region is filled with the color in step 488. When the user specifies "filling a region with a color of the outline", the small region changing part 453 asks the user about the outline color in step 489 such that the small region is filled with the outline color in step 490. When the outline color is already known, the step 489 may be omitted. When the user specifies "removing pixels of the outline", the small region changing part 453 asks the user about pixels to be removed and a color used for removing the pixels in steps 491 and 492, and replaces the pixels to be removed with the color in step 493. When the user specifies "maintaining the existing state", nothing is done.

After that, the small region changing part 453 sets the change state flag of ith row of the small region table 463 as 1 (changed) in step 494, and deletes the displayed mark corresponding to the small region in step 495. Then, the working variable counter is incremented by 1 in step 496 and the process returns to the step 483. The above-mentioned process is repeated until i reaches the small region number (count) shown in the small region table 462.

The small region changing part 453 may ask the user about following processes (continuing, discontinuing and the like) after displaying the small region list, for example, after reading the small region table in step 481. Then, the user may provide an instruction for discontinuing the process when the extracted small region is very small and negligible.

Figure 67A:
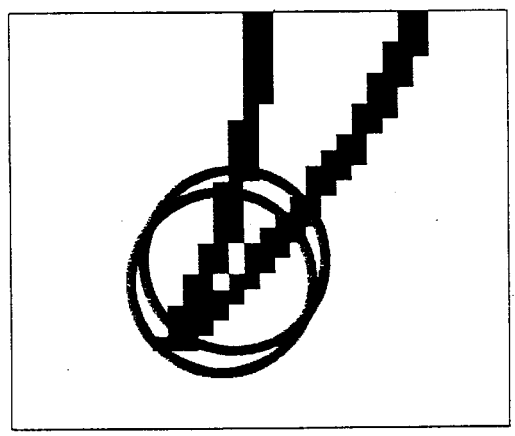
FIGS. 67A and 67B show a mark example for a small region displayed on a display.
Figure 67B:
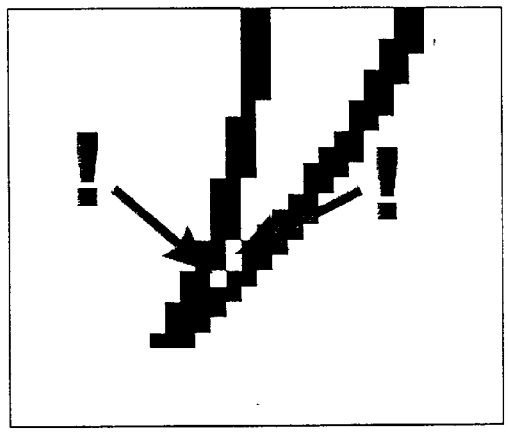

FIGS. 67A and 67B show an example of the mark displayed on the display 410 wherein the mark is overlaid on the image data. The design and the color of the mark is specified by the user beforehand such that the user can recognize the location and the color of the small region at a glance when the mark is displayed. For example, the color of the mark is designed to be a conspicuous color which is not used for the image data. The design and the color of the mark may be changed according to the location of the small region in the same image data.

Figure 68:
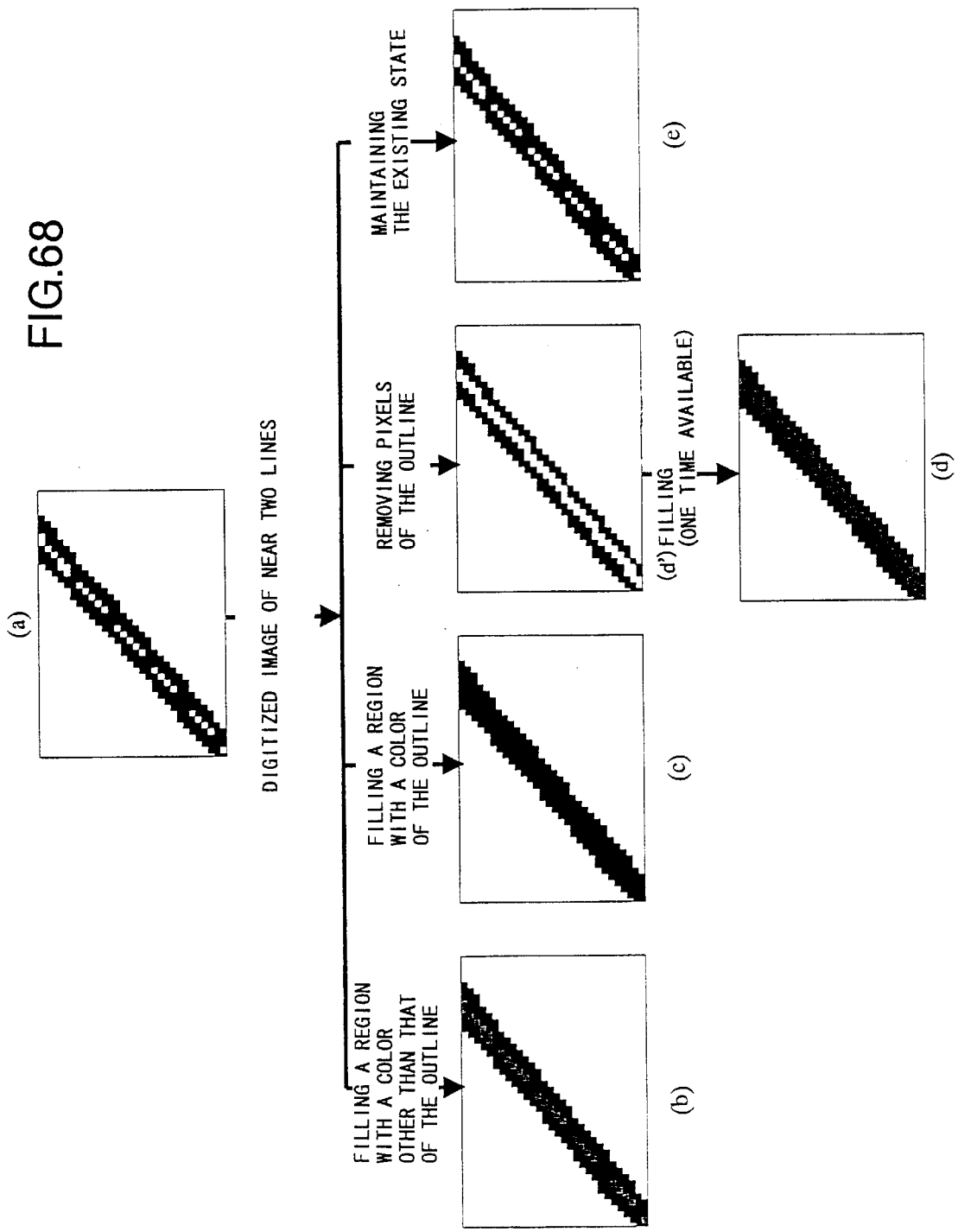
FIG. 68 shows a process example of the small region changing part for processing a small region in an interactive manner with a user.

FIG. 68 shows an example of the process for the small region. In the case of the example shown in FIG. 68, searching for the small region which is smaller than or equal to 4 pixels is specified by the user. For the sake of clarity, the mark is not shown in FIG. 68, and the small regions are assumed to be unfilled and all small regions are assumed to be processed by one process although other cases are possible according to the present invention.

In FIG. 68, (a) shows partial image data in the initial state in which there are small regions, each of (b)–(e) shows the partial data after being processed. In the FIG. 68, the case of (e) shows the same image as (a) because the instruction by the user is maintaining the existing state. (d') shows a state in progress (in which outline pixels are deleted). Such a state in progress is also displayed on the display. The changing processes shown in (b), (c), (d'), (d) and the like can be realized by a conventional filling algorithm such as the 4 connected pixel seed fill algorithm or a simple 1 pixel color changing process or the like.

All or a part of the image reading part 451, a small region searching part 452, the small region changing part 453 and the image writing part 454 shown in FIG. 59 (for example, only 452 and 453) can be described by a language which can be executed by a computer as a program such that the program is stored in a computer readable recording medium such as a floppy disc, a CD-ROM, a memory card and the like.

As mentioned above, according to the present invention, the small region which is smaller or equal to a size predetermined by the user is searched for in digitized image data. Then, the existence and the location is presented to the user, and a proper processing can be performed in an interactive manner in which filling, filling with a line color, deleting line pixels or the like is performed. As a result, it becomes easy and accurate to check and correct an unfilled small region which is forgotten or is a mistake in filling which occurs frequently in producing animation.

The above-mentioned sixth embodiment can be realized in concert with other embodiments of the present invention. For example, the sixth embodiment can be used with the first—third embodiments, in which an unfilled region which remained after filling by the first—third embodiments can be easily checked and corrected by the sixth embodiment.

The present invention described with the first—sixth embodiments is the most effective in two dimensional animation, especially in filling the recent digital animation.

In this specification, the two dimensional means animation produced by filling a line drawing which is input by hand from a cell or input by a digital map. Three dimensional animation means animation in which the color is already specified for each surface when constructing a frame model in a computer.

The present invention is not limited to the specifically disclosed embodiments, and variations and modifications may be made without departing from the scope of the invention.

What is claimed is:

1. An image filling method comprising the steps of:
separating a reference line drawing into first closed regions, said reference line drawing being read from a storage device and being an original line drawing of a reference picture;
extracting at least one feature amount of said first closed regions other than the barycenter;
separating a line drawing to be filled into second closed regions, said line drawing to be filled being read from a storage device;
extracting at least one feature amount of said second closed regions other than the barycenter;
calculating variations of feature amounts between every combination of said first closed regions and said second closed regions, sorting said first closed regions in ascending order by the variation of the feature amount for each of said second closed regions;
generating color candidate lists for each of said second closed regions, wherein color information corresponding to said first closed regions is obtained from said reference picture and duplication of said color information is eliminated; and
filling each of said second closed regions with a color which is on the top of said color candidate list corresponding to said second closed region.

2. The image filling method as claimed in claim 1, said step of separating said reference line drawing comprising the steps of:
initializing closed region data into a boundary value, said closed region data corresponding to each of pixels which constitute said reference line drawing, said boundary line being larger than the maximum closed region number;
initializing x, y coordinates and the closed region number when scanning of said reference line drawing is started, and scanning said reference line drawing;
when a scanned pixel is white and the closed region data of coordinates (x, y) of the scanned pixel is said boundary value, providing the closed region number as the closed region data to pixels of the closed region which includes the coordinates (x, y), wherein the coordinates is substituted into working coordinates and the closed region number is substituted into closed region data of the working coordinates while the working coordinates are moved one pixel by one pixel;
when the scanned pixel is not white or the closed region data of coordinates (x, y) of the scanned pixel is not said boundary value, incrementing the closed region number by 1; and
said step of separating said line drawing to be filled comprising the step of providing a closed region number as closed region data of each of closed regions.

3. The image filling method as claimed in claim 1, each of said steps of extracting at least one feature amount of said first closed regions and extracting at least one feature amount of said second closed regions comprising the steps of:
initializing a minimum x coordinate, a minimum y coordinate, a maximum x coordinate and a maximum y coordinate of a rectangular circumscribing each of said closed regions;
obtaining the minimum x coordinate, the minimum y coordinate, the maximum x coordinate and the maximum y coordinate of the rectangular circumscribing each of said closed regions; and
calculating central coordinates of the rectangular circumscribing each of said closed regions as said feature amount from the minimum x coordinate, the minimum y coordinate, the maximum x coordinate and the maximum y coordinate.

4. The image filling method as claimed in claim 1, each of said steps of extracting at least one feature amount of said first closed regions and extracting at least one feature amount of said second closed regions comprising the steps of:
initializing a minimum x coordinate, a minimum y coordinate, a maximum x coordinate and a maximum y coordinate of a rectangular circumscribing each of said closed regions;
obtaining the minimum x coordinate, the minimum y coordinate, the maximum x coordinate and the maximum y coordinate of the rectangular circumscribing each of said closed regions; and
calculating an area of the rectangular circumscribing each of said closed regions as said feature amount from the minimum x coordinate, the minimum y coordinate, the maximum x coordinate and the maximum y coordinate.

5. The image filling method as claimed in claim 1, each of said steps of extracting at least one feature amount of said first closed regions and extracting at least one feature amount of said second closed regions comprising the steps of:
initializing a minimum x coordinate, a minimum y coordinate, a maximum x coordinate and a maximum y coordinate of a rectangular circumscribing each of said closed regions;
obtaining the minimum x coordinate, the minimum y coordinate, the maximum x coordinate and the maximum y coordinate of the rectangular circumscribing each of said closed regions; and
calculating an aspect ratio of the rectangular circumscribing each of said closed regions as said feature amount from the minimum x coordinate, the minimum y coordinate, the maximum x coordinate and the maximum y coordinate.

6. The image filling method as claimed in claim 1, each of said steps of extracting at least one feature amount of said first closed regions and extracting at least one feature amount of said second closed regions comprising the steps of:
initializing a number of pixels in each closed region; and
scanning said closed region while incrementing the number by one such that the number of pixels is obtained as said feature amount.

7. The image filling method as claimed in claim 1, each of said steps of extracting at least one feature amount of said first closed regions and extracting at least one feature amount of said second closed regions comprising the steps of:

initializing a minimum x coordinate, a minimum y coordinate, a maximum x coordinate, a maximum y coordinate and a number of pixels of a rectangular circumscribing each of said closed regions;

scanning said closed region, and obtaining the minimum x coordinate, the minimum y coordinate, the maximum x coordinate and the maximum y coordinate of said closed region and incrementing the number of pixels one by one when closed region data of the pixels in said closed region is not said boundary value; and calculating an area of the rectangular circumscribing each of said closed regions from the minimum x coordinate, the minimum y coordinate, the maximum x coordinate and the maximum y coordinate, dividing the region by the number of pixels for obtaining said feature amount.

8. The image filling method as claimed in claim 1, each of said steps of extracting at least one feature amount of said first closed regions and extracting at least one feature amount of said second closed regions comprising the steps of:

initializing a peripheral length of each closed region;

setting a maximum number as a previous closed region data;

scanning said closed region;

incrementing each of peripheries of said previous closed region data and said closed region data by one, and substituting said closed region data into said previous closed region data when said closed region data of a scanned pixel is not the boundary value, said closed region data is smaller than the maximum value and said closed region data is not the same as said previous closed region data; and obtaining said peripheral length of each closed region as said feature amount by repeating this process.

9. The image filling method as claimed in claim 1, each of said steps of extracting at least one feature amount of said first closed regions and extracting at least one feature amount of said second closed regions comprising the steps of:

initializing a peripheral length and a number of pixels of each closed region;

setting a maximum number as a previous closed region data;

scanning said closed region;

incrementing the number of pixels when closed region data of a scanned pixel is not the boundary value;

incrementing each of peripheries of said previous closed region data and said closed region data by one, and substituting said closed region data into said previous closed region data when said previous closed region data is smaller than the maximum value and said closed region data is not the same as said previous closed region data; and obtaining said feature amount by dividing said peripheral length of said closed region by the square root of the number of pixels constituting said closed region.

10. The image filling method as claimed in claim 1, said step of filling each of said second closed regions comprising:

substituting coordinates (x, y) in a second closed region into working coordinates; and substituting a specified color value into said working coordinates when closed region data of said coordinates (x, y) is the same as closed region data of said second closed region data and the color of said coordinates (x, y) is different from the specified color, wherein a pixel of said working coordinates is moved one pixel by one pixel.

11. The image filling method as claimed in claim 1, further comprising the steps of:

reading a filled line drawing, color candidates list and closed region data from a storage device;

presenting said filled line drawing to a user;

presenting said color candidate list corresponding to each closed region of said filled line drawing according to a request by the user;

changing a color of a closed region which is specified by the user into a color which is selected by the user from said color candidate list; and storing said filled line drawing in which the color is changed.

12. The image filling method as claimed in claim 11, further comprising the steps of:

generating a color alias list which has aliases corresponding to color information, and storing said color alias list in a storage device;

reading said color alias list from said storage device; and providing color aliases to said color candidate list to be displayed.

13. The image filling method as claimed in claim 1, further comprising the steps of:

extracting color information of each pixel of a line drawing to be filled, wherein said line drawing to be filled includes a colored line which is a boundary line dividing said line drawing to be filled into regions, a color of the boundary line specifying a color used for filling the boundary line;

extracting boundary line information representing whether said each pixel is on the boundary line or not by using said color information;

filling said line drawing except the boundary line by using said boundary line information; and filling said colored line by using said boundary line information.

14. The image filling method as claimed in claim 13, said step of extracting boundary line information comprising the steps of:

extracting color information of each pixel by scanning said line drawing to be filled;

comparing R, G, B values of said color information with predetermined R, G, B thresholds; and setting codes according to the kind of said colored line and regions other than said boundary line.

15. The image filling method as claimed in claim 13, said step of filling said line drawing comprising the step of:

providing specified color information to a region which includes coordinates when said coordinates are within said line drawing to be filled and said boundary line information of said coordinates represents a region other than the boundary line.

16. The image filling method as claimed in claim 13, said step of filling said colored line comprising the steps of:

when a pointing device is in a first state and boundary line information of coordinates at the pointing device represents a region other than the boundary line, obtaining color information of said coordinates at the pointing device; and when the pointing device is in a second state and boundary line information of coordinates at the pointing device represents the boundary line, providing said obtained color information to said coordinates at the pointing device.

17. The image filling method as claimed in claim 1, further comprising the steps of:

generating color specifying information including predetermined colors and corresponding names;

displaying said color specifying information at coordinates when a user specifies a closed region by pointing said coordinates with a pointing device; and filling said closed region with a color specified by the user from said displayed color specifying information.

18. The image filling method as claimed in claim 1, further comprising the steps of:

generating color specifying information including predetermined colors and corresponding names according to an instruction by a user;

storing generated color specifying information in a storage device;

reading a line drawing to be filled from said storage device;

displaying said line drawing to be filled on a display;

reading said color specifying information from said storage device;

displaying said color specifying information at coordinates specified by a pointing device on the display by the user;

filling a closed region which includes said coordinates with a color specified by the pointing device from said color specifying information; and storing said line drawing which is filled in the storage device.

19. The image filling method as claimed in claim 18, said step of filling a closed region comprising the steps of:

specifying a point in said closed region to be filled on the display with the pointing device, and obtaining coordinates of said point;

judging whether said point of said coordinates is on said line drawing to be filled;

displaying said color specifying information at said coordinates wherein said color specifying information is overlaid on said line drawing to be filled if said point of said coordinates is on said line drawing to be filled;

specifying a color in said color specifying information which is displayed with the pointing device;

obtaining a color value which is specified from said color specifying information;

filling said closed region including said coordinates with said color value;

deleting said color specifying information from the display; and repeating these procedures until filling of said line drawing is completed.

20. The image filling method as claimed in claim 1, further comprising the steps of:

inputting image data which is said filled line drawing;

searching said image data for extracting a small region smaller than or equal to a predetermined size; and outputting a list of said small regions.

21. The image filling method as claimed in claim 1, further comprising the steps of:

inputting image data which is said filled line drawing;

searching said image data for extracting a small region smaller than or equal to a predetermined size;

providing a mark to said small region; and displaying said mark wherein said mark is overlaid on said image data.

22. The image filling method as claimed in claim 1, further comprising the steps of:

inputting image data which is said filled line drawing;

searching said image data for extracting a small region smaller than or equal to a predetermined size;

providing a mark to said small region; and displaying said mark wherein said mark is overlaid on said image data; and asking an user about processing for said small region such that processing specified by the user is performed.

23. An image filling apparatus comprising:

a storage device for storing image data;

a part for reading said image data from said storage device;

a part for separating a reference line drawing into first closed regions, said reference line drawing being read from said storage device and being an original line drawing of a reference picture;

a part for extracting at least one feature amount of said first closed regions other than the barycenter;

a part for separating a line drawing to be filled into second closed regions, said line drawing to be filled being read from said storage device;

a part for extracting at least one feature amount of said second closed regions other than the barycenter;

a part for calculating variations of feature amounts between every combination of said first closed regions and said second closed regions, sorting said first closed regions in ascending order by the variation of the feature amount for each of said second closed regions;

a part for generating color candidate lists for each of said second closed regions, wherein color information corresponding to said first closed regions is obtained from said reference picture and duplication of said color information is eliminated;

a part for filling each of said second closed regions with a color which is on the top of said color candidate list corresponding to said second closed region such that a filled line drawing is generated.

24. The image filling apparatus as claimed in claim 23, further comprising:

a part for storing said filled line drawing, corresponding color candidate lists and separated closed region in said storage device;

a part for reading said filled line drawing, color candidate lists and said closed region data from said storage device;

a part for presenting said filled line drawing to a user;

a part for presenting said color candidate list corresponding to each closed region of said filled line drawing according to a request by the user;

a part for changing a color of a closed region which is specified by the user into a color which is selected by the user from said color candidate list; and a part for storing said filled line drawing in which the color is changed in said storage device.

25. The image filling apparatus as claimed in claim 23, further comprising:

a part for generating a color alias list which has aliases corresponding to color information, and storing said color alias list in said storage device;

a part for reading said color alias list from said storage device; and a part for providing color aliases to said color candidate list to be displayed.

26. The image filling apparatus as claimed in claim 23, further comprising:

a storage device for storing said line drawing to be filled, wherein said line drawing to be filled includes a colored line which is a boundary line dividing said line drawing into regions, a color of the boundary line specifying a color used for filling the boundary line;

a part for extracting color information of each pixel of said line drawing to be filled, a part for extracting boundary line information representing whether said each pixel is on the boundary line or not by using said color information;

a part for filling said line drawing except the boundary line by using said boundary line information; and a part for filling said colored line by using said boundary line information.

27. The image filling apparatus as claimed in claim 26, said part for extracting boundary line information comprising:

a part for extracting color information of each pixel by scanning said line drawing to be filled;

a part for comparing R, G, B values of said color information with predetermined R, G, B thresholds; and a part for setting codes according to the kind of said colored line and regions other than said boundary line.

28. The image filling apparatus as claimed in claim 26, said part of filling said line drawing comprising:

a part for providing specified color information to a region which includes coordinates when said coordinates are within said line drawing to be filled and said boundary line information of said coordinates represents a region other than the boundary line.

29. The image filling apparatus as claimed in claim 26, said part of filling said colored line comprising:

a part for obtaining color information of coordinates at a pointing device when the pointing device is in a first state and boundary line information of said coordinates at the pointing device represents a region other than the boundary line, and a part for providing said obtained color information to coordinates at the pointing device when the pointing device is in a second state and boundary line information of said coordinates at the pointing device represents the boundary line.

30. The image filling apparatus as claimed in claim 23, further comprising:

a part for generating color specifying information including predetermined colors and corresponding names according to an instruction by a user;

a part for storing generated color specifying information in said storage device;

a part for reading a line drawing to be filled from said storage device;

a part for displaying said line drawing to be filled on a display;

a part for reading said color specifying information from said storage device;

a part for displaying said color specifying information at coordinates specified by a pointing device on the display by the user;

a part for filling a closed region which includes said coordinates with a color specified by the pointing device from said color specifying information; and a part for storing said line drawing which is filled in the storage device.

31. The image filling apparatus as claimed in claim 30, said part for filling a closed region comprising:

a part for specifying a point in said closed region to be filled on the display with the pointing device, and obtaining coordinates of said point;

a part for judging whether said coordinates are on said line drawing to be filled;

a part for displaying said color specifying information at said coordinates wherein said color specifying information is overlaid on said line drawing to be filled if said coordinates are on said line drawing to be filled;

a part for specifying a color in said color specifying information with the pointing device;

a part for obtaining a color value which is specified in said color specifying information;

a part for filling said closed region including said coordinates with said color value;

a part for deleting said color specifying information from the display; and a part for repeating these procedures until filling of said line drawing is completed.

32. The image filling apparatus as claimed in claim 23, further comprising:

a part for inputting image data which is said filled line drawing;

a part for searching said image data for extracting a small region smaller than or equal to a predetermined size; and a part for outputting a list of said small regions.

33. The image filling apparatus as claimed in claim 23, further comprising:

a part for inputting image data which is said filled line drawing;

a part for searching said image data for extracting a small region smaller than or equal to a predetermined size;

a part for providing a mark to said small region; and a part for displaying said mark wherein said mark is overlaid on said image data.

34. The image filling apparatus as claimed in claim 23, further comprising:

a part for inputting image data which is said filled line drawing;

a part for searching said image data for extracting a small region smaller than or equal to a predetermined size;

a part for providing a mark to said small region; and a part for displaying said mark wherein said mark is overlaid on said image data; and a part for asking a user about processing for said small region such that processing specified by the user is performed.

35. A computer readable medium storing program code for causing a computer to color images, said computer readable medium comprising:

program code means for reading said image data from said storage device;

program code means for separating a reference line drawing into first closed regions, said reference line drawing being read from said storage device and being an original line drawing of a reference picture;

program code means for extracting at least one feature amount of said first closed regions other than the barycenter;

program code means for separating a line drawing to be filled into second closed regions, said line drawing to be filled being read from said storage device;

program code means for extracting at least one feature amount of said second closed regions other than the barycenter;

program code means for calculating variations of feature amounts between every combination of said first closed regions and said second closed regions, sorting said first closed regions in ascending order by the variation of the feature amount for each of said second closed regions;

program code means for generating color candidate lists for each of said second closed regions, wherein color information corresponding to said first closed regions is obtained from said reference picture and duplication of said color information is eliminated;

program code means for filling each of said second closed regions with a color which is on the top of said color candidate list corresponding to said second closed region such that a filled line drawing is generated.

36. The computer readable medium as claimed in claim 35, further comprising:

program code means for storing said filled line drawing, corresponding color candidate lists and separated closed region in said storage device;

program code means for reading said filled line drawing, color candidate lists and said closed region data from said storage device;

program code means for presenting said filled line drawing to a user;

program code means for presenting said color candidate list corresponding to each closed region of said filled line drawing according to a request by the user;

program code means for changing a color of a closed region which is specified by the user into a color which is selected by the user from said color candidate list; and program code means for storing said filled line drawing in which the color is changed in said storage device.

37. The computer readable medium as claimed in claim 35, further comprising:

program code means for generating a color alias list which has aliases corresponding to color information, and storing said color alias list in said storage device;

program code means for reading said color alias list from said storage device; and program code means for providing color aliases to said color candidate list to be displayed.

38. The computer readable medium as claimed in claim 35, further comprising:

program code means for extracting color information of each pixel of a line drawing to be filled, wherein said line drawing to be filled includes a colored line which is a boundary line dividing said line drawing to be filled into regions, a color of the boundary line specifying a color used for filling the boundary line;

program code means for extracting boundary line information representing whether said each pixel is on the boundary line or not by using said color information;

program code means for filling said line drawing except the boundary line by using said boundary line information; and program code means for filling said colored line by using said boundary line information.

39. The computer readable medium as claimed in claim 38, said program code means for extracting boundary line information comprising:

program code means for extracting color information of each pixel by scanning said line drawing to be filled;

program code means for comparing R, G, B values of said color information with predetermined R, G, B thresholds; and program code means for setting codes according to the kind of said colored line and regions other than said boundary line.

40. The computer readable medium as claimed in claim 38, said program code means for filling said line drawing comprising:

program code means for providing specified color information to a region which includes coordinates when said coordinates are within said line drawing to be filled and said boundary line information of said coordinates represents a region other than the boundary line.

41. The computer readable medium as claimed in claim 38, said program code means for filling said colored line comprising:

program code means for obtaining color information of coordinates at a pointing device when the pointing device is in a first state and boundary line information of said coordinates at the pointing device represents a region other than the boundary line, and program code means for providing said obtained color information to coordinates at the pointing device when the pointing device is in a second state and boundary line information of said coordinates at the pointing device represents the boundary line.

42. The computer readable as claimed in claim 35, further comprising:

program code means for generating color specifying information including predetermined colors and corresponding names according to an instruction by a user;

program code means for storing generated color specifying information in a storage device;

program code means for reading a line drawing to be filled from said storage device;

program code means for displaying said line drawing to be filled on a display;

program code means for reading said color specifying information from said storage device;

program code means for displaying said color specifying information at coordinates specified by a pointing device on the display by the user;

program code means for filling a closed region which includes said coordinates with a color specified by the pointing device from said color specifying information; and program code means for storing said line drawing which is filled in the storage device.

43. The computer readable medium as claimed in claim 42, said program code means for filling a closed region comprising:

program code means for specifying a point in said closed region to be filled on the display with the pointing device, and obtaining coordinates of said point;

program code means for judging whether said coordinates are on said line drawing to be filled;

program code means for displaying said color specifying information at said coordinates wherein said color specifying information is overlaid on said line drawing to be filled if said coordinates are on said line drawing to be filled;

program code means for specifying a color in said color specifying information with the pointing device;

program code means for obtaining a color value which is specified in said color specifying information;

program code means for filling said closed region including said coordinates with said color value;

program code means for deleting said color specifying information from the display; and program code means for repeating these procedures until filling of said line drawing is completed.

44. The computer readable medium as claimed in claim 35, further comprising:

program code means for inputting image data which is said filled line drawing;

program code means for searching said image data for extracting a small region smaller than or equal to a predetermined size; and program code means for outputting a list of said small regions.

45. The computer readable medium as claimed in claim 35, further comprising:

program code means for inputting image data which is said filled line drawing;

program code means for searching said image data for extracting a small region smaller than or equal to a predetermined size;

program code means for providing a mark to said small region; and program code means for displaying said mark wherein said mark is overlaid on said image data.

46. The computer readable medium as claimed in claim 35, further comprising:

program code means for inputting image data which is said filled line drawing;

program code means for searching said image data for extracting a small region smaller than or equal to a predetermined size;

program code means for providing a mark to said small region; and program code means for displaying said mark wherein said mark is overlaid on said image data; and program code means for asking a user about processing for said small region such that processing specified by the user is performed.

* * * * *

UNITED STATES PATENT AND TRADEMARK OFFICE
CERTIFICATE OF CORRECTION

PATENT NO. : 6,768,488 B1
DATED : July 27, 2004
INVENTOR(S) : Naoya Kotani et al.

It is certified that error appears in the above-identified patent and that said Letters Patent is hereby corrected as shown below:

Column 19,
Lines 34 and 57, change "lager" to -- larger --

Column 20,
Lines 1 and 13, change "lager" to -- larger --

Signed and Sealed this

Ninth Day of August, 2005

JON W. DUDAS
*Director of the United States Patent and Trademark Office*